US012610406B2

(12) United States Patent
Lee et al.

(10) Patent No.: US 12,610,406 B2
(45) Date of Patent: Apr. 21, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Kanghee Lee, Suwon-si (KR); Yongnam Kim, Suwon-si (KR); Sihong Park, Suwon-si (KR); Sukun Yoon, Suwon-si (KR); Chaeyoung Yun, Suwon-si (KR); Taewoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/187,551

(22) Filed: Apr. 23, 2025

(65) Prior Publication Data

US 2026/0020082 A1      Jan. 15, 2026

Related U.S. Application Data

(63) Continuation of application No. PCT/KR2025/004098, filed on Mar. 28, 2025.

(30) Foreign Application Priority Data

Jul. 10, 2024    (KR) ........................ 10-2024-0091165

(51) Int. Cl.
*H04W 76/10*            (2018.01)
(52) U.S. Cl.
CPC ................................... *H04W 76/10* (2018.02)
(58) Field of Classification Search
CPC ...... H04W 76/10; H04W 12/06; H04W 76/11
See application file for complete search history.

(56) References Cited

U.S. PATENT DOCUMENTS

| 10,757,096 B2 * | 8/2020 | Kim ........................ H04W 4/02 |
| 11,419,182 B2 | 8/2022 | Han et al. |

(Continued)

FOREIGN PATENT DOCUMENTS

| KR | 10 1575991 B1 | 12/2015 |
| KR | 10 2018 0102983 A | 9/2018 |

(Continued)

OTHER PUBLICATIONS

[CES 2024], "Our Family's First AI Member' Ballie Will Make Everyday Life Like a Movie", Samsung Newsroom Korea, Jan. 9, 2024, [Video], https://news.samsung.com/kr/%EC%98%81%EC%83%81-ces-2024-%EC%9A%B0%EB%A6%AC-%EA%B0%80%EC%A1%B1%EC%9D%98-%EC%B2%AB-ai-%EA%B5%AC%EC%84%B1%EC%9B%90-%EB%B3%BC%EB%A6%ACballie%EA% B0%80-%EB%A7%80%EB%93%A4. (3 pages total).

(Continued)

*Primary Examiner* — Tuan H Nguyen
(74) *Attorney, Agent, or Firm* — Sughrue Mion, PLLC

(57)            ABSTRACT

An electronic apparatus includes: a communication interface; a movement device; and at least one processor connected with the communication interface, and configured to: control the movement device to move the electronic apparatus; based on an event corresponding to identification of an external apparatus that is not connected to a server occurring, receive authority information for connecting the external apparatus to the server from the server through the communication interface; and control the external apparatus to connect to the server by transmitting connection information to the external apparatus through the communication interface, the connection information including the authority information.

16 Claims, 31 Drawing Sheets 100-1      100-2      100-3      100-4

(56)                       References Cited

U.S. PATENT DOCUMENTS

| | | | |
|---|---|---|---|
| 11,606,830 | B2 | 3/2023 | Jung et al. |
| 11,914,398 | B2 | 2/2024 | Ha |
| 2017/0155720 | A1* | 6/2017 | Song ................... H04B 1/3822 |
| 2023/0353555 | A1 | 11/2023 | Kim et al. |

FOREIGN PATENT DOCUMENTS

| | | | |
|---|---|---|---|
| KR | 10-2021837 | B1 | 11/2019 |
| KR | 10 2020 0044505 | A | 4/2020 |
| KR | 10-2021-0041904 | A | 4/2021 |
| KR | 10-2022-0102469 | A | 7/2022 |
| KR | 10 2022 0132264 | A | 9/2022 |
| KR | 10-2022-0152948 | A | 11/2022 |
| KR | 10-2023-0125644 | A | 8/2023 |
| KR | 10-2024-0029477 | A | 3/2024 |
| KR | 10 2024 0030653 | A | 3/2024 |
| KR | 10-2024-0045640 | A | 4/2024 |
| WO | 2015/167789 | A1 | 11/2015 |

OTHER PUBLICATIONS

International Search Report and Written Opinion dated Jul. 11, 2025, issued by the International Searching Authority in International Application No. PCT/KR2025/004098 (PCT/ISA/210 and PCT/ISA/237).

* cited by examiner

FIG. 1
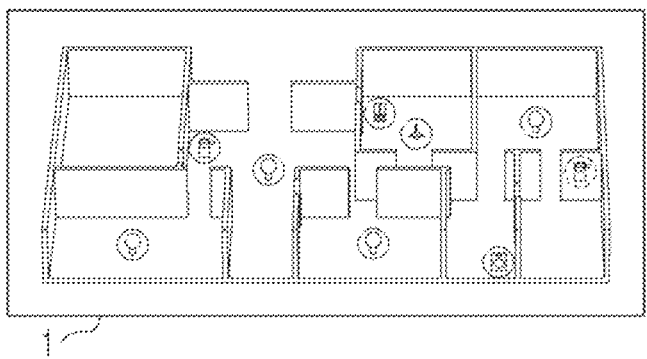
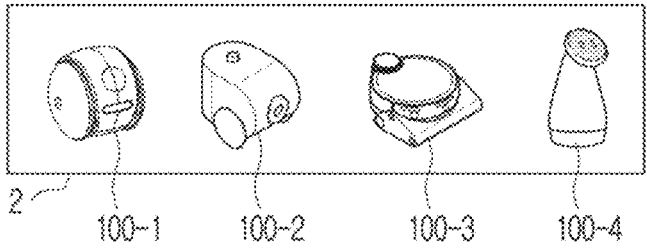
100-1      100-2      100-3      100-4

| MAPPING TABLE | | |
|---|---|---|
| | ACCOUNT INFORMATION | IDENTIFICATION INFORMATION OF THE EDGE DEVICE |
| 1 | sam@samsung.com | #A001 |
| 2 | kim@samsung.com | #A002 |
| 3 | lee@samsung.com | #A003 |
| 4 | park@samsung.com | #T001 |
| 5 | choi@samsung.com | #T002 |
| 6 | isac@samsung.com | #T003 |

| AUTHORITY TABLE | | |
|---|---|---|
| | IDENTIFICATION INFORMATION OF THE EDGE DEVICE | AUTHORITY INFORMATION (AUTHORITY CODE) |
| 1 | #A001 | ABC |
| 2 | #A002 | ABC |
| 3 | #A003 | ABC |
| 4 | #T001 | DEF |
| 5 | #T002 | DEF |
| 6 | #T003 | DEF |

ELECTRONIC APPARATUS    EDGE DEVICE    AP DEVICE    SERVER 100    200    300    400

Figure 19:
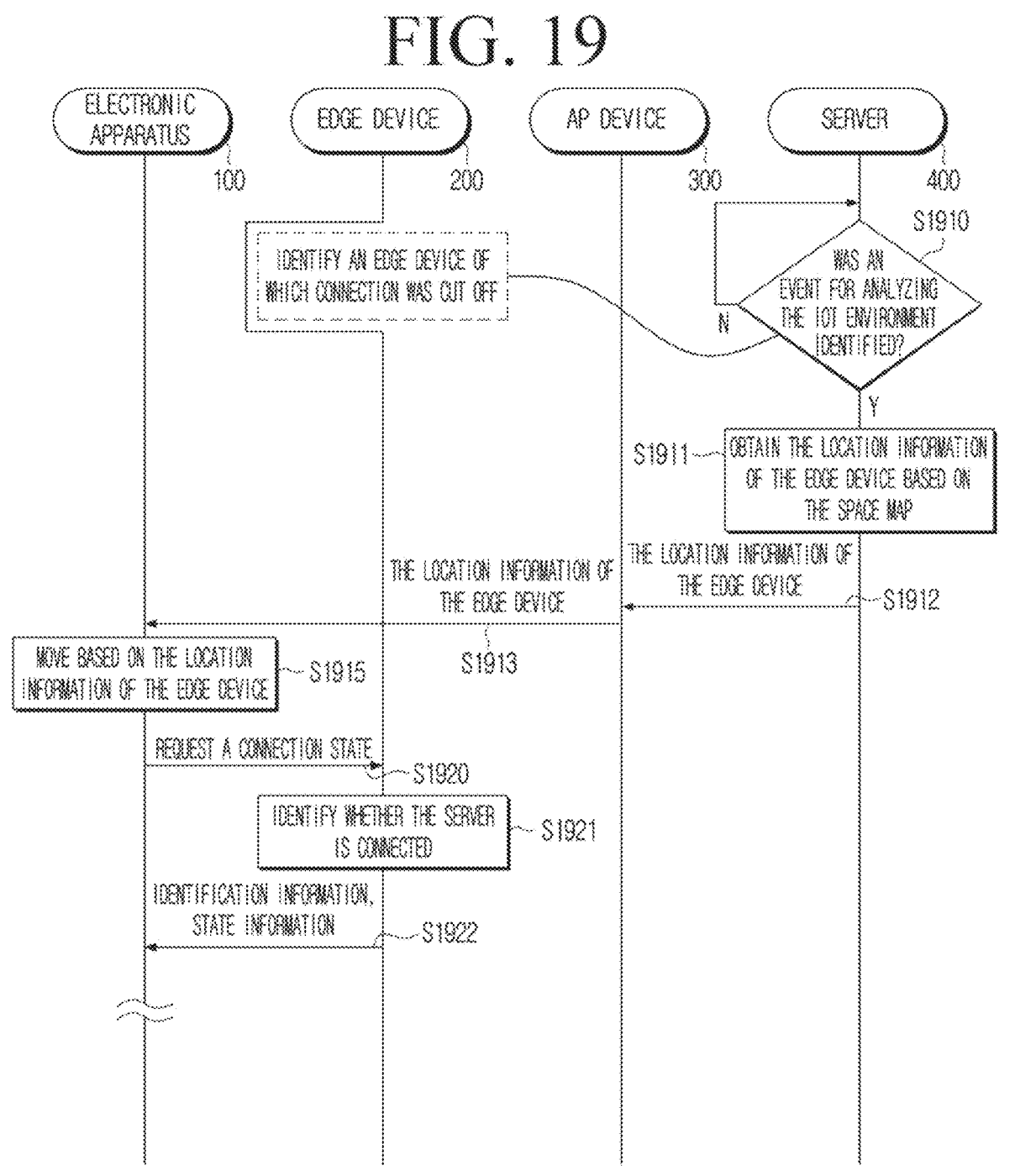

IDENTIFY AN EDGE DEVICE OF WHICH CONNECTION WAS CUT OFF

S1910
WAS AN EVENT FOR ANALYZING THE IOT ENVIRONMENT IDENTIFIED?

N

Y

S1911 — OBTAIN THE LOCATION INFORMATION OF THE EDGE DEVICE BASED ON THE SPACE MAP

THE LOCATION INFORMATION OF THE EDGE DEVICE    THE LOCATION INFORMATION OF THE EDGE DEVICE — S1912

MOVE BASED ON THE LOCATION INFORMATION OF THE EDGE DEVICE — S1915    S1913

REQUEST A CONNECTION STATE — S1920

IDENTIFY WHETHER THE SERVER IS CONNECTED — S1921

IDENTIFICATION INFORMATION, STATE INFORMATION — S1922

FIG. 21

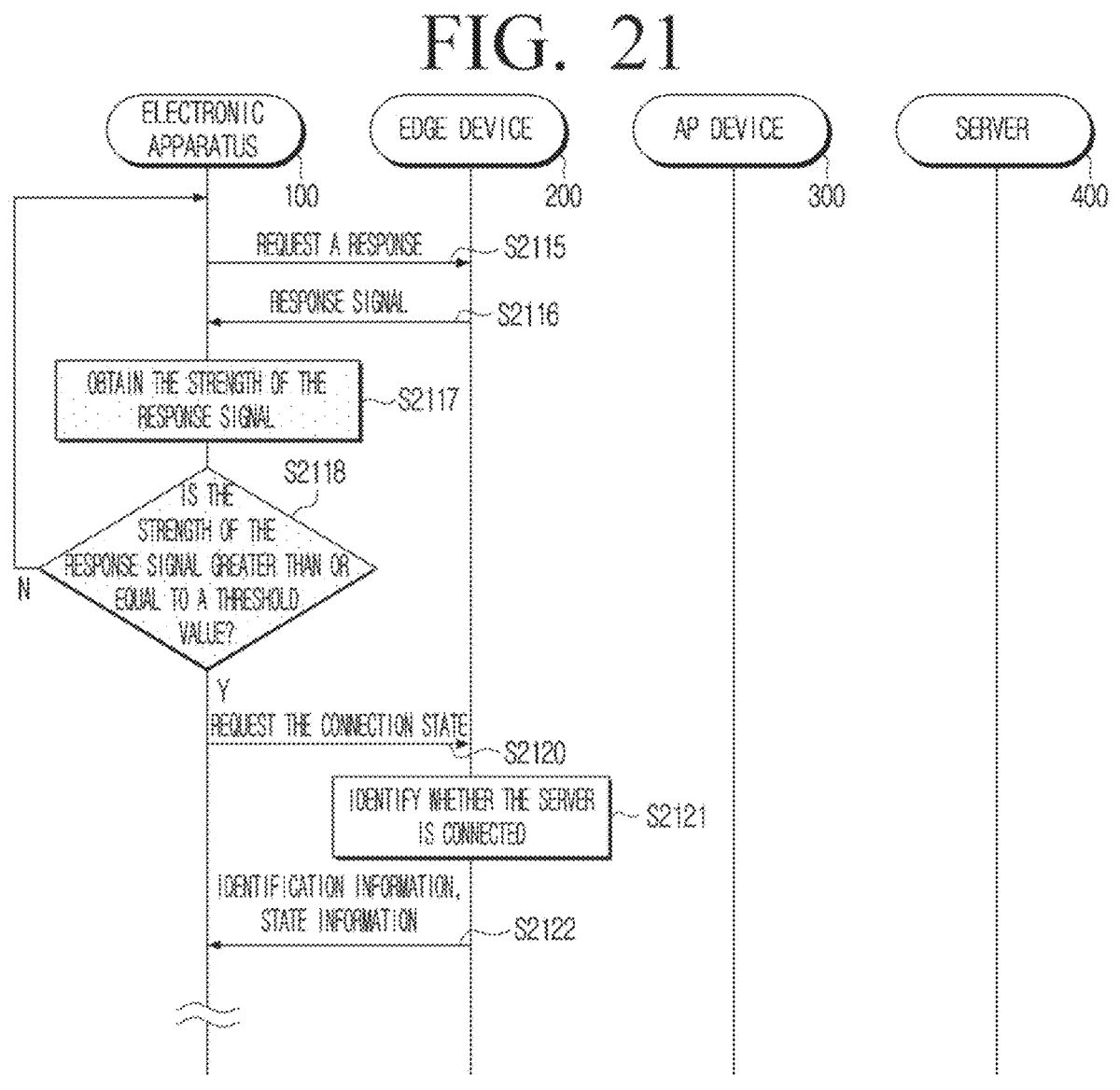

ELECTRONIC APPARATUS          EDGE DEVICE          AP DEVICE          SERVER
100          200          300          400

REQUEST A RESPONSE ——S2115

RESPONSE SIGNAL ——S2116

OBTAIN THE STRENGTH OF THE RESPONSE SIGNAL ——S2117

S2118
IS THE STRENGTH OF THE RESPONSE SIGNAL GREATER THAN OR EQUAL TO A THRESHOLD VALUE?

N

Y

REQUEST THE CONNECTION STATE ——S2120

IDENTIFY WHETHER THE SERVER IS CONNECTED ——S2121

IDENTIFICATION INFORMATION, STATE INFORMATION ——S2122

FIG. 25

| | MEASURE FOR SOLVING PROBLEMS | | |
|---|---|---|---|
| | STATE INFORMATION (CAUSE) | TYPE | OPERATION |
| 1 | NORMAL CONNECTION | NORMAL | - |
| 2 | NON-CONNECTION (NO CONNECTION HISTORY) | ON-BOARDING | TRANSMIT ACCOUNT INFORMATION, AUTHORITY INFORMATION, AP INFORMATION, AND ADDRESS INFORMATION |
| 3 | NON-CONNECTION (NO RESPONSE FROM THE EDGE DEVICE) | RECOVERY | REBOOT THE EDGE DEVICE (OR A POWER-ON COMMAND) |
| 4 | NON-CONNECTION (NO RESPONSE FROM THE AP DEVICE) | RECOVERY | RE-TRANSMIT THE AUTHORITY INFORMATION AND THE AP INFORMATION |
| 5 | NON-CONNECTION (NO RESPONSE FROM THE SERVER) | RECOVERY | RE-TRANSMIT THE ACCOUNT INFORMATION, THE AUTHORITY INFORMATION, AND THE ADDRESS INFORMATION |
| 6 | NON-CONNECTION (NOT KNOWN) | RECOVERY | TRANSMIT A COMMAND FOR INITIALIZING THE CONNECTING OPERATION, THE ACCOUNT INFORMATION, THE AUTHORITY INFORMATION, THE AP INFORMATION, AND THE ADDRESS INFORMATION |

2500

1

ELECTRONIC APPARATUS AND CONTROLLING METHOD THEREOF

CROSS-REFERENCE TO RELATED APPLICATIONS

This application is a bypass continuation of International Application No. PCT/KR2025/004098, filed on Mar. 28, 2025, which is based on and claims priority to Korean Patent Application No. 10-2024-0091165, filed on Jul. 10, 2024, in the Korean Intellectual Property Office, the disclosures of which are incorporated by reference herein in their entireties.

BACKGROUND

1. Field

The disclosure relates to an electronic apparatus and a method thereof, and more particularly, to an electronic apparatus that manages a connection state of an Internet of Things (IoT) device, and a method thereof.

2. Description of Related Art

An Internet of Things (IoT) device may be included in an IoT network, and may be connected to an IoT management server. To connect to the IoT management server, the IoT device may perform an initial on-boarding operation. By registering information related to the IoT device to the server, an on-boarding operation between the IoT device and the server can be performed.

In an initial on-boarding operation, a user should directly input information such that the IoT device can be connected to an access point (AP) device and the server.

After the initial on-boarding operation is performed successfully, an error may occur in a subsequent connection between the IoT device and the server. There may be various reasons for a phenomenon wherein the error occurs and connection is not performed normally. Also, for the user, there is inconvenience of having to directly take a measure for reconnection.

SUMMARY

According to an aspect of the disclosure, an electronic apparatus includes: a communication interface; a movement device; and at least one processor connected with the communication interface, and configured to: control the movement device to move the electronic apparatus; based on an event corresponding to identification of an external apparatus that is not connected to a server occurring, receive authority information for connecting the external apparatus to the server from the server through the communication interface; and control the external apparatus to connect to the server by transmitting connection information to the external apparatus through the communication interface, the connection information including the authority information.

The event corresponding to identification of the external apparatus that is not connected to the server may include at least one of identifying the external apparatus has no history of having been connected to the server or identifying connection between the external apparatus and the server has been released.

The external apparatus may be configured to transmit the authority information to the server through an access point device. Based on the authority information transmitted to the server corresponding to authority information stored in the server, the external apparatus and the server may be connected.

The at least one processor may be further configured to: control the movement device to move the electronic apparatus toward the external apparatus; request information corresponding to a connection state of the external apparatus with the server to the external apparatus through the communication interface based on the electronic apparatus being within a threshold distance of the external apparatus; and receive the information corresponding to the connection state from the external apparatus through the communication interface.

The at least one processor may be further configured to: based on identifying the external apparatus is not connected to the server based on the information corresponding to the connection state, request the authority information from the server through the communication interface; and receive the authority information from the server through the communication interface.

The connection information may further include state information, and the state information may include at least one of account information, access point information, or address information of the server.

The at least one processor may be further configured to: based on identifying connection between the external apparatus and the server has been released, obtain information corresponding to a location of the external apparatus from the server through the communication interface, and control the movement device to move the electronic apparatus toward the external apparatus based on a space map and the location of the external apparatus.

The at least one processor may be further configured to, based on the authority information not corresponding to predetermined information, provide information to the server indicating connection of the external apparatus to the server is not possible.

The at least one processor may be further configured to control the external apparatus to connect to the server through an access point device by transmitting AP access information to the external apparatus.

The electronic apparatus may include a projection device, and the at least one processor may be further configured to, based on receiving information corresponding to a connection between the external apparatus and the server through the communication interface, control the projection device to output the information corresponding to the connection between the external apparatus and the server.

According to an aspect of the disclosure, a method of controlling an electronic apparatus that includes a movement device, includes: controlling the movement device to move the electronic apparatus; based on an event corresponding to identification of an external apparatus that is not connected to a server occurring, receiving authority information for connecting the external apparatus to the server from the server; and controlling the external apparatus to connect to the server by transmitting connection information to the external apparatus, the connection information including the authority information.

The event corresponding to identification of the external apparatus that is not connected to the server may include at least one of identifying the external apparatus has no history of having been connected to the server or identifying connection between the external apparatus and the server has been released.

The method may further include: transmitting the authority information to the server; and based on the authority information transmitted to the server corresponding to authority information stored in the server, establishing connection between the external apparatus and the server.

The method may further include: controlling the electronic apparatus to move toward the external apparatus; requesting information corresponding to a connection state of the external apparatus with the server to the external apparatus based on the electronic apparatus being within a threshold distance of the external apparatus; and receiving the information corresponding to the connection state from the external apparatus.

The method may further include: based on identifying the external apparatus is not connected to the server based on the information corresponding to the connection state, requesting the authority information from the server; and receiving the authority information from the server.

According to an aspect of the disclosure, a non-transitory computer readable recording medium has embodied thereon a program, which when executed by a processor of an electronic apparatus causes the electronic apparatus to execute a method, the method including: controlling a movement device of the electronic apparatus to move the electronic apparatus; based on an event corresponding to identification of an external apparatus that is not connected to a server occurring, receiving authority information for connecting the external apparatus to the server from the server; and controlling the external apparatus to connect to the server by transmitting connection information to the external apparatus, the connection information including the authority information.

According to an aspect of the disclosure, an electronic apparatus includes: a communication interface; a movement device; and at least one processor configured to: generate a space map by controlling the movement device to move the electronic apparatus within a structure, the space map indicating a plurality of rooms and a plurality of external apparatuses within the structure; identify an external apparatus, among the plurality of external apparatuses, that is associated with a connection error; control the movement device to move the electronic apparatus to a room, among the plurality of rooms, in which the electronic apparatus is provided; and transmit connection information to the external apparatus through the communication interface.

The connection information may be configured to control the external apparatus to perform a first communication restoration operation.

The connection information may be configured to control the external apparatus to determine whether the connection error persists after performing the first communication restoration operation.

The at least one processor may be further configured to, based on the connection error persisting after performing the first communication restoration operation, transmit access point information to the external apparatus through the communication interface to control the external apparatus to perform a second communication restoration operation.

The first communication restoration operation may include an authentication information update operation, and the second communication restoration operation may include a reboot operation.

The at least one processor may be further configured to identify the first communication restoration operation based on the connection error.

BRIEF DESCRIPTION OF THE DRAWINGS

The above and other aspects, and advantages of certain embodiments of the disclosure will be more apparent from the following description taken in conjunction with the accompanying drawings, in which:

FIG. 1 is a diagram for illustrating a movable electronic apparatus according to an embodiment;

FIG. 11 is a diagram for illustrating a mapping table including account information and identification information of an edge device according to an embodiment;

FIG. 13 is a diagram for illustrating an authority table necessary for an edge device to be connected to a server according to an embodiment;

FIG. 14 is a diagram for illustrating an operation of obtaining connection information necessary for an edge device to be connected to a server according to an embodiment;

FIG. 19 is a diagram wherein an electronic apparatus moves by using location information of an edge device according to an embodiment;

FIG. 21 is a diagram for illustrating an operation of requesting a connection state to an edge device by using the strength of a response signal according to an embodiment;

5

Figure 23:
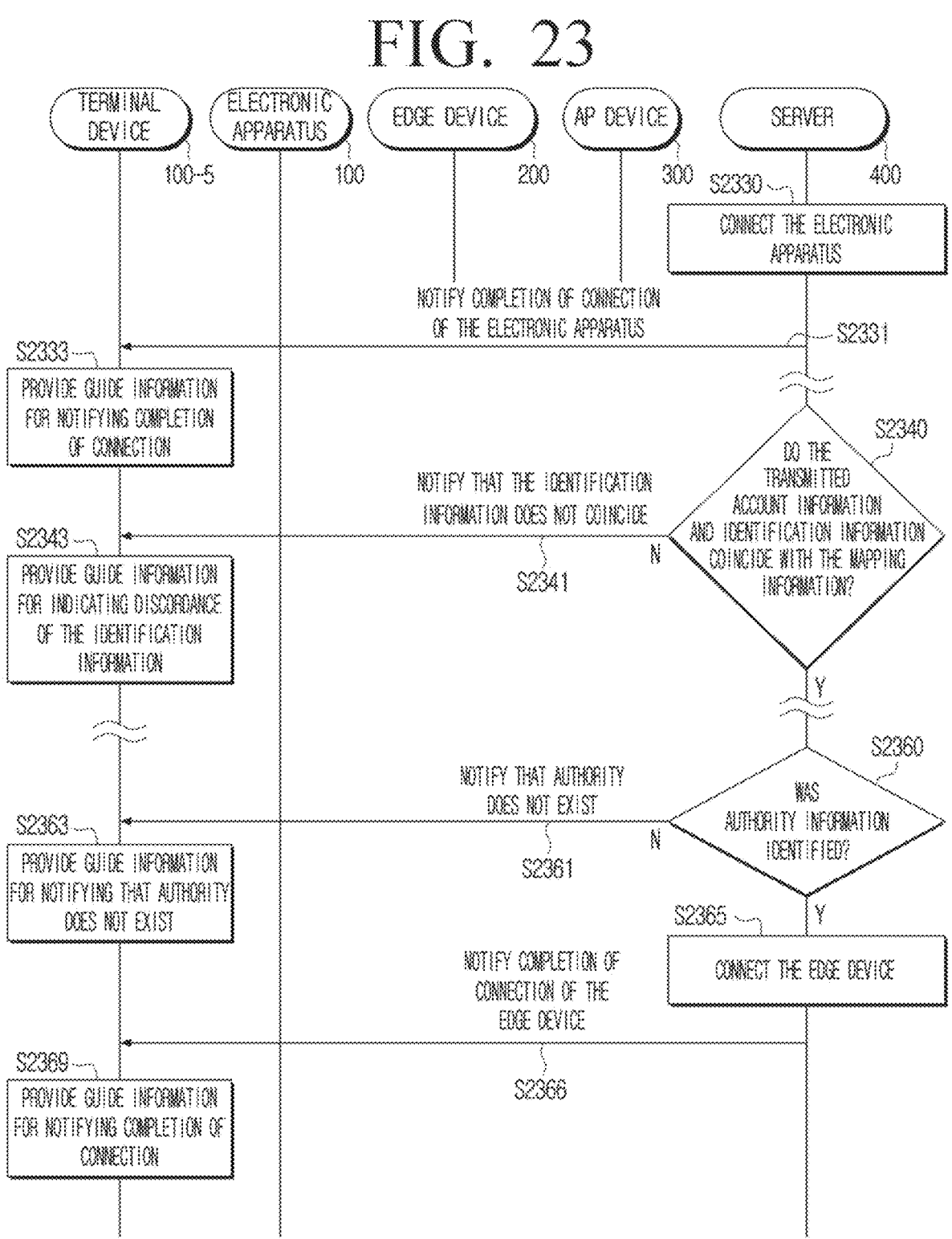
Figure 24:
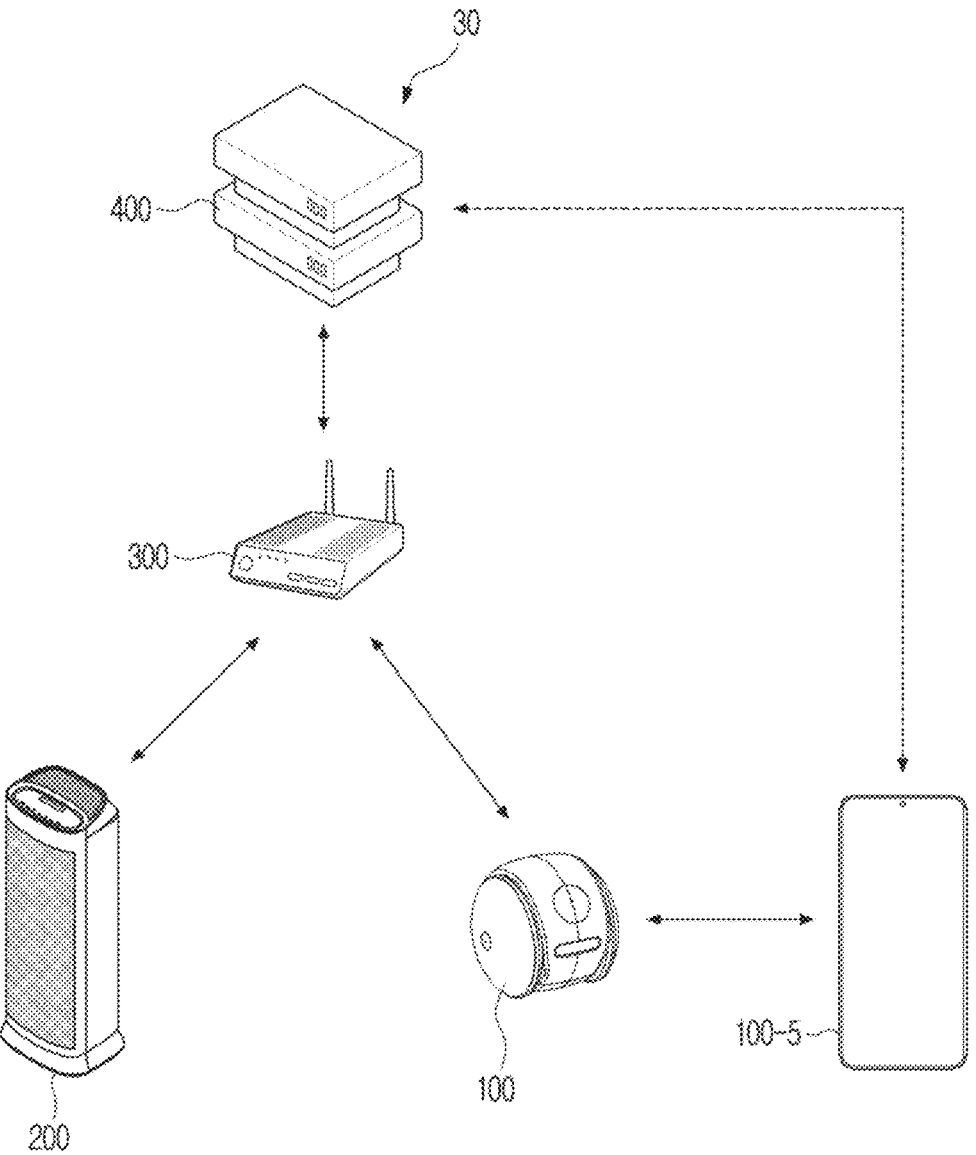
Figure 26:
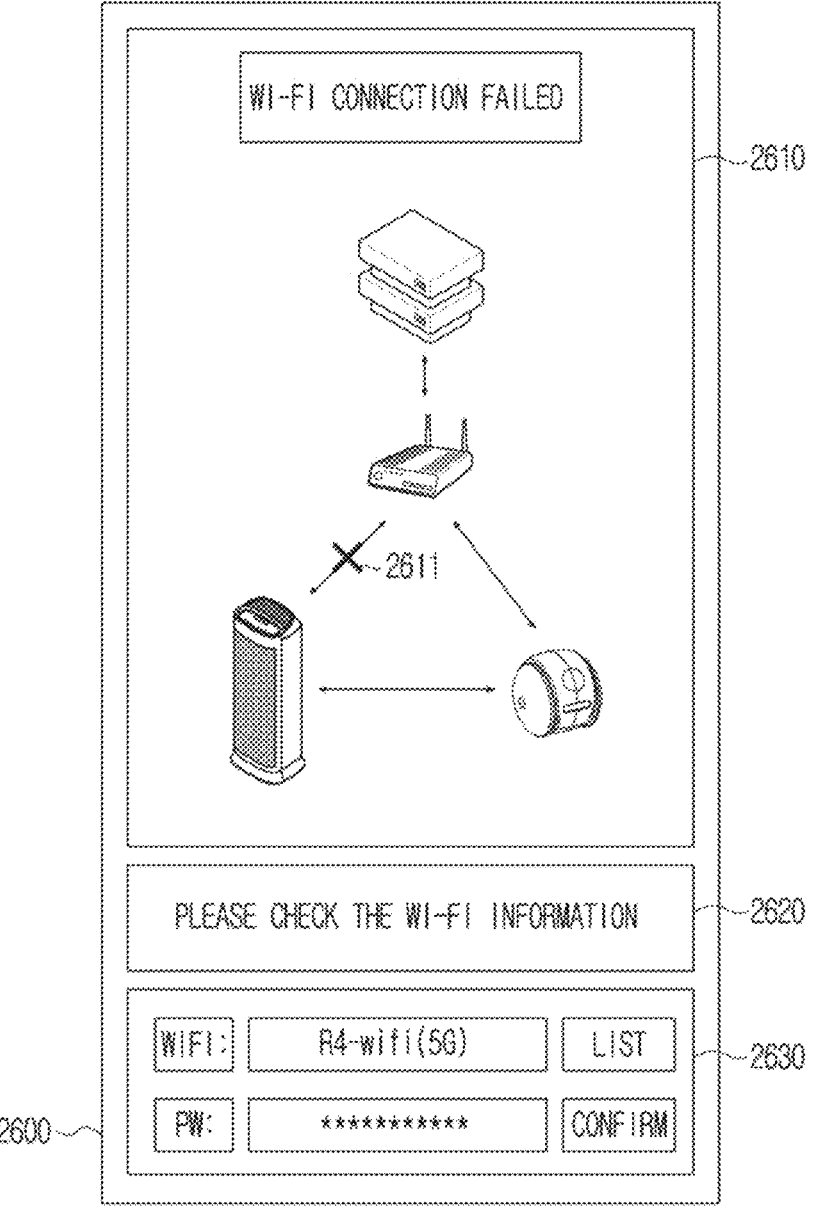
Figure 27:
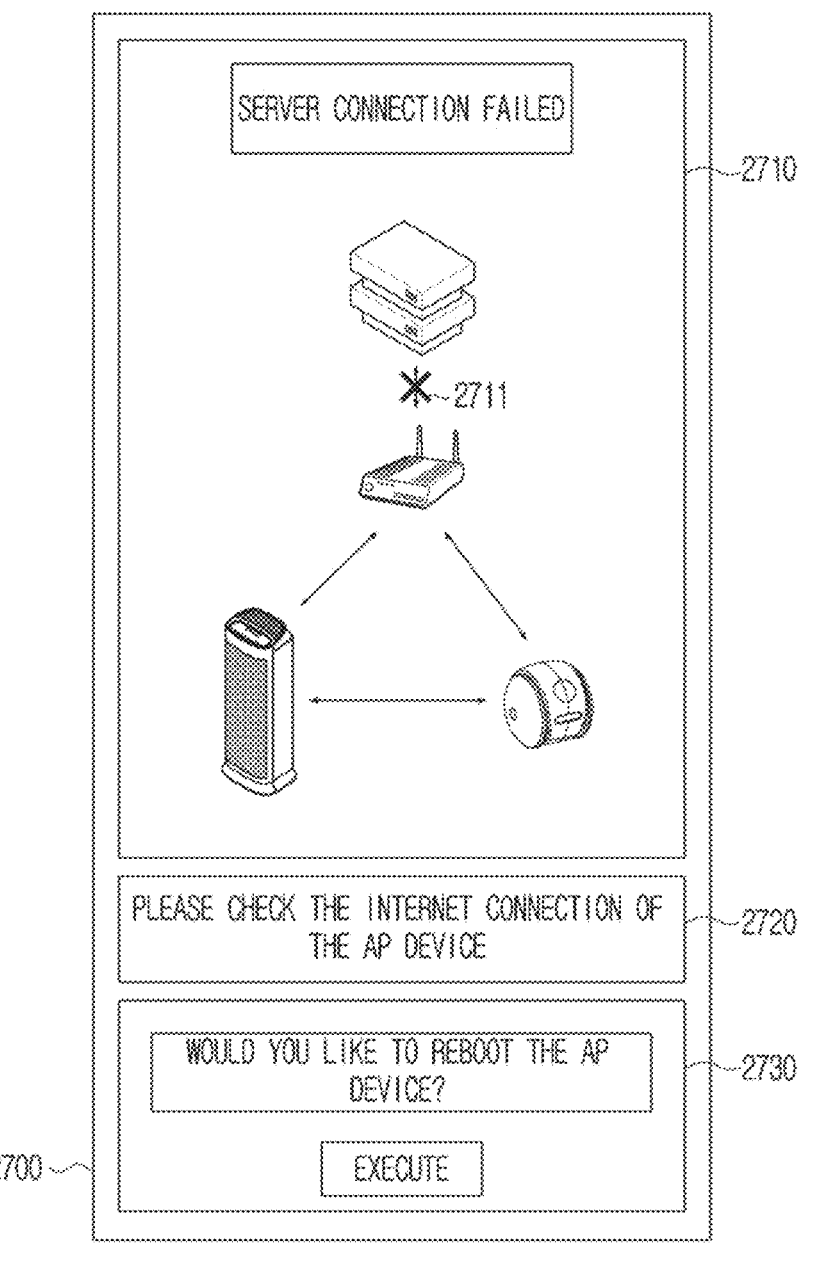
Figure 28:
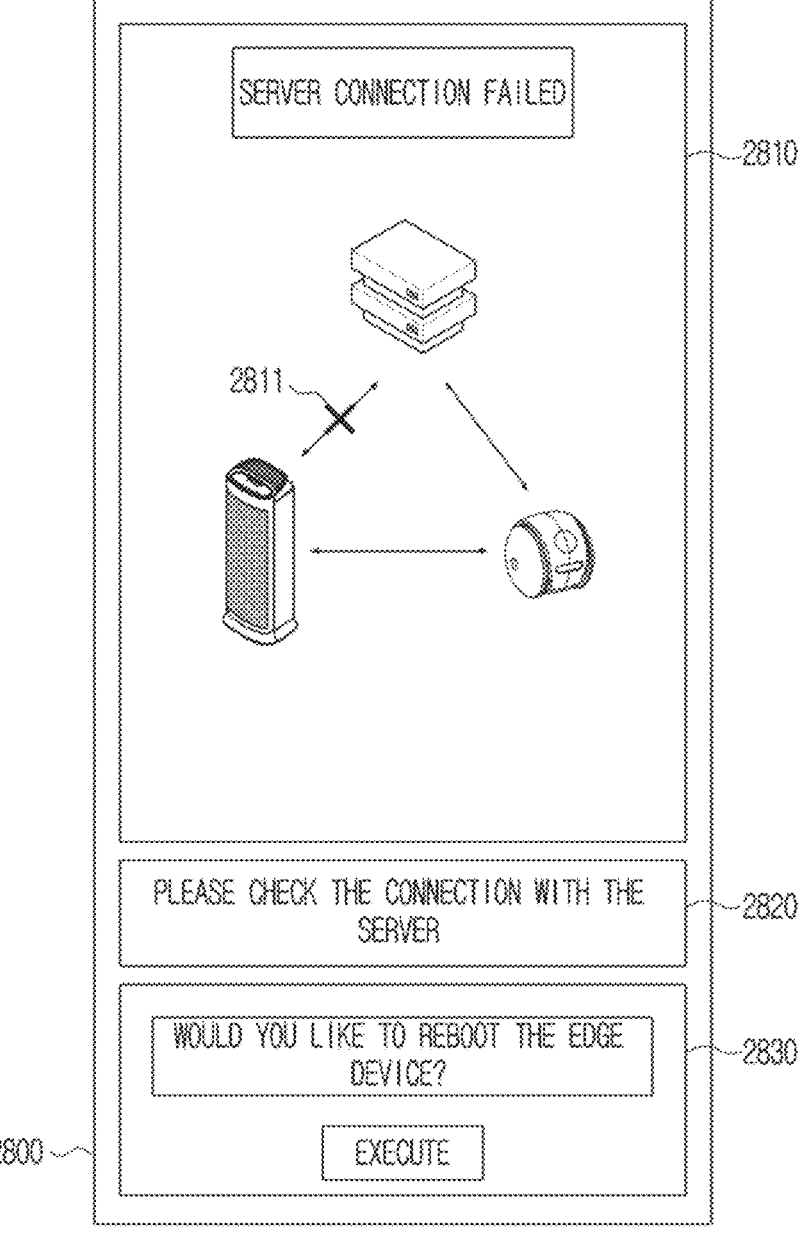
Figure 29:
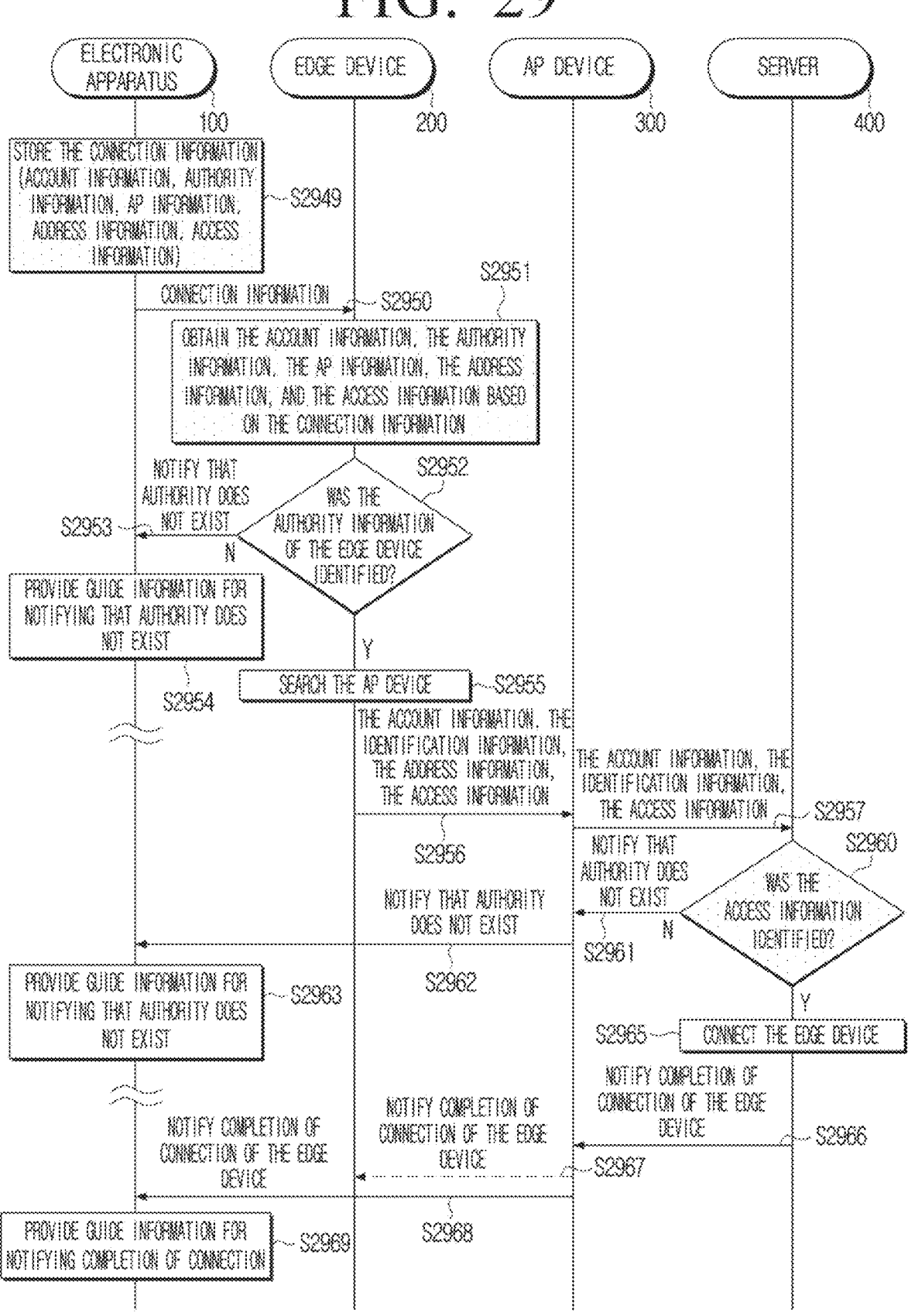
Figure 30:
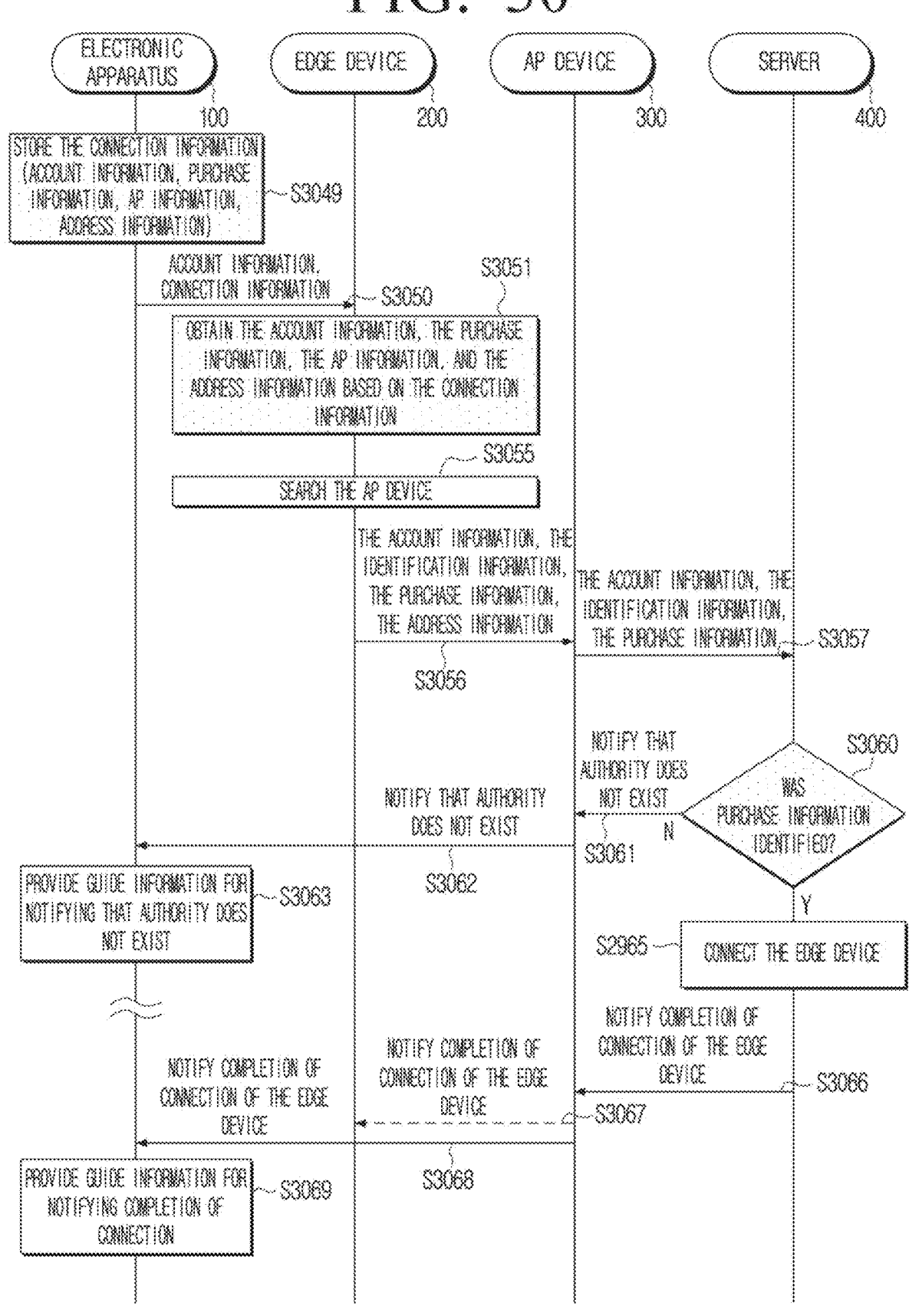
Figure 31:
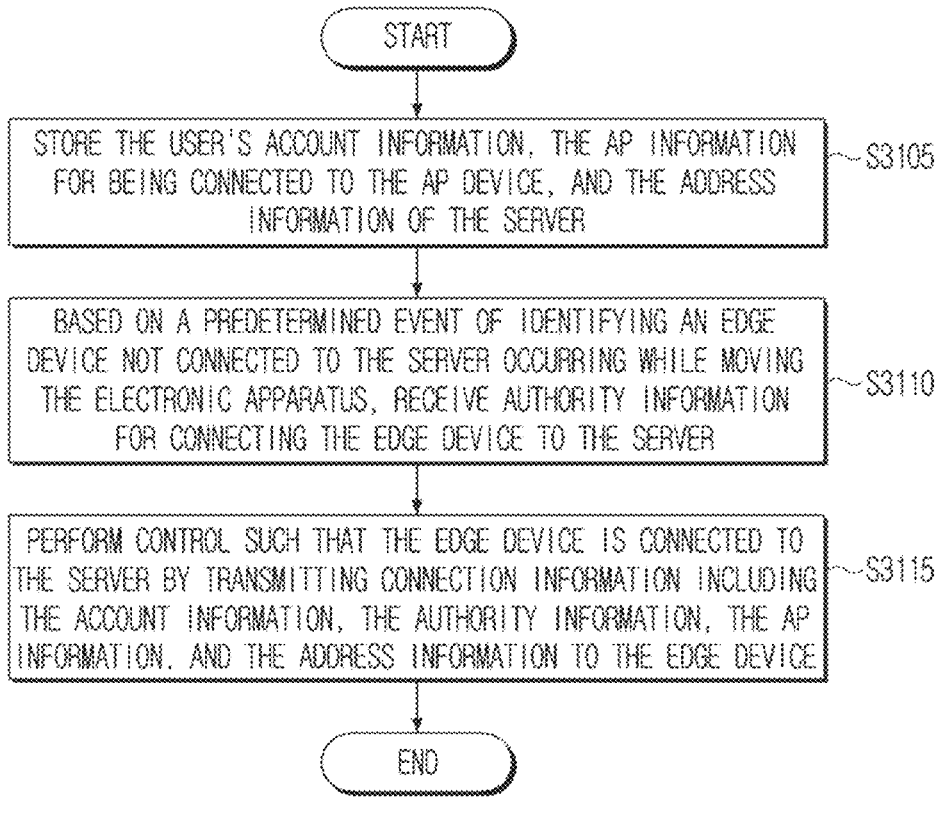

FIG. 23 is a diagram for illustrating an operation wherein a terminal device provides guide information according to an embodiment;

FIG. 24 is a diagram for illustrating an operation wherein an electronic apparatus and an edge device communicate by using an access point (AP) device according to an embodiment;

FIG. 25 is a diagram for illustrating a measure for solving a problem according to a predetermined event according to an embodiment;

FIG. 26 is a diagram for illustrating guide information that is provided in a situation wherein a problem occurs in connection between an edge device 200 and an AP device 300 according to an embodiment;

FIG. 27 is a diagram for illustrating guide information that is provided in a situation wherein a problem occurs in connection between an AP device 300 and a server 400 according to an embodiment;

FIG. 28 is a diagram for illustrating guide information that is provided in a situation wherein a problem occurs in connection between an electronic apparatus 100 and an edge device 200 according to an embodiment;

FIG. 29 is a diagram for illustrating an operation wherein an edge device 200 and a server 400 perform different authentication methods according to an embodiment;

FIG. 30 is a diagram for illustrating an operation of performing authentication by using purchase information according to an embodiment; and FIG. 31 is a diagram for illustrating a controlling method of an electronic apparatus according to an embodiment.

DETAILED DESCRIPTION

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

As used herein, the terms "1st" or "first" and "2nd" or "second" may use corresponding components regardless of importance or order and are used to distinguish a component from another component without limiting the components.

The description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Also, singular expressions include plural expressions, as long as they do not obviously mean differently in the context. Also, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, in the disclosure, "a module" or "a part" performs at least one function or operation, and may be implemented using hardware. Further, a plurality of "modules" or "parts" may be integrated into at least one module and implemented as at least one processor, except "a module" or "a part" that needs to be implemented as specific hardware.

Also, in this specification, the term "user" may refer to a person who uses an electronic apparatus or an apparatus using an electronic apparatus (e.g.: an artificial intelligence electronic apparatus).

Hereinafter, an embodiment of the disclosure will be described in more detail with reference to the accompanying drawings.

FIG. 1 is a diagram for illustrating a movable electronic apparatus 100 according to an embodiment.

Referring to FIG. 1, the electronic apparatus 100 may generate a space map. The space map may indicate a map corresponding to a space for the electronic apparatus 100 to move. The space map may include information related to a three-dimensional space. The space map may include information necessary for driving of the electronic apparatus 100. The space map may include space information and object information.

The space information may include coordinate information for the space. The coordinate information may be two-dimensional coordinate information or three-dimensional coordinate information.

The object information may include information related to an object existing in a three-dimensional space. The object may be an object indicating an Internet of Things (IoT) device. The object may indicate an edge device.

The electronic apparatus 100 may identify (or obtain) a driving route by using the space map. The electronic apparatus 100 may identify information on the object existing in the space by using the space map. The electronic apparatus 100 may identify a driving route in consideration of the object existing in the space.

In the aforementioned explanation and the explanation below, the space map may be described as a three-dimensional map or a two-dimensional map.

Referring to FIG. 1, the electronic apparatus 100 may be implemented as various apparatuses 100-1, 100-2, 100-3, 100-4.

The first apparatus 100-1 may be an apparatus including a projection device projecting an image. The first apparatus 100-1 may be a projector.

The second apparatus 100-2 may be a projector having a different outer appearance from the first apparatus 100-1.

The third apparatus 100-3 may be an apparatus performing a cleaning function. The third apparatus 100-3 may be a robot cleaner.

The fourth apparatus 100-4 may be an apparatus performing a service function. The fourth apparatus 100-4 may be a movable service robot. The service may include a service of providing specific information to a user in an image or audio form. The fourth apparatus 100-4 may include a display.

Figure 2:
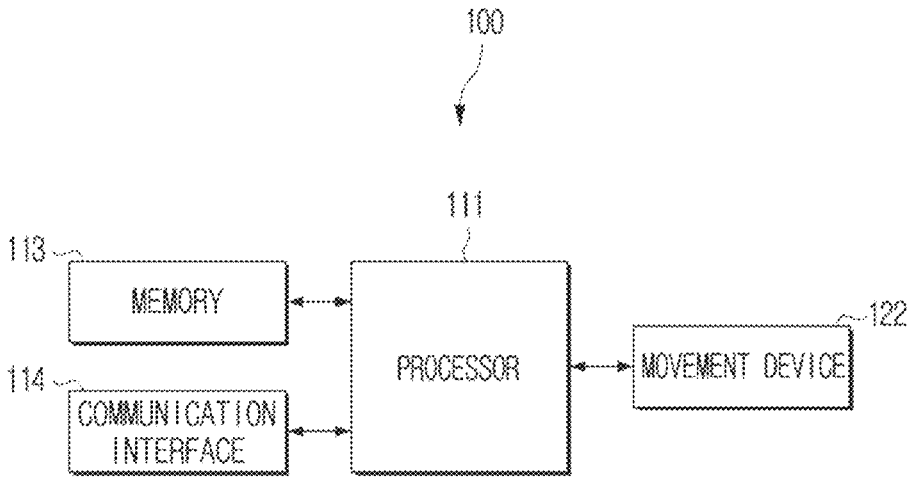
FIG. 2 is a block diagram illustrating an electronic apparatus according to an embodiment.

FIG. 2 is a block diagram illustrating the electronic apparatus 100 according to an embodiment.

Referring to FIG. 2, the electronic apparatus 100 may include at least one of memory 113, at least one processor 111, a communication interface 114, or a movement device (or movement member) 122.

The Internet of Things (IoT) network 10 may be a network for controlling (or managing) at least one IoT device. The IoT device may indicate a device included in the IoT network 10. The IoT device may be described as an edge device. The IoT network 10 may include at least one IoT device.

The IoT network 10 may include the electronic apparatus 100, an edge device 200, and a server 400. The electronic apparatus 100 may be connected to the IoT network 10. Explanation regarding the IoT network 10 will be described with reference to FIG. 4.

If an event corresponding to identification of the edge device 200 that is not connected to the server 400 occurs based on a movement of the electronic apparatus 100 through the movement device 122, the at least one processor 111 may control the electronic apparatus 100 to receive authority information for connecting the edge device 200 to the server 400 from the server 400 through the communication interface 114.

The at least one processor 111 may control connection information including state information and the authority information to be transmitted to the edge device 200 through the communication interface 114 so that the edge device 200 may connect to the server 400.

The edge device 200 may be described as an external device, an external apparatus, etc.

The at least one processor 111 may control the electronic apparatus 100 to move to a specific location through the movement device 122. The at least one processor 111 may determine whether an event of identifying the edge device 200 not connected to the server 400 occurs. The at least one processor 111 may search information on an ambient external device during moving of the electronic apparatus 100. The at least one processor 111 may request the edge device 200, which is an ambient external device, to provide information regarding whether the edge device 200 is connected with the server 400.

The event corresponding to identification of the edge device 200 not connected to the server 400 may include at least one of an event corresponding to identification of the edge device 200 that has no history of having been connected to the server 400 or an event corresponding to identification of the edge device 200 of which connection to the server 400 has been released.

The authority information may be transmitted to the server 400 through at least one of access point (AP) device 300 or the edge device 200.

The state information may include at least one of account information, AP information, or address information of the server 400.

According to an embodiment, the edge device 200 may receive the authority information from the electronic apparatus 100. The edge device 200 may transmit the authority information to the server 400. The edge device 200 may perform direct communication with the server 400.

According to an embodiment, the edge device 200 may receive the authority information from the electronic apparatus 100. The edge device 200 may transmit the authority information to the server 400 through the AP device 300. The edge device 200 may perform communication with the server 400 through the AP device 300.

If the authority information transmitted to the server 400 corresponds to authority information stored in advance in the server 400, the edge device 200 and the server 400 may be connected. The server 400 may identify the authority information. When the authority information is identified, the server 400 may be connected to the edge device 200. The server 400 may approve connection of the edge device 200.

The at least one processor 111 may control the electronic apparatus 100 to move to a nearby area of the edge device 200 and request the edge device 200 to provide information corresponding to the connection state of the edge device 200 with the server 400 to the edge device 200 through the communication interface 114. The at least one processor 111 may control the electronic apparatus 100 to receive the information corresponding to the connection state with the server 400 from the edge device 200 through the communication interface 114.

If an event corresponding to non-connection of the edge device 200 to the server 400 is identified based on the information corresponding to the connection state, the at least one processor 111 may control to request the server 400 to provide the authority information through the communication interface 114. The at least one processor 111 may control the electronic apparatus 100 to receive the authority information from the server 400 through the communication interface 114.

According to an embodiment, the electronic apparatus 100 may be directly connected to the server 400. The at least one processor 111 may control the electronic apparatus 100 to request authority information from the server 400. The at least one processor 111 may control the electronic apparatus 100 to directly receive the authority information from the server 400 through the communication interface 114.

According to an embodiment, the electronic apparatus 100 may be connected to the server 400 through the AP device 300. The at least one processor 111 may control the electronic apparatus 100 to transmit a signal requesting authority information to the server 400 through the AP device 300. The at least one processor 111 may control the electronic apparatus 100 to receive the authority information from the server 400 through the AP device 300.

A difference in the communication method according to whether the AP device 300 is used may be applied to the following operation. As an example, transmitting specific information to the server 400 may refer to an operation of transmitting specific information to the server 400 by a direct communication method, or an operation of transmitting specific information through the AP device 300. As an example, receiving specific information from the server 400 may refer to an operation of receiving specific information from the server 400 by a direct communication method, or an operation of receiving specific information from the server 400 through the AP device 300. Hereinafter, overlapping explanation will be omitted.

When connection between the edge device 200 and the server 400 is released, the at least one processor 111 may control the electronic apparatus 100 to obtain information corresponding to the location of the edge device 200 from the server 400 through the communication interface 114.

The at least one processor 111 may identify an event wherein connection between the edge device 200 and the server 400 is released. The at least one processor 111 may control the electronic apparatus 100 to receive a signal (or a notification) indicating release of connection from the edge device 200 or the server 400. When a signal indicating release of connection is received, the at least one processor 111 may control the electronic apparatus 100 to request information corresponding to the location of the edge device 200 to the server 400.

The electronic apparatus 100 may receive information corresponding to the location of the edge device 200 from the server 400. The at least one processor 111 may control the movement device 122 to move the electronic apparatus 100 to a nearby location of the edge device 200 based on the space map and the information corresponding to the location of the edge device 200.

According to an embodiment, the space map may be stored in the electronic apparatus 100. The at least one processor 111 may control the electronic apparatus 100 to move to a nearby location of the edge device 200 based on the stored space map and the information corresponding to the location of the edge device 200 received from the server 400.

According to an embodiment, the space map may be included in the information corresponding to the location of the edge device 200. The at least one processor 111 may control the electronic apparatus 100 to move to a nearby location of the edge device 200 based on the information corresponding to the location.

If the authority information does not correspond to the predetermined authority information, the electronic apparatus 100 may control the edge device 200 to provide information corresponding to impossibility of connection of the edge device 200 to the server 400.

The predetermined authority information may indicate authority information for approval in advance. If the received authority information does not correspond to the predetermined authority information (or the prestored authority information), the at least one processor 111 may identify that the edge device 200 cannot be connected to the server 400. The at least one processor 111 may generate notification information indicating that the edge device 200 cannot be connected to the server 400. The at least one processor 111 may control the electronic apparatus 100 to transmit the notification information to the server 400.

The at least one processor 111 may control the edge device 200 to connect to the server 400 through the AP device 300 by transmitting AP information for being connected to the AP device 300 (i.e., AP connection information) to the edge device 200.

According to an embodiment, the AP information may be included in the connection information. The at least one processor 111 may control the electronic apparatus 100 to transmit the connection information including the AP information, the state information, and the authority information to an external device.

The electronic apparatus 100 may include a projection device 112 (i.e., a projector or projection part). If information corresponding to connection between the edge device 200 and the server 400 is received through the communication interface 114, the at least one processor 111 may control the projection device 112 to output the information corresponding to connection between the edge device 200 and the server 400.

The at least one processor 111 may generate a projection image including the information corresponding to connection between the edge device 200 and the server 400. The at least one processor 111 may control the projection device 112 to project the projection image on a specific location.

The explanation below indicates an operation of using AP information for connection with the AP device 300.

The IoT network 10 may include the electronic apparatus 100, the edge device 200, the AP device 300, and the server 400. The electronic apparatus 100 may be connected to the IoT network 10. Explanation regarding the IoT network 10 will be described with reference to FIG. 4.

According to an embodiment, the electronic apparatus 100 may perform direct communication with the edge device 200. The electronic apparatus 100 may perform communication with the AP device 300. The edge device 200 may perform communication with the AP device 300. The AP device 300 may perform communication with the server 400. The electronic apparatus 100 and the edge device 200 may perform communication with the server 400 by using the AP device 300.

Another embodiment regarding the IoT network will be described with reference to FIG. 22 and FIG. 24.

The memory 113 may store at least one of information on an account of a user, AP information for being connected to the AP device 300, or address information of the server 400.

The account information may be information for specifying a user for controlling the IoT network 10 at the server 400. The account information may be described as log-in information. The account information may include an ID and a password. The server 400 may specify the user through the account information. The server 400 may control the IoT network 10 for the user by using the account information.

The AP information may include information for accessing the AP device 300. The AP device 300 may be described as a router. The AP device 300 may be a relay device connecting an IoT device and the server 400. The AP device 300 may be described as a hub device. The AP information may include various types of information related to the AP device 300. The AP information may include information necessary for being connected to the AP device 300. The AP information may include a Wi-Fi name (i.e., a Service Set Identified (SSID) and a Wi-Fi password. The AP information may be used in connecting the edge device 200 to the AP device 300. The electronic apparatus 100 may store the AP information for being connected to the AP device 300 in the memory 113.

The electronic apparatus 100 may store the address information of the server 400 in the memory 113. The address information may include an Internet address for performing communication with the server 400. The address information may include a domain address. The electronic apparatus 100 may store the address information for performing communication with the server 400 in the memory 113.

The communication interface 114 may include at least one communication module. The electronic apparatus 100 may perform communication with at least one of the edge device 200, the AP device 300, or the server 400 through the communication interface 114.

According to an embodiment, the communication interface 114 may include a first communication module using a Wi-Fi communication method and a second communication module using a Bluetooth or other short-range wireless communication method. The electronic apparatus 100 may perform communication with the AP device 300 through the first communication module. The electronic apparatus 100 may perform communication with the edge device 200 through the second communication module.

The movement device 122 may automatically move the electronic apparatus 100. The electronic apparatus 100 may rotate the motor by supplying the power to the motor. The electronic apparatus 100 may rotate according to the rotation of the motor. The electronic apparatus 100 may move the electronic apparatus 100 to a specific location by controlling the rotation direction of the movement device 122.

The at least one processor 111 may be connected with at least one of the memory 113 or the communication interface 114. The at least one processor 111 may control the electronic apparatus 100 by performing at least one execution command stored in the memory 113.

If a predetermined event of identifying the edge device 200 not connected to the server 400 occurs while the movement device 122 moves the electronic apparatus 100, the at least one processor 111 may control the electronic apparatus 100 to receive authority information for connecting the edge device 200 to the server 400 from the server 400 through the communication interface 114.

The at least one processor 111 may control the electronic apparatus 100 to transmit connection information including account information, authority information, AP information, and address information to the edge device 200 through the communication interface 114.

The at least one processor 111 may control the movement device 122 to move the electronic apparatus 100 within the space wherein the electronic apparatus 100 is arranged for searching the edge device 200. The at least one processor 111 may control the electronic apparatus 100 to perform a scan (or search) operation for analyzing the IoT environment. The scan operation may include an operation of searching whether an identifiable device exists in the surroundings.

The at least one processor 111 may initiate (or perform) a scan operation in various situations.

As an example, if a user input for initiating a scan operation is received, the at least one processor 111 may initiate the scan operation.

As an example, if a predetermined period arrives, the at least one processor 111 may initiate a scan operation.

As an example, if a control command for performing a scan operation is received from the server 400, the at least one processor 111 may initiate a scan operation.

As an example, in case the electronic apparatus 100 is in a standby state, the at least one processor 111 may control the electronic apparatus 100 to perform a scan operation. The standby state may indicate a state wherein power is supplied, but a specific function is not performed. The standby state may be described as a standby mode. In case the electronic apparatus 100 is in the standby mode, the at least one processor 111 may control the electronic apparatus 100 to perform a scan operation.

As an example, in case the electronic apparatus 100 identifies a new edge device not stored in the memory 113, the at least one processor 111 may control the electronic apparatus 100 to perform a scan operation.

As an example, in case an edge device 200 of which connection with the server 400 has been released exists, the at least one processor 111 may control the electronic apparatus 100 to perform a scan operation.

The at least one processor 111 may control the electronic apparatus 100 to search for at least one edge device existing in the space wherein the electronic apparatus 100 is arranged by performing a scan operation. Additional explanation related to the scan operation will be described with reference to FIG. 12.

As a result of the scan operation, the at least one processor 111 may identify an edge device 200 that can perform communication with the electronic apparatus 100. The at least one processor 111 may control the electronic apparatus 100 to request a connection state to the edge device 200. The at least one processor 111 may control the electronic apparatus 100 to request state information to the edge device 200 that can perform communication.

For a scan operation, the electronic apparatus 100 may move in a space. The electronic apparatus 100 may perform a scan operation in various locations by using the movement device 122.

After the electronic apparatus 100 is moved to the location wherein the edge device 200 is arranged, the electronic apparatus 100 may request information indicating whether the edge device 200 is connected with the server 400 to the edge device 200 through the communication interface 114.

The at least one processor 111 may control the electronic apparatus 100 to transmit a signal requesting a connection state to the edge device 200 through the communication interface 114. The edge device 200 may receive the signal requesting a connection state from the electronic apparatus 100. The edge device 200 may identify whether the edge device 200 is connected with the server 400. The edge device 200 may transmit the state information to the electronic apparatus 100 as an identification result. The edge device 200 may transmit the identification information of the edge device 200 to the electronic apparatus 100 together with the state information. An operation related to this will be described with reference to FIG. 12.

The at least one processor 111 may control the electronic apparatus 100 to receive the state information indicating whether the edge device 200 is connected with the server 400 from the edge device 200 through the communication interface 114.

The state information may include various types of information related to connection of the edge device 200 with the server 400. The state information may include information indicating whether the edge device 200 can be connected with the server 400. The state information may include information on (i.e., about or indicating) a cause (or information on a problem) that the edge device 200 cannot be connected.

The at least one processor 111 may identify a predetermined event wherein the edge device 200 is not connected to the server 400 based on the received state information. An operation related to this may correspond to the operation S1430 in FIG. 14.

The predetermined event may include an event indicating a state wherein the edge device 200 is not connected with the server 400.

The predetermined event may include at least one of an event of identifying the edge device 200 that has no history of having been connected to the server 400 or an event of identifying the edge device 200 of which connection to the server 400 has been released.

In case the edge device 200 is in a factory reset state (e.g., arranged in a home for the first time), there may be no history that connection with the server 400 has been performed. As there is no history of connection with the server 400, the edge device 200 may not store information on the server 400. With respect to the edge device 200 in the factory reset state, the at least one processor 111 may determine that the edge device 200 is not connected with the server 400. The at least one processor 111 may perform (or control) an on-boarding operation for the edge device 200.

After connection of the edge device 200 with the server 400 is performed, the connection with the server 400 may end according to a specific cause. For example, the edge device 200 may have previously communicated with the server 400, but is no longer able to establish the connection with the server 400 due to a specific cause. In a state wherein the connection ended, the at least one processor 111 may determine that the edge device 200 is not connected with the server 400. The at least one processor 111 may perform a recovering operation for the edge device 200.

The on-boarding operation and the recovering operation are both operations for connecting the edge device 200 to the server 400.

According to an embodiment, both of an on-boarding operation and a recovering operation may include the same operations. The at least one processor 111 may perform an initialization command and an operation for connection identically.

According to an embodiment, an on-boarding operation and a recovering operation may be different in some parts, and in this regard may include some operations that are different. For solving only a cause for release of connection, information provided by the at least one processor 111 may be partially different. Explanation in this regard will be described with reference to FIG. 25.

When a predetermined event is identified, the at least one processor 111 may request authority information to the server 400 through the communication interface 114.

The at least one processor 111 may transmit a signal requesting authority information to the AP device 300 through the communication interface 114. The AP device 300 may transmit the signal requesting authority information to the server 400. The at least one processor 111 may control the electronic apparatus 100 to transmit the signal requesting authority information to the server 400 through the AP device 300.

The at least one processor 111 may control the electronic apparatus 100 to receive the authority information from the server 400 through the communication interface 114.

The server 400 may provide the authority information corresponding to the edge device 200 to the electronic apparatus 100 in response to the request. The server 400 may provide the authority information to the electronic apparatus 100 through the AP device 300. Explanation in this regard will be described with reference to FIG. 14.

The authority information may be information necessary for connecting the edge device 200 to the server 400. A lso, the authority information may be information for identifying whether it would be okay to proceed with an operation for connection of the edge device 200 to the server 400. The authority information may be described as authentication information or qualification information. The authority information may include information indicating authority for initiating connection between the edge device 200 and the server 400. If authority information does not exist, a connection operation of the edge device 200 and the server 400 may not be performed. The authority information may be used in preventing a behavior of an unauthenticated user of connecting the edge device 200 to the server 400.

The server 400 may receive identification information of the edge device 200 together with a signal requesting authority information. The server 400 may obtain authority information corresponding to the edge device 200 from an authority table. The authority table may include authority information for each of a plurality of devices. The server 400 may store the authority table. The authority table may be updated according to the user setting. Explanation regarding the authority table will be described with reference to FIG. 13.

The server 400 may identify (or obtain) authority information corresponding to the identification information of the edge device 200 among a plurality of authority information included in the authority table. The server 400 may transmit the authority information corresponding to the identification information of the edge device 200 to the electronic apparatus 100 through the AP device 300.

The at least one processor 111 may control the electronic apparatus 100 to obtain the authority information corresponding to the identification information of the edge device 200 transmitted from the server 400. The at least one processor 111 may control the electronic apparatus 100 to receive the authority information corresponding to the edge device 200 from the AP device 300 through the communication interface 114. The operation of receiving the authority information may correspond to the operation S1447 in FIG. 14.

The at least one processor 111 may generate connection information including the authority information transmitted from the server 400, the account information stored in the memory 113, the AP information, and the address information. The at least one processor 111 may control the electronic apparatus 100 to store the generated connection information in the memory 113.

The at least one processor 111 may control the electronic apparatus 100 to transmit the connection information to the edge device 200 for connection between the edge device 200 and the server 400. The operation of transmitting the connection information may correspond to the operation S1750 in FIG. 17.

The connection information may be information used in performing an operation of connecting the edge device 200 to the server 400.

Figure 17:
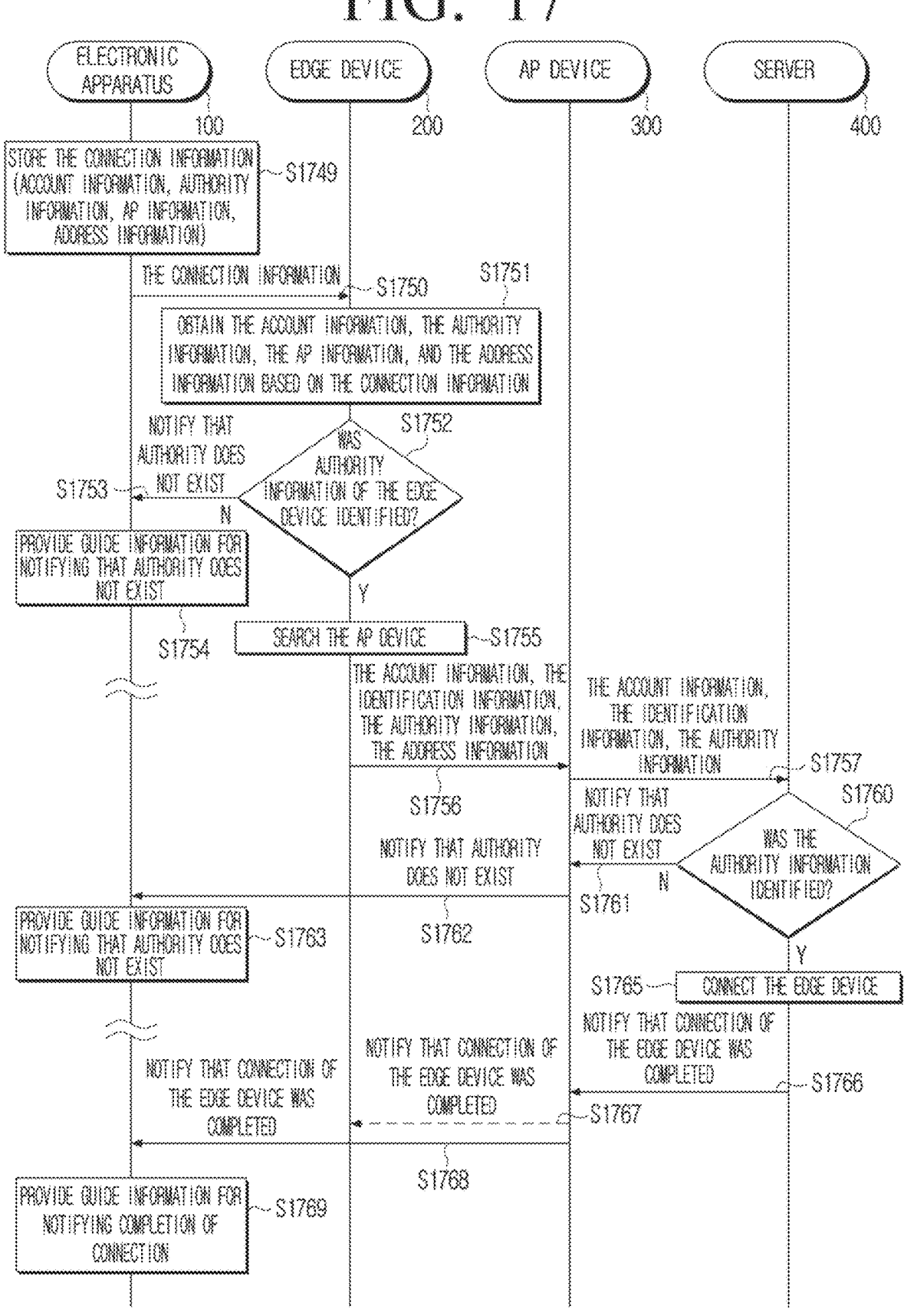
FIG. 17 is a diagram for illustrating an operation wherein an edge device is connected to a server according to an embodiment.

The authority information may be used in determining whether the edge device 200 will perform an operation of searching the AP device 300 (S1755 in FIG. 17).

The AP information may include information necessary for being connected to the AP device 300. The AP information may include information on a communication network (a name and a password) provided from the AP device 300. As an example, the AP information may include a Wi-Fi name and a password.

The address information may include a domain address for being connected to the server 400 through the Internet. Through the address information, the AP device 300 may be connected with the server 400. The AP device 300 may transmit the information to be transmitted from the electronic apparatus 100 or the edge device 200 to the server 400 based on the address information.

The authority information may be transmitted to the server 400 through the edge device 200 and the AP device 300.

If the authority information received from the AP device 300 coincides with the prestored authority information, the server 400 may be connected with the edge device 200.

The at least one processor 111 may transmit the authority information to the edge device 200 through the communication interface 114. If the authority information transmitted to the edge device 200 coincides with the authority information stored in advance in the edge device 200, the edge device 200 may be connected to the AP device 300 by using the AP information included in the connection information. When the edge device 200 and the AP device 300 are connected, the AP device 300 may transmit the authority information to the server 400 based on the address information included in the connection information (S1757 in FIG. 17).

The server 400 may identify whether the authority information received through the AP device 300 is included in a prestored mapping table (S1760 in FIG. 17). If the authority information received through the AP device 300 is included in the prestored mapping table, the server 400 may be connected with the edge device 200. The authority information may be information used in determining whether the edge device 200 is a device that can be connected to the server 400.

In case the authority information is not the predetermined authority information, the at least one processor 111 may control the electronic apparatus 100 to provide guide information for notifying that authority for connecting the edge device 200 to the server 400 does not exist.

As an example, the operation of reviewing the authority information may be performed in the edge device 200. The edge device 200 may obtain authority information in the connection information transmitted from the electronic apparatus 100. The edge device 200 may determine whether the authority information transmitted from the electronic apparatus 100 coincides with the authority information stored in advance in the edge device 200.

If the authority information transmitted from the electronic apparatus 100 does not coincide with the authority information stored in advance in the edge device 200, the edge device 200 may stop and end a series of operations for performing connection with the server 400. The edge device 200 may transmit a notification indicating that authority does not exist to the electronic apparatus 100.

When the notification indicating that authority does not exist is received, the at least one processor 111 may control the electronic apparatus 100 to provide guide information indicating that authority for connecting the edge device 200 to the server 400 does not exist. Explanation in this regard will be described with reference to operations S1752, S1753, and S1754 in FIG. 17 and FIG. 15.

As an example, the operation of reviewing the authority information may be performed in the server 400. The server 400 may determine whether the authority information transmitted through the edge device 200 and the AP device 300 is included in a prestored mapping table.

If the authority information that the electronic apparatus 100 transmitted through the edge device 200 and the AP device 300 is not included in the prestored mapping table, the server 400 may stop and end a series of operations for performing connection with the edge device 200. The server 400 may transmit a notification that authority does not exist to the electronic apparatus 100.

When the notification that authority does not exist is received, the at least one processor 111 may control the electronic apparatus 100 to provide guide information indicating that authority for connecting the edge device 200 to the server 400 does not exist. Explanation in this regard will be described with reference to operations S1760, S1761, S1762, and S1763 in FIG. 17 and FIG. 15.

When a notification for indicating that the edge device 200 was connected to the server 400 is received through the communication interface 114, the at least one processor 111 may control the electronic apparatus 100 to provide guide information for notifying that the edge device 200 was connected to the server 400.

If the authority information that the electronic apparatus 100 transmitted through the edge device 200 and the AP device 300 is included in the prestored mapping table, the server 400 may be connected with the edge device 200. When connection between the edge device 200 and the server 400 is completed, the server 400 may transmit a notification indicating that connection with the edge device 200 was completed to the electronic apparatus 100.

When the notification indicating that connection between the edge device 200 and the server 400 was completed is received, the at least one processor 111 may control the electronic apparatus 100 to provide guide information for notifying completion of connection. Explanation in this regard will be described with reference to operations S1765, S1766, S1768, and S1769 in FIG. 17 and FIG. 16.

The guide information may include at least one of a guide image or guide audio. The guide image may be output through the display or the projection device. The guide audio may be output through the speaker.

When connection between the edge device 200 and the server 400 is released, the at least one processor 111 may obtain information on the location wherein the edge device 200 is arranged from the server 400 through the communication interface 114.

The at least one processor 111 may control the movement device 122 to move the electronic apparatus 100 to the location wherein the edge device 200 is arranged based on the space map stored in the memory 113 and the location information of the edge device 200. After moving to the location wherein the edge device 200 is arranged, the at least one processor 111 may control the electronic apparatus 100 to transmit a signal requesting the connection state of the edge device 200 to the edge device 200. Explanation in this regard will be described with reference to FIG. 19.

The operation of moving to the location wherein the edge device 200 is arranged may include an operation of moving to an area within a threshold distance from the location wherein the edge device 200 is arranged.

The electronic apparatus 100 may include a projection device, and the at least one processor 111 may control the projection device to output guide information. The electronic apparatus 100 may be a movable projector. The electronic apparatus 100 may output a projection image through the projection device. The electronic apparatus 100 may output a projection image including the guide information through the projection device.

The electronic apparatus 100 may automatically perform a connecting operation without a separate user intervention while the edge device 200 is not connected to the server 400 normally. As the electronic apparatus 100 can automatically perform both of an on-boarding operation and a recovering operation, the user's inconvenience can be reduced. The electronic apparatus 100 may be implemented as a movable device, and may directly move to a device of which connection has been cut off. Accordingly, the user does not have to directly move the electronic apparatus 100 or perform a separate recovering act.

The electronic apparatus 100 may identify at least one edge device with which communication is possible through various methods in the surrounding space.

As an example, the electronic apparatus 100 may identify an edge device arranged in a home based on the space map.

As an example, the electronic apparatus 100 may obtain a photographed image including the surrounding space through the camera. The electronic apparatus 100 may identify an object indicating an edge device based on the photographed image. The electronic apparatus 100 may identify the edge device according to identification of the object.

As an example, the electronic apparatus 100 may identify an edge device based on the strength of a signal. Explanation in this regard will be described with reference to FIG. 21.

The electronic apparatus 100 may determine a connection state of the edge device 200 through the camera. The electronic apparatus 100 may obtain a photographed image including the edge device 200. The electronic apparatus 100 may identify an object indicating the edge device 200 in the photographed image. The electronic apparatus 100 may identify a connection state of the edge device 200 based on the identified object. The electronic apparatus 100 may identify an event wherein the power of the edge device 200 is turned off based on the photographed image. If an event wherein the power of the edge device 200 is turned off is identified, the electronic apparatus 100 may transmit a control command for turning on the power of the edge device 200 to the edge device 200.

According to an embodiment, the electronic apparatus 100 may include a display. Specifically, the electronic apparatus 100 may directly display an obtained image or a content on the display.

According to an embodiment, the electronic apparatus 100 may not include a display. The electronic apparatus 100 may be connected with an external display device, and transmit an image or a content stored in the electronic apparatus 100 to the external display device.

The electronic apparatus 100 may transmit an image or a content to the external display device together with a control signal for controlling such that the image or the content is displayed on the external display device. Here, the external display device may be connected with the electronic apparatus 100 through the communication interface 114 or an input/output interface 116.

The electronic apparatus 100 may include only a small-sized display that can display only simple information such as text information, etc. The electronic apparatus 100 may transmit an image or a content to the external display device via wire or wirelessly through the communication interface 114, or transmit them to the external display device through the input/output interface 116.

In some embodiments, the electronic apparatus 100 performs an operation corresponding to a user voice signal received through the microphone 118.

According to an embodiment, the electronic apparatus 100 may control the projection device based on a user voice signal received through the microphone 118. For example, if a user voice signal for displaying an A content is received, the electronic apparatus 100 may control the display to display the A content.

According to an embodiment, the electronic apparatus 100 may control the external display device connected with the electronic apparatus 100 based on a user voice signal received through the microphone 118. Specifically, the electronic apparatus 100 may generate a control signal for controlling the external display device such that an operation corresponding to a user voice signal is performed in the external display device, and transmit the generated control signal to the external display device. Here, the electronic apparatus 100 may store a remote control application for controlling the external display device. Also, the electronic apparatus 100 may transmit the generated control signal to the external display device by using at least one communication method among Bluetooth, Wi-Fi, or infrared rays. For example, if a user voice signal for displaying the A content is received, the electronic apparatus 100 may transmit a control signal for controlling such that the A content is displayed on the external display device to the external display device. Here, the electronic apparatus 100 may correspond to various terminal devices wherein a remote control application can be installed such as a smartphone, an AI speaker, etc.

According to an embodiment, the electronic apparatus 100 may use a remote control device for controlling the external display device connected with the electronic apparatus 100 based on a user voice signal received through the microphone 118. Specifically, the electronic apparatus 100 may transmit a control signal for controlling the external display device such that an operation corresponding to a user voice signal is performed in the external display device to the remote control device. Then, the remote control device may transmit the control signal received from the electronic apparatus 100 to the external display device. For example, if a user voice signal for displaying the A content is received, the electronic apparatus 100 may transmit a control signal for controlling such that the A content is displayed on the external display device to the remote control device, and the remote control device may transmit the received control signal to the external display device.

According to an embodiment, the communication interface 114 may use the same communication module (e.g., a Wi-Fi module) for communicating with an external device such as a remote control device and an external server.

According to an embodiment, the communication interface 114 may use different communication modules for communicating with an external device such as a remote control device and an external server. For example, the communication interface 114 may use at least one of an Ethernet module or a Wi-Fi module for communicating with an external server, or use a Bluetooth module for communicating with an external device such as a remote control device. However, this is merely an embodiment, and the communication interface 114 may use at least one communication module among various communication modules in the case of communicating with a plurality of external devices or external servers.

It was described that the IoT network includes the server 400. According to an embodiment, some operations performed in the server 400 may be performed in the electronic apparatus 100. According to on-device implementation, the electronic apparatus 100 may directly perform some operations performed in the server 400.

Figure 14:
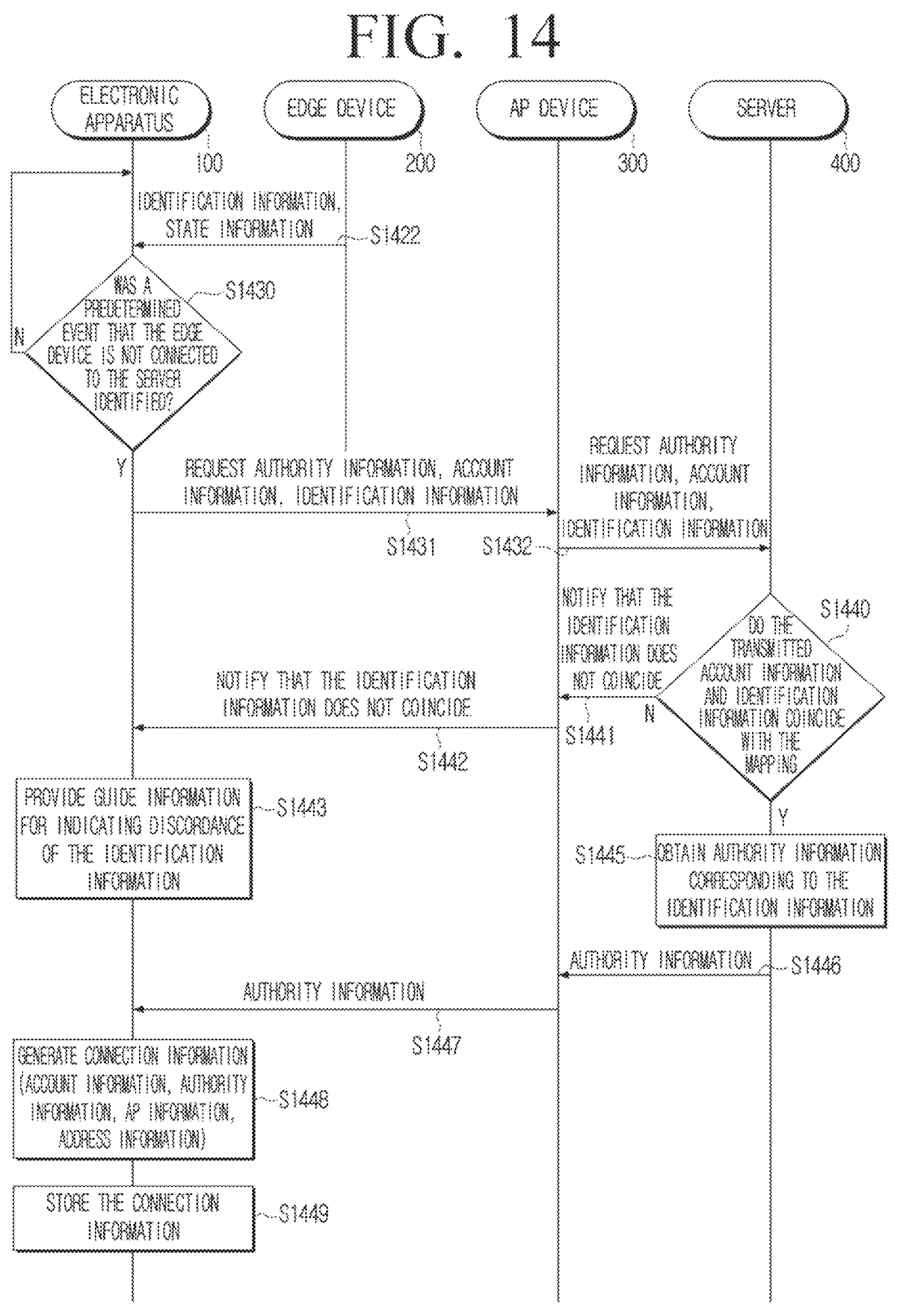

As an example, the electronic apparatus 100 may directly perform the operation S1440 in FIG. 14. The electronic apparatus 100 may store a mapping table. The electronic apparatus 100 may receive a mapping table from the server 400. The electronic apparatus 100 may store account information and identification information of the edge device 200. The electronic apparatus 100 may determine whether the account information and the identification information of the edge device 200 are included in the mapping table.

As an example, the electronic apparatus 100 may directly perform the operation S1445 in FIG. 14. The electronic apparatus 100 may store an authority table. The electronic apparatus 100 may receive the authority table from the server 400. If the identification information of the edge device 200 and the account information are included in the mapping table, the electronic apparatus 100 may obtain authority information corresponding to the edge device 200 from the authority table.

Figure 3:
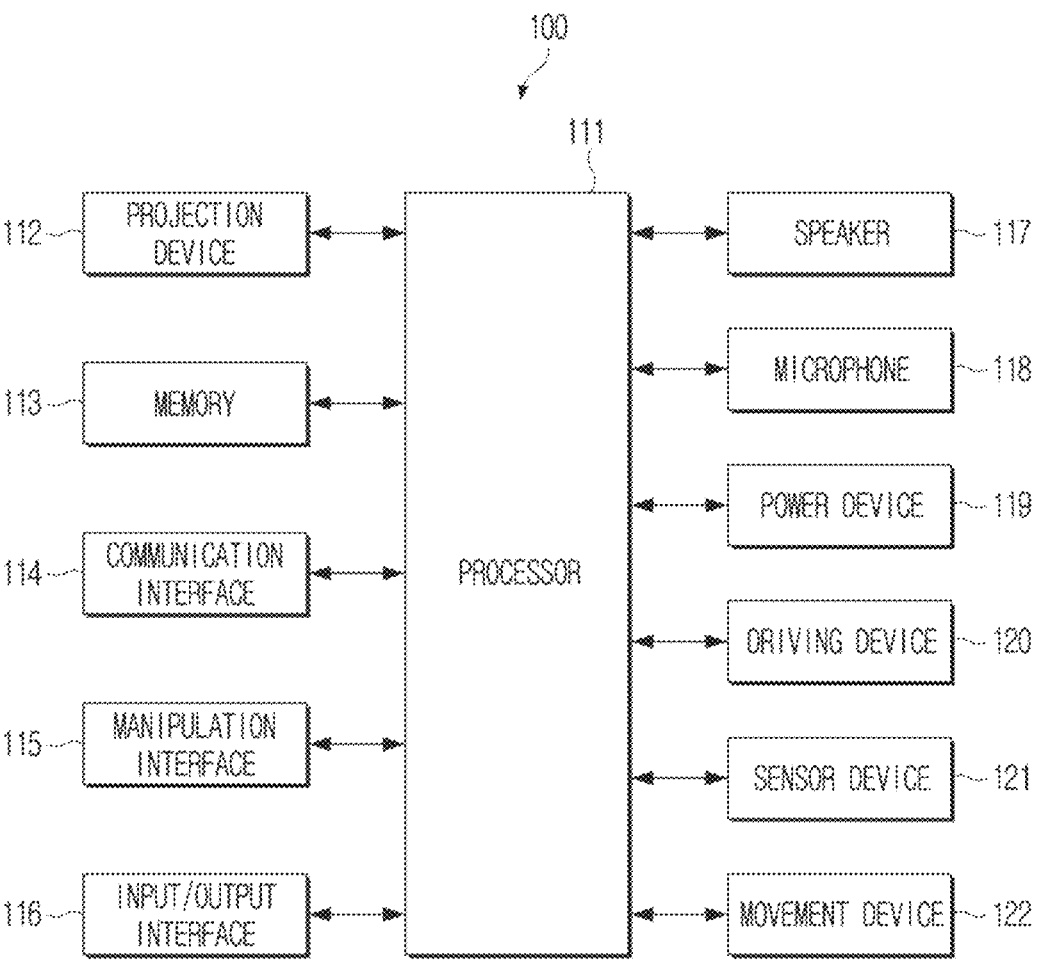
FIG. 3 is a block diagram for illustrating a detailed configuration of the electronic apparatus in FIG. 2 according to an embodiment.

FIG. 3 is a block diagram for illustrating a detailed configuration of the electronic apparatus 100 in FIG. 2 according to an embodiment.

Referring to FIG. 3, the electronic apparatus 100 may include at least one of at least one processor 111, a projection device 112, memory 113, a communication interface 114, a manipulation interface 115, an input/output interface 116, a speaker 117, a microphone 118, a power device 119, a driving device 120, a sensor device 121, or a movement device 122.

The components illustrated in FIG. 3 are merely one of various embodiments, and some components may be omitted, or new components may be added. Also, the content already explained in FIG. 2 will be omitted.

The at least one processor 111 may be implemented as a digital signal processor (DSP) processing digital signals, a microprocessor, and a time controller (TCON). However, the disclosure is not limited thereto, and the at least one processor 111 may include one or more of a central processing unit (CPU), a micro controller unit (MCU), a micro processing unit (MPU), a controller, an application processor, a graphics-processing unit (GPU) or a communication processor (CP), an advanced reduced instruction set computer (RISC) machines (ARM) processor, or may be defined by the terms. Also, the at least one processor 111 may be implemented as a system on chip (SoC) having a processing algorithm stored therein or large scale integration (LSI), or in the form of a field programmable gate array (FPGA). The at least one processor 111 may perform various functions by executing computer executable instructions stored in the memory 113.

The projection device 112 is a component that projects an image to the outside. The projection device 112 according to the various embodiments of the disclosure may be implemented by various projection methods (e.g., a cathode-ray tube (CRT) method, a liquid crystal display (LCD) method, a digital light processing (DLP) method, a laser method, etc.). As an example, the CRT method has basically the same principle as a CRT monitor. In the CRT method, an image is enlarged to a lens in front of a cathode-ray tube (CRT), and the image is displayed on a screen. According to the number of cathode-ray tubes, the CRT method is divided into an one-tube method and a three-tube method, and in the case of the three-tube method, the method may be implemented while cathode-ray tubes of red, green, and blue colors are separated from one another.

As another example, the LCD method is a method of displaying an image by making a light output from a light source pass (i.e., a backlight) through a liquid crystal display. The LCD method is divided into a single-plate method and a three-plate method, and in the case of the three-plate method, a light output from a light source may be divided into red, green, and blue colors in a dichroic mirror (a mirror that reflects only lights of specific colors, and makes the rest pass through), and pass through a liquid crystal display, and then the lights may be gathered in one place.

As still another example, the DLP method is a method of displaying an image by using a digital micromirror device (DMD) chip. A projection device by the DLP method may include a light source, a color wheel, a DMD chip, a projection lens, etc. A light output from the light source may show a color as it passes through the rotating color wheel. The light that passed through the color wheel is input into the DMD chip. The DMD chip includes numerous micromirrors, and reflects the light input into the DMD chip. The projection lens may perform a role of enlarging the light reflected from the DMD chip to an image size.

As still another example, the laser method includes a diode pumped solid state (DPSS) laser and a galvanometer. As lasers outputting various colors, lasers wherein three DPSS lasers are installed for each of R, G, and B colors, and then their optical axes are overlapped by using a special mirror are used. The galvanometer includes a mirror and a motor of a high output, and moves the mirror at a fast speed. For example, the galvanometer may rotate the mirror at 40 KHz/sec at the maximum. The galvanometer is mounted according to a scanning direction, and in general, a projector performs plane scanning, and thus the galvanometer may also be arranged while being divided into x and y axes.

The projection device 112 may include various types of light sources. For example, the projection device 112 may include at least one light source among a lamp, LEDs, and laser.

The projection device 112 may output an image in a screen ratio of 4:3, a screen ratio of 5:4, and a wide screen ratio of 16:9 according to the use of the electronic apparatus 100 or the user's setting, etc., and output an image in various resolutions such as WVGA (854*480), SVGA (800*600), XGA (1024*768), WXGA 1280*720), WXGA (1280*800), SXGA (1280*1024), UXGA (1600*1200), Full HD (1920*1080), etc., according to screen ratios.

The projection device 112 may perform various functions for adjusting an output image by control by the at least one processor 111. For example, the projection device 112 may perform functions such as zoom, keystone, quick corner (four corner) keystone, lens shift, etc.

Specifically, the projection device 112 may enlarge or reduce an image according to a distance from a screen (a projection distance). That is, a zoom function may be performed according to a distance from a screen. Here, the zoom function may include a hardware method of adjusting the size of a screen by moving a lens and a method of adjusting the size of a screen by cropping an image, etc. When the zoom function is performed, adjustment of a focus of an image is needed. For example, methods of adjusting a focus includes a manual focus method, an electric method, etc. The manual focus method indicates a method of adjusting a focus manually, and the electric method indicates a method wherein, when the zoom function is performed, the projector automatically adjusts a focus by using a built-in motor. When performing the zoom function, the projection device 112 may provide a digital zoom function, or an optical zoom function of performing a zoom function by moving the lens through the driving device 120.

The projection device 112 may perform a keystone correction function. A screen may be distorted in an upper direction or a lower direction if the height is not matched in front surface projection. The keystone correction function indicates a function of correcting a distorted screen. For example, if a distortion occurs in a left-right direction of a screen, the screen may be corrected by using horizontal keystone, and if a distortion occurs in an up-down direction, the screen may be corrected by using vertical keystone. The quick corner (four corner) keystone correction function is a function of correcting a screen in case the central area of the screen is normal, but the corner areas are out of balance. The lens shift function is a function of moving a screen as it is in case the screen is beyond the range of the screen.

The projection device 112 may perform the zoom/keystone/focus functions by automatically analyzing the ambient environment and the projection environment without a user input. Specifically, the projection device 112 may automatically provide the zoom/keystone/focus functions based on the distance between the electronic apparatus 100 and the screen detected through the sensor (a depth camera, a distance sensor, an infrared sensor, an illumination sensor, etc.), information on the space wherein the electronic apparatus 100 is currently located, information on the ambient light amount, etc.

The projection device 112 may include a light source, and may provide an illumination function by using the light source. In particular, the projection device 112 may provide an illumination function by outputting a light source by using LEDs. According to an embodiment, the projection device 112 may include one LED, and according to another embodiment, the electronic apparatus 100 may include a plurality of LEDs. According to some embodiments, the projection device 112 may output a light source by using a surface emitting LED. A surface emitting LED may indicate an LED having a structure wherein an optical sheet is arranged on the upper side of the LED such that a light source is evenly dispersed and output. Specifically, if a light source is output through an LED, the light source may be evenly dispersed through an optical sheet, and the light source dispersed through the optical sheet may be incident on a display panel.

The projection device 112 may provide a dimming function for adjusting the strength of a light source to the user. Specifically, if a user input for adjusting the strength of a light source is received from the user through the manipulation interface 115 (e.g., a touch display button or a dial), the projection device 112 may control the LEDs to output the strength of the light source corresponding to the received user input.

The projection device 112 may provide the dimming function based on a content analyzed by the at least one processor 111 without a user input. Specifically, the projection device 112 may control the LEDs to output the strength of a light source based on information on the currently provided content (e.g., the content type, the content brightness, etc.).

The projection device 112 may control the color temperature by control by the at least one processor 111. The at least one processor 111 may control the color temperature based on a content. Specifically, if it is identified that a content is to be output, the at least one processor 111 may obtain the color information for each frame of the content of which output has been determined. Then, the at least one processor 111 may adjust the color temperature based on the obtained color information for each frame. The at least one processor 111 may obtain at least one main color of the frames based on the color information for each frame. Then, the at least one processor 111 may adjust the color temperature based on the obtained at least one main color. For example, the color temperature that can be adjusted by the at least one processor 111 may be divided into a warm type or a cold type. It is assumed that a frame to be output (referred to as an output frame hereinafter) includes a scene wherein fire broke out. The at least one processor 111 may identify (or obtain) that the main color is a red color based on the color information included in the current output frame. Then, the at least one processor 111 may identify a color temperature corresponding to the identified main color (red). The color temperature corresponding to the red color may be the warm type. The at least one processor 111 may use an artificial intelligence model for obtaining the color information or the main color of a frame. According to an embodiment, the artificial intelligence model may be stored in the electronic apparatus 100 (e.g., the memory 113). According to another embodiment, the artificial intelligence model may be stored in an external server that can communicate with the electronic apparatus 100.

The memory 113 may be implemented as internal memory such as read-only memory (ROM) (e.g., electrically erasable programmable read-only memory (EEPROM)), random access memory (RAM), etc., included in the at least one processor 111, or implemented as separate memory from the at least one processor 111. In this case, the memory 113 may be implemented in the form of memory embedded in the electronic apparatus 100, or implemented in the form of memory that can be attached to or detached from the electronic apparatus 100 according to the use of stored data. For example, in the case of data for driving the electronic apparatus 100, the data may be stored in memory embedded in the electronic apparatus 100, and in the case of data for an extended function of the electronic apparatus 100, the data may be stored in memory that can be attached to or detached from the electronic apparatus 100.

In the case of memory embedded in the electronic apparatus 100, the memory may be implemented as at least one of volatile memory (e.g.: dynamic RAM (DRAM), static RAM (SRAM), or synchronous dynamic RAM (SDRAM), etc.), non-volatile memory (e.g.: one time programmable ROM (OTPROM), programmable ROM (PROM), erasable and programmable ROM (EPROM), electrically erasable and programmable ROM (EEPROM), mask ROM, flash ROM, flash memory (e.g.: NAND flash or NOR flash, etc.), a hard drive, or a solid state drive (SSD). Also, in the case of memory that can be attached to or detached from the electronic apparatus 100, the memory may be implemented in forms such as a memory card (e.g., compact flash (CF), secure digital (SD), micro secure digital (Micro-SD), mini secure digital (Mini-SD), extreme digital (xD), a multimedia card (MMC), etc.) and external memory that can be connected to a USB port (e.g., a USB memory), etc.

In the memory 113, at least one instruction related to the electronic apparatus 100 may be stored. Also, in the memory 113, an operating system (O/S) for driving the electronic apparatus 100 may be stored. In addition, in the memory 113, various kinds of software programs or applications for the electronic apparatus 100 to operate may be stored. Further, the memory 113 may include semiconductor memory such as flash memory or a magnetic storage medium such as a hard disk, etc.

Specifically, in the memory 113, various kinds of modules for the electronic apparatus 100 to operate according to an embodiment of the disclosure may be stored, and the at least one processor 111 may control the operations of the electronic apparatus 100 by executing the various kinds of modules stored in the memory 113. That is, the memory 113 may be accessed by the at least one processor 111, and reading/recording/correction/deletion/update, etc. of data by the at least one processor 111 may be performed.

In the disclosure, the term memory 113 may refer to a storage, ROM and RAM inside the at least one processor 111, or a memory card (e.g., a micro SD card, a memory stick) installed on the electronic apparatus 100.

The communication interface 114 is a component performing communication with various types of external devices according to various types of communication methods. The communication interface 114 may include a wireless communication module or a wired communication module. Each communication module may be implemented in a form of at least one hardware chip.

A wireless communication module may be a module that communicates with an external device wirelessly. For example, a wireless communication module may include at least one module among a Wi-Fi module, a Bluetooth module, an infrared communication module, or other communication modules.

A Wi-Fi module and a Bluetooth module may perform communication by a Wi-Fi method and a Bluetooth method, respectively. In the case of using a Wi-Fi module or a Bluetooth module, various types of connection information such as a service set identifier (SSID) and a session key is transmitted and received first, and connection of communication may be performed by using the information, and various types of information can be transmitted and received thereafter.

An infrared communication module performs communication according to an infrared Data Association (IrDA) technology of transmitting data to a near field wirelessly by using infrared rays between visible rays and millimeter waves.

Other communication modules may include at least one communication chip that performs communication according to various wireless communication protocols such as Zigbee, 3rd Generation (3G), 3rd Generation Partnership Project (3GPP), Long Term Evolution (LTE), LTE Advanced (LTE-A), 4th Generation (4G), 5th Generation (5G), etc. other than the aforementioned communication methods.

A wired communication module may be a module that communicates with an external device via wire. For example, a wired communication module may include at least one of a local area network (LAN) module, an Ethernet module, a pair cable, a coaxial cable, an optical fiber cable, or an ultra wide-band (UWB) module.

The manipulation interface 115 may include various types of input devices. For example, the manipulation interface 115 may include physical buttons. Here, the physical buttons may include function keys, direction keys (e.g., four direction keys), or dial buttons. According to an embodiment, the physical buttons may be implemented as a plurality of keys. According to another embodiment, the physical buttons may be implemented as one key. In case the physical buttons are implemented as one key, the electronic apparatus 100 may receive a user input by which one key is pushed during a threshold time or longer. If a user input by which one key is pushed during a threshold time or longer is received, the at least one processor 111 may perform a function corresponding to the user input. For example, the at least one processor 111 may provide an illumination function based on the user input.

The manipulation interface 115 may receive a user input by using a non-contact method. In the case of receiving a user input through a contact method, physical force should be transmitted to the electronic apparatus 100. Accordingly, a method for controlling the electronic apparatus 100 regardless of physical force may be needed. Specifically, the manipulation interface 115 may receive a user gesture, and perform an operation corresponding to the received user gesture. The manipulation interface 115 may receive a user's gesture through a sensor (e.g., an image sensor or an infrared sensor).

The manipulation interface 115 may receive a user input by using a touch method. For example, the manipulation interface 115 may receive a user input through a touch sensor. According to an embodiment, the touch method may be implemented as a non-contact method. For example, the touch sensor may determine whether the user's body approached within a threshold distance. The touch sensor may identify a user input even when the user does not contact the touch sensor. According to another implementation example, the touch sensor may identify a user input by which the user contacts the touch sensor.

The electronic apparatus 100 may receive a user input by various methods other than the aforementioned manipulation interface 115. According to various embodiments, the electronic apparatus 100 may receive a user input through an external remote control device. The external remote control device may be a remote control device corresponding to the electronic apparatus 100 (e.g., a dedicated control device of the electronic apparatus 100) or the user's portable communication device (e.g., a smartphone or a wearable device). In the user's portable communication device, an application for controlling the electronic apparatus 100 may be stored. The portable communication device may obtain a user input through a stored application, and transmit the obtained user input to the electronic apparatus 100. The electronic apparatus 100 may receive a user input from the portable communication device, and perform an operation corresponding to a control command of the user.

The electronic apparatus 100 may receive a user input by using voice recognition. According to an embodiment, the electronic apparatus 100 may receive a user voice through the microphone included in the electronic apparatus 100. According to another embodiment, the electronic apparatus 100 may receive a user voice from the microphone or the external device. Specifically, the external device may obtain a user voice through a microphone of the external device, and transmit the obtained user voice to the electronic apparatus 100. The user voice transmitted from the external device may be audio data or digital data converted from audio data (e.g., audio data converted to a frequency domain, etc.). The electronic apparatus 100 may perform an operation corresponding to the received user voice. Specifically, the electronic apparatus 100 may receive audio data corresponding to the user voice through the microphone. Then, the electronic apparatus 100 may convert the received audio data into digital data. Then, the electronic apparatus 100 may convert the converted digital data into text data by using a speech to text (STT) function. According to an embodiment, the speech to text (STT) function may be directly performed at the electronic apparatus 100.

According to another embodiment, the speech to text (STT) function may be performed at an external server. The electronic apparatus 100 may transmit digital data to the external server. The external server may convert the digital data into text data, and obtain control command data based on the converted text data. The external server may transmit the control command data (here, the text data may also be included) to the electronic apparatus 100. The electronic apparatus 100 may perform an operation corresponding to the user voice based on the obtained control command data.

The electronic apparatus 100 may provide a voice recognition function by using one assistant (or an artificial intelligence agent, e.g., Bixby™, etc.), but this is merely one of various examples, and the electronic apparatus 100 may provide the voice recognition function through a plurality of assistants. Here, the electronic apparatus 100 may provide the voice recognition function by selecting one of the plurality of assistants based on a trigger word corresponding to the assistant or a specific key existing on a remote control.

The electronic apparatus 100 may receive a user input by using a screen interaction. The screen interaction may indicate a function by which the electronic apparatus 100 identifies whether a predetermined event occurs through an image projected on a screen (or a projection surface), and obtains a user input based on the predetermined event. The predetermined event may be an event wherein a predetermined object is identified in a specific location (e.g., a location on which a UI for receiving a user input was projected). The predetermined object may include at least one of a body part of the user (e.g., a finger), a pointer, or a laser point. If the predetermined object is identified in the location corresponding to the projected UI, the electronic apparatus 100 may identify that a user input selecting the projected UI was received. For example, the electronic apparatus 100 may project a guide image such that a UI is displayed on the screen. Then, the electronic apparatus 100 may identify whether the user selects the projected UI. Specifically, if the predetermined event is identified in the location of the projected UI, the electronic apparatus 100 may identify that the user selected the projected UI. The projected UI may include at least one item. The electronic apparatus 100 may perform space analysis for identifying whether the predetermined event is in the location of the projected UI. The electronic apparatus 100 may perform space analysis through a sensor (e.g., an image sensor, an infrared sensor, a depth camera, a distance sensor, etc.). The electronic apparatus 100 may identify whether the predetermined event occurs in the specific location (the location on which the UI is projected) by performing space analysis. Then, if it is identified that the predetermined event occurs in the specific location (the location on which the UI is projected), the electronic apparatus 100 may identify that a user input for selecting the UI corresponding to the specific location was received.

The input/output interface 116 is a component for inputting or outputting at least one of an audio signal or an image signal. The input/output interface 116 may receive input of at least one of an audio signal or an image signal from the external device, and output a control command to the external device.

According to some embodiments, the input/output interface 116 may be implemented as an interface inputting or outputting only audio signals and an interface inputting or outputting only image signals, or implemented as one interface inputting or outputting both audio signals and image signals.

The input/output interface 116 according to the various embodiments of the disclosure may be implemented as a wired input/output interface of at least one of a high definition multimedia interface (HDMI), a mobile high-definition link (MHL), a universal serial bus (USB), a USB C-type, a display port (DP), a Thunderbolt, a video graphics array (VGA) port, an RGB port, a D subminiature (D-SUB), or a digital visual interface (DVI). According to an embodiment, the wired input/output interface may be implemented as an interface inputting or outputting only audio signals and an interface inputting or outputting only image signals, or implemented as one interface inputting or outputting both audio signals and image signals.

The electronic apparatus 100 may receive data through the wired input/output interface, but this is merely one of various examples, and the electronic apparatus 100 may be provided with power through the wired input/output interface. For example, the electronic apparatus 100 may be provided with power from an external battery through a USB C-type, or may be provided with power from a consent through a power adapter. As another example, the electronic apparatus 100 may be provided with power from an external device (e.g., a laptop or a monitor, etc.) through a DP.

The electronic apparatus 100 may be implemented such that an audio signal is input through the wired input/output interface, and an image signal is input through the wireless input/output interface (or the communication interface). Alternatively, the electronic apparatus 100 may be implemented such that an audio signal is input through the wireless input/output interface (or the communication interface), and an image signal is input through the wired input/output interface.

The electronic apparatus 100 may transmit at least one of an audio signal or a video signal to an external device (e.g., an external display device or an external speaker) through the input/output interface 116. Specifically, an output port included in the input/output interface 116 may be connected to the external device, and the electronic apparatus 100 may transmit at least one of an audio signal or a video signal to the external device through the output port.

Here, the input/output interface 116 may be connected with the communication interface. The input/output interface 116 may transmit information received from the external device to the communication interface, or transmit information received through the communication interface to the external device.

The speaker 117 is a component outputting an audio signal. In particular, the speaker 117 may include an audio output mixer, an audio signal processor, and an audio output module. The audio output mixer may synthesize a plurality of audio signals to be output into at least one audio signal. For example, the audio output mixer may synthesize an analog audio signal and another analog audio signal (e.g.: an analog audio signal received from the outside) into at least one analog audio signal. The audio output module may include a speaker or an output terminal. According to various embodiments, the audio output module may include a plurality of speakers, and in this case, the audio output module may be arranged inside the main body, and audio that is emitted while covering at least a portion of the diaphragm of the audio output module may pass through a waveguide, and may be transmitted to the outside of the main body. The audio output module may include a plurality of audio output units, and as the plurality of audio output units are symmetrically arranged on the exterior of the main body, audio may be emitted in all directions, i.e., all directions in 360 degrees.

The microphone 118 is a component for receiving input of a user voice or other sounds, and converting them into audio data. The microphone 118 may receive a user's voice in an activated state. For example, the microphone 118 may be formed as an integrated type integrated to the upper side or the front surface direction, the side surface direction, etc. of the electronic apparatus 100. The microphone 118 may include various components such as a microphone collecting a user voice in an analog form, an amp circuit amplifying the collected user voice, an A/D conversion circuit that samples the amplified user voice and converts the user voice into a digital signal, a filter circuit that removes noise components from the converted digital signal, etc.

The power device 119 may be provided with power from the outside, and provide the power to the various components of the electronic apparatus 100. The power device 119 according to the various embodiments of the disclosure may be provided with power through various methods. According to the various embodiments, the power device 119 may be provided with power by using a DC power code of 220V. However, the disclosure is not limited thereto, and electronic apparatus 100 may be provided with power by using a USB power code, or provided with power by using a wireless charging method.

The power device 119 may be provided with power by using an internal battery or an external battery. The power device 119 according to the various embodiments of the disclosure may be provided with power through an internal battery. As an example, the power device 119 may charge the power of the internal battery by using at least one of a DC power code of 220V, a USB power code, or a USB C-type power code, and may be provided with power through the charged internal battery. The power device 119 according to the various embodiments of the disclosure may be provided with power through an external battery. As an example, if connection between the electronic apparatus 100 and the external battery is performed through various wired communication methods such as a USB power code, a USB C-type power code, a socket groove, etc., the power device 119 may be provided with power through the external battery. That is, the power device 119 may be directly provided with power from the external battery, or charge the internal battery through the external battery, and may be provided with power from the charged internal battery.

The power device 119 according to the disclosure may be provided with power by using at least one of the aforementioned plurality of power supply methods.

With respect to power consumption, the electronic apparatus 100 may have power consumption of a predetermined value (e.g., 43 W) or lower due to the socket form, other standards, etc. Here, the electronic apparatus 100 may vary power consumption to reduce the power consumption when using the battery. That is, the electronic apparatus 100 may vary power consumption based on the power supply method, the power usage amount, or the like.

The driving device 120 may drive at least one hardware component included in the electronic apparatus 100. The driving device 120 may generate physical force, and transmit the force to at least one hardware component included in the electronic apparatus 100.

The driving device 120 may generate driving power for a moving operation of a hardware component included in the electronic apparatus 100 (e.g., moving of the electronic apparatus 100) or a rotating operation of a component (e.g., rotation of the projection lens).

The driving device 120 may adjust a projection angle of the projection device 112. Also, the driving device 120 may move the location of the electronic apparatus 100. The driving device 120 may control the movement device for moving the electronic apparatus 100. For example, the driving device 120 may include a motor, and may control the movement device by using the motor.

The sensor device 121 may include at least one sensor. Specifically, the sensor device 121 may include at least one of a tilt (i.e., orientation) senor that senses the tilt of the electronic apparatus 100 or an image sensor that photographs an image. The tilt sensor may include an acceleration sensor or a gyro sensor, and the image sensor may include a camera or a depth camera. The tilt sensor may also be described as a motion sensor. The sensor device 121 may include various sensors other than a tilt sensor or an image sensor. For example, the sensor device 121 may include an illumination sensor and a distance sensor. The distance sensor may be a Time of Flight (ToF) sensor. Also, the sensor device 121 may include a LIDAR sensor.

The electronic apparatus 100 may control the illumination function by being interlocked with an external device. Specifically, the electronic apparatus 100 may receive illumination information from an external device. The illumination information may include at least one of brightness information or color temperature information set in the external device. The external device may be a device connected to the same network as the electronic apparatus 100 (e.g., an IoT device included in the same home/company network) or a device that is not connected to the same network as the electronic apparatus 100 but can communicate with the electronic apparatus 100 (e.g., a remote control server). For example, it is assumed that an external illumination device (an IoT device) included in the same network as the electronic apparatus 100 is outputting a red lighting at the brightness of 50. The external illumination device (an IoT device) may directly or indirectly transmit illumination information (e.g., information that the red lighting is being output at the brightness of 50) to the electronic apparatus 100. The electronic apparatus 100 may control an output of a light source based on the illumination information received from the external illumination device. For example, if the illumination information received from the external illumination device includes information that the red lighting is being output at the brightness of 50, the electronic apparatus 100 may output the red lighting at the brightness of 50.

The electronic apparatus 100 may control the illumination function based on biometric information. Specifically, the at least one processor 111 may obtain the biometric information of the user. The biometric information may include at least one of the body temperature, the heart rate, the blood pressure, the breathing, or the electrocardiogram of the user. The biometric information may include various kinds of information other than the aforementioned information. As an example, the electronic apparatus 100 may include a sensor for measuring biometric information. The at least one processor 111 may obtain the biometric information of the user through the sensor, and control an output of a light source based on the obtained biometric information. As another example, the at least one processor 111 may receive biometric information from an external device through the input/output interface 116. The external device may be a portable communication device (e.g., a smartphone or a wearable device) of the user. The at least one processor 111 may obtain the biometric information of the user from the external device, and control an output of a light source based on the obtained biometric information. According to some embodiments, the electronic apparatus 100 may identify whether the user is sleeping, and if it is identified that the user is sleeping (or is preparing to sleep), the at least one processor control an output of a light source based on the biometric information of the user.

The electronic apparatus 100 according to the various embodiments of the disclosure may provide various smart functions.

Specifically, the electronic apparatus 100 may be connected to a portable terminal device for controlling the electronic apparatus 100, and the screen output from the electronic apparatus 100 may be controlled through a user input that is input into the portable terminal device. As an example, the portable terminal device may be implemented as a smartphone including a touch display, and the electronic apparatus 100 may receive screen data provided by the portable terminal device from the portable terminal device and output the data, and the screen output from the electronic apparatus 100 may be controlled according to a user input that is input into the portable terminal device.

The electronic apparatus 100 may perform connection to the portable terminal device through various communication methods such as Miracast, Airplay, wireless DEX, a remote PC method, etc., and may share a content or music provided by the portable terminal device.

In addition, connection between the portable terminal device and the electronic apparatus 100 may be performed by various connection methods. According to various embodiments, the portable terminal device may search for the electronic apparatus 100 and perform wireless connection therebetween, or the electronic apparatus 100 may search for the portable terminal device and perform wireless connection therebetween. Further, the electronic apparatus 100 may output a content provided by the portable terminal device.

According to various embodiments, while a specific content or music is being output from the portable terminal device, if the portable terminal device is positioned around the electronic apparatus 100 and then a predetermined gesture (e.g., a motion tap view) is detected through the display of the portable terminal device, the electronic apparatus 100 may output the content or music that is being output from the portable terminal device.

According to various embodiments, while a specific content or music is being output from the portable terminal device, if the portable terminal device becomes close to the electronic apparatus 100 by a predetermined distance or less (e.g., a non-contact tap view), or the portable terminal device contacts the electronic apparatus 100 twice at short intervals (e.g., a contact tap view), the electronic apparatus 100 may output the content or music that is being output from the portable terminal device.

Above, it was described that a screen identical to the screen that is being provided on the portable terminal device is provided on the electronic apparatus 100, but the disclosure is not limited thereto. That is, if connection between the portable terminal device and the electronic apparatus 100 is established, a first screen provided by the portable terminal device may be output on the portable terminal device, and a second screen provided by the portable terminal device, which is different from the first screen, may be output on the electronic apparatus 100. As an example, the first screen may be a screen provided by a first application installed in the portable terminal device, and the second screen may be a screen provided by a second application installed in the portable terminal device. As an example, the first screen and the second screen may be screens different from each other that are provided by one application installed in the portable terminal device. In addition, as an example, the first screen may be a screen including a UI in a remote controller form for controlling the second screen.

The electronic apparatus 100 according to embodiments may output a standby screen. As an example, the electronic apparatus 100 may output a standby screen in case connection between the electronic apparatus 100 and an external device was not performed or there was no input received from an external device during a predetermined time. A condition for the electronic apparatus 100 to output a standby screen is not limited to the aforementioned example, and a standby screen may be output by various conditions.

The electronic apparatus 100 may output a standby screen in the form of a blue screen, but the disclosure is not limited thereto. As an example, the electronic apparatus 100 may obtain an atypical object by extracting only the shape of a specific object from data received from an external device, and output a standby screen including the obtained atypical object.

The electronic apparatus 100 may further include a display.

The display may be implemented as displays in various forms such as a liquid crystal display (LCD), an organic light emitting diodes (OLED) display, a plasma display panel (PDP), etc. Inside the display, driving circuits that may be implemented in forms such as an amorphous silicon thin film transistor (a-si TFT), a low temperature poly silicon (LTPS) TFT, an organic TFT (OTFT), etc., and a backlight device, etc. may also be included. The display may be implemented as a touch screen combined with a touch sensor, a flexible display, a three-dimensional (3D) display, etc. Also, the display according to the various embodiments of the disclosure may include not only a display panel outputting images, but also a bezel housing the display panel. In particular, a bezel according to the various embodiments of the disclosure may include a touch sensor for detecting user interactions.

The electronic apparatus 100 may further include a shutter device.

The shutter device may include at least one of a shutter, a fixing element, a rail, or a body.

The shutter may block light output from the projection device 112. The fixing element may fix the location of the shutter. The rail may be a route through which the shutter and the fixing element are moved. The body may be a component including the shutter and the fixing element.

The movement device 122 may be an element for moving from the first location to the second location in the space wherein the electronic apparatus 100 is arranged. The electronic apparatus 100 may control the movement device 122 to move the electronic apparatus 100 by using force generated in the driving device 120. The electronic apparatus 100 may generate force to be transmitted to the movement device 122 by using a motor included in the driving device 120.

The movement device 122 may include at least one wheel (e.g., a circular wheel), tires or treads, as well as a suspension and braking system. The electronic apparatus 100 may move to a target location (or destination location) through the movement device. When a user input or a control command is received, the electronic apparatus 100 may rotate a wheel of the movement device 122 by transmitting the force generated through the motor to the wheel. The electronic apparatus 100 may control the movement device 122 for adjusting the rotation speed, the rotation direction, etc. The electronic apparatus 100 may perform a moving operation (or a moving function) by controlling the movement device 122 based on the target location or the proceeding direction, etc.

Figure 4:
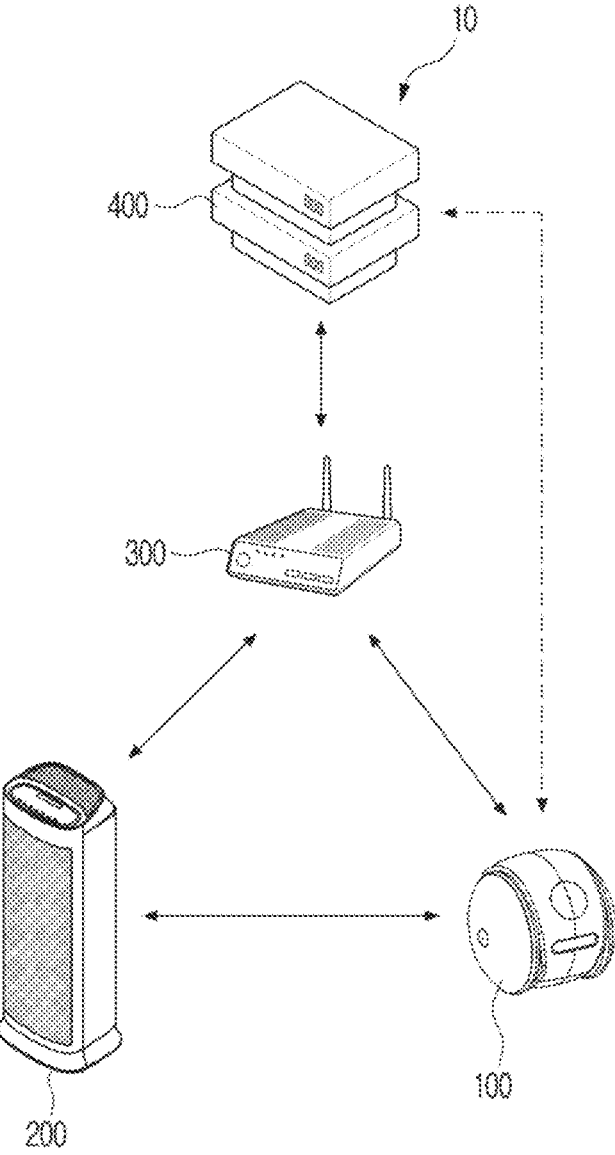
FIG. 4 is a diagram for illustrating an Internet of Things (IoT) network according to an embodiment.

FIG. 4 is a diagram for illustrating the IoT network 10 according to an embodiment.

Referring to FIG. 4, the IoT network 10 may include at least one of an electronic apparatus 100, an edge device 200, an AP device 300, or a server 400.

The IoT network 10 may be a network for controlling at least one IoT device. The at least one IoT device may be a device constituting the IoT network 10. The at least one IoT device may include the edge device 200.

The electronic apparatus 100 may be a movable device. For example, the electronic apparatus 100 may be implemented as a movable projector.

According to an embodiment, the electronic apparatus 100 and the edge device 200 may perform direct communication. As an example, the electronic apparatus 100 and the edge device 200 may be connected with each other by using a short-range wireless communication method, such as a Bluetooth communication method. The Bluetooth communication method may include a Bluetooth low energy (BLE) communication method. As an example, the electronic apparatus 100 and the edge device 200 may be connected with each other by using a Wi-Fi communication method.

According to an embodiment, the electronic apparatus 100 and the edge device 200 may perform communication through the AP device 300. Explanation in this regard will be described with reference to FIG. 24.

According to an embodiment, the electronic apparatus 100 may be connected with the server 400 without using the AP device 300. For example, the electronic apparatus 100 may perform communication with the server 400 according to various wireless communication protocols such as Zigbee, 3rd Generation (3G), 3rd Generation Partnership Project (3GPP), Long Term Evolution (LTE), LTE Advanced (LTE-A), 4th Generation (4G), 5th Generation (5G), etc.

The electronic apparatus 100 and the edge device 200 may be connected to the AP device 300. For example, the electronic apparatus 100 and the edge device 200 may be connected to the AP device 300 through a Wi-Fi communication method.

The AP device 300 may be a device for connecting at least one of the electronic apparatus 100 or the edge device 200 with the server 400. The AP device 300 may include a router. The AP device 300 may be described as a repeater, etc. The AP device 300 may be connected with the server 400. The AP device 300 may be connected with the server 400 through a wired communication method. The wired communication module may include at least one of a local area network (LAN) module, an Ethernet module, a pair cable, a coaxial cable, an optical fiber cable, or an ultra wide-band (UWB) module.

The server 400 may be a server that manages IoT devices. Also, the server 400 may be a server that manages the electronic apparatus 100 and the edge device 200. The server 400 may include a cloud server. The server 400 may be described as an IoT server.

The electronic apparatus 100 may be connected with a remote control device. The remote control device may indicate a portable device for controlling the electronic apparatus 100. The remote control device may receive a user input for controlling the electronic apparatus 100. The remote control device may transmit a signal indicating the user input to the electronic apparatus 100.

As an example, the remote control device may receive a user instruction for moving the electronic apparatus 100. The remote control device may transmit a signal indicating the user instruction to the electronic apparatus 100. The electronic apparatus 100 may identify the user instruction based on the signal, and perform a moving function based on the user instruction received from the remote control device.

According to an embodiment, the remote control device may be a dedicated device only for the electronic apparatus 100.

Figure 22:
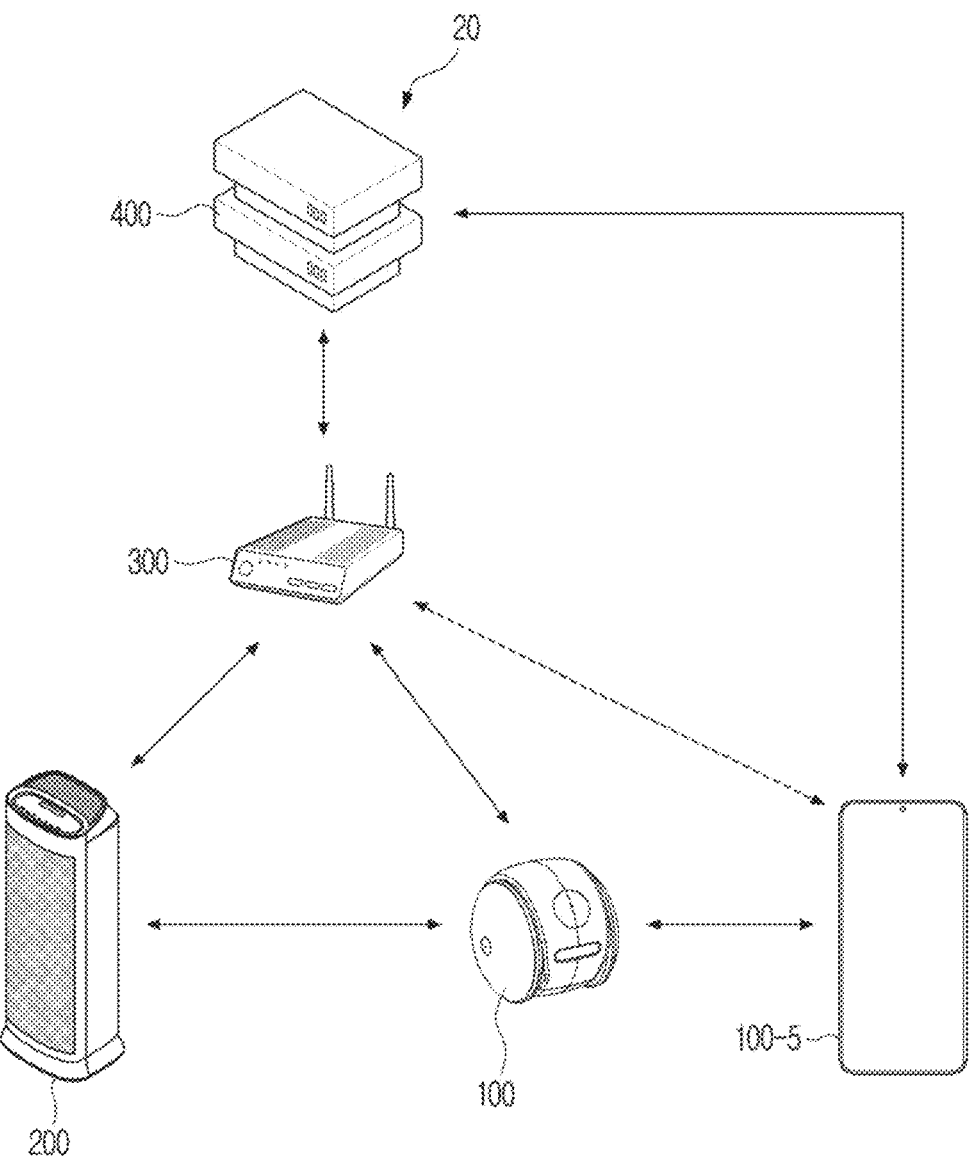
FIG. 22 is a diagram for illustrating an operation of using a terminal device according to an embodiment.

According to an embodiment, the remote control device may be the terminal device 100-5 in FIG. 22. The terminal device 100-5 may receive a user input for controlling the electronic apparatus 100. The terminal device 100-5 may transmit the user input to the electronic apparatus 100.

Figure 5:
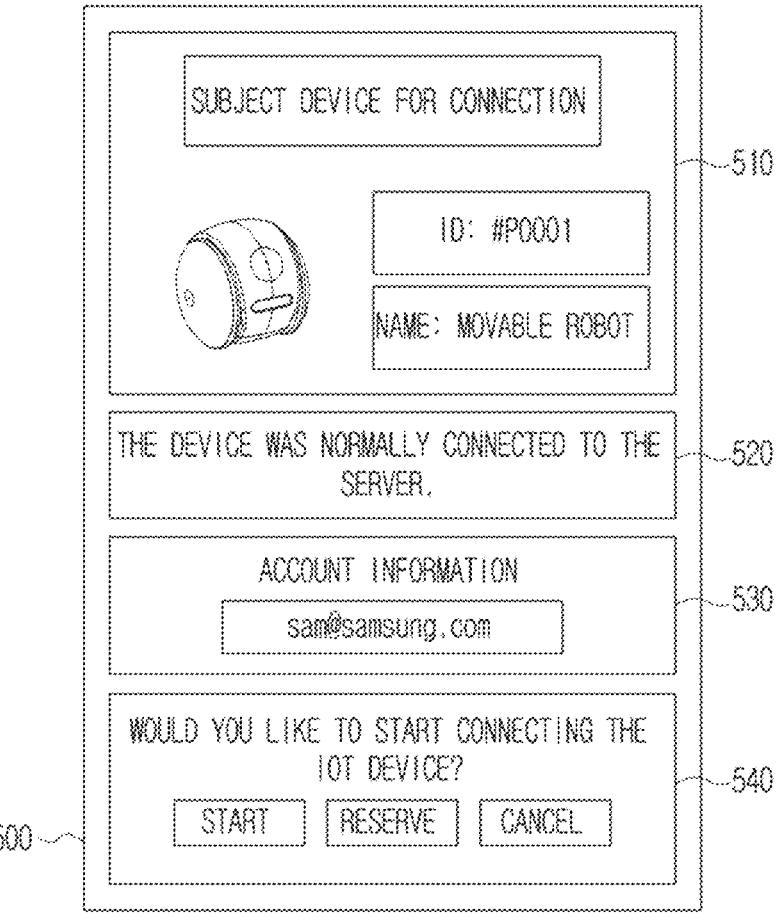
FIG. 5 is a diagram for illustrating a guide screen indicating that an electronic apparatus is connected to a server according to an embodiment.

FIG. 5 is a diagram for illustrating a guide screen indicating that the electronic apparatus 100 is connected to the server 400 according to an embodiment.

Referring to FIG. 5, a guide screen 500 may be provided to indicate that the electronic apparatus 100 is connected to the server 400. The guide screen 500 may be displayed by the electronic apparatus 100. The guide screen 500 may be displayed by the terminal device 100-5. The electronic apparatus 100 may be connected with the server 400 of the IoT network 10. For the electronic apparatus 100 to be connected to the server 400, a process of registering the electronic apparatus 100 with the server 400 may be performed. The process wherein the server 400 registers information on the electronic apparatus 100 may be described as on-boarding.

When the server 400 registers the electronic apparatus 100, guide information indicating that registration (or connection) was completed may be provided. The guide information may include a guide screen 500. The guide screen 500 may include at least one of a UI 510 indicating a device connected to the server 400, a UI 520 indicating completion of connection, a UI 530 indicating account information, or a UI 540 for connecting an IoT device (an edge device).

The UI 510 may include at least one of an image (e.g., a thumbnail image) indicating a subject device for connection or identification information of the subject device for connection.

The UI 520 may include at least one of text information or image information indicating that the subject device for connection was normally connected to the server 400.

The UI 530 may include account information corresponding to the user of the electronic apparatus 100.

The UI 540 may include information guiding to connect an IoT device to the server. The UI 540 may include guide information for performing an operation of searching an IoT device. The electronic apparatus 100 may receive a user input for the operation of searching an IoT device through the UI 540.

There may be various forms of information of the guide information.

According to an embodiment, the guide information may include a guide screen (or a guide image). The guide screen may be output through the display or the projection device.

According to an embodiment, the guide information may include guide audio. The guide audio may be output through the speaker.

Figure 6:
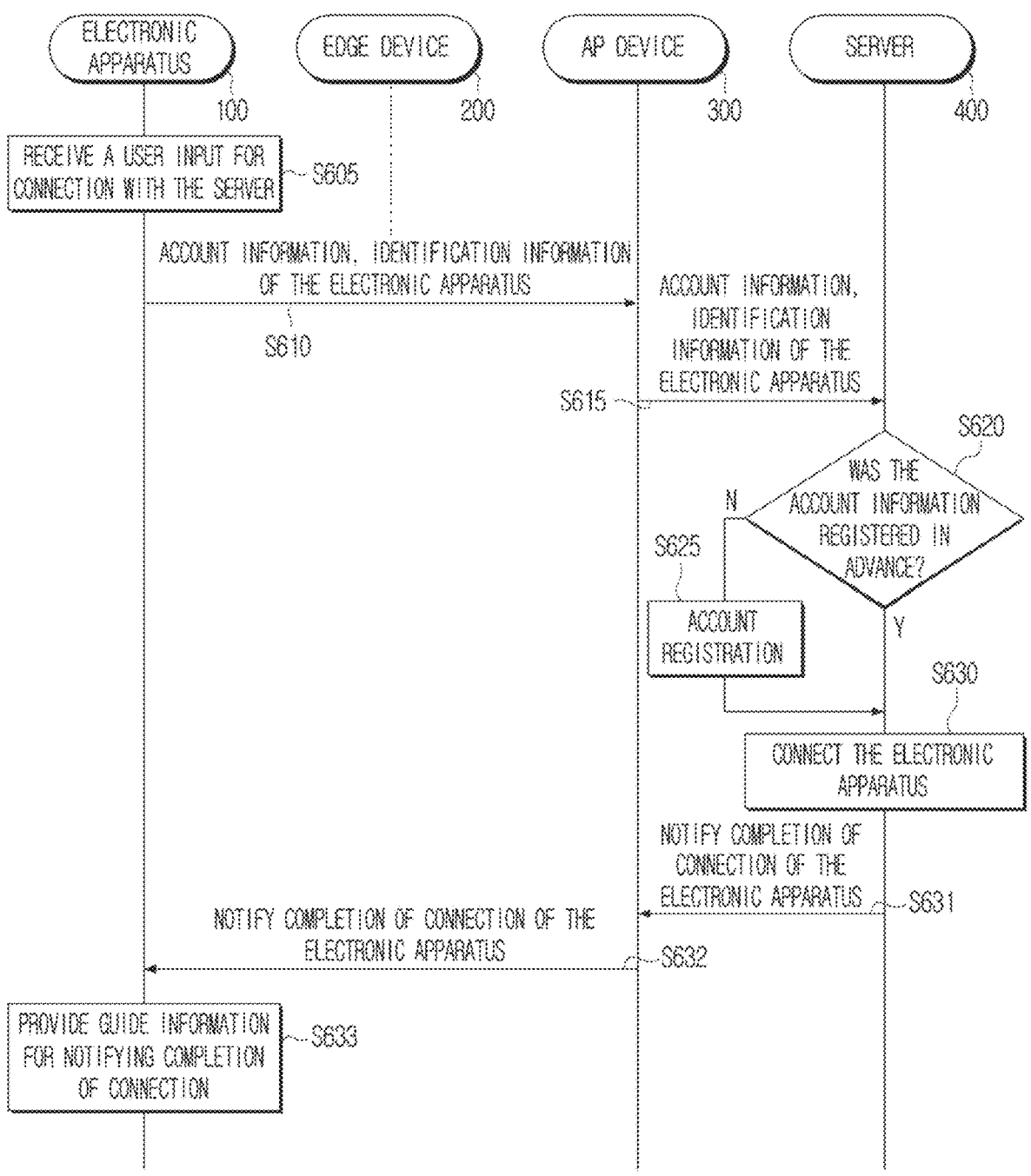
FIG. 6 is a diagram for illustrating an operation of connecting an electronic apparatus to a server according to an embodiment.

FIG. 6 is a diagram for illustrating an operation of connecting the electronic apparatus 100 to the server 400 according to an embodiment.

Referring to FIG. 6, the electronic apparatus 100 may receive a user input for connection with the server 400 in the operation S605. The electronic apparatus 100 may receive a user input for registering the electronic apparatus 100 to the server 400. When a user input for connection with the server 400 is received, the electronic apparatus 100 may transmit at least one of the account information or the identification information of the electronic apparatus 100 to the AP device 300 in the operation S610.

The AP device 300 may receive at least one of the account information or the identification information of the electronic apparatus 100 from the electronic apparatus 100. The AP device 300 may transmit at least one of the account information or the identification information of the electronic apparatus 100 received from the electronic apparatus 100 to the server 400 in the operation S615.

The server 400 may receive at least one of the account information or the identification information of the electronic apparatus 100 from the AP device 300. The server 400 may obtain the account information.

The server 400 may identify whether the account information is registered in advance in the operation S620. The server 400 may identify whether the account information received from the AP device 300 is included in a plurality of prestored account information.

If the account information is not registered in advance in the operation S620-N, the server 400 may perform account registration in the operation S625. The account registration may indicate a process wherein the electronic apparatus 100 registers the user's account to the server 400.

If the account information is registered in the operation S620-Y, the server 400 may connect the electronic apparatus 100 to the server 400 in the operation S630. The connecting operation may include an operation of connecting the electronic apparatus 100 that was previously connected to the server 400 again, or an operation of newly connecting the electronic apparatus 100 to the server 400.

After performing the connecting operation, the server 400 may generate a notification of completion of connection indicating that the electronic apparatus 100 is connected to the server 400. The server 400 may transmit the notification of completion of connection of the electronic apparatus 100 to the electronic apparatus 100 through the AP device 300. The server 400 may transmit the notification of completion of connection of the electronic apparatus 100 to the AP device 300 in the operation S631.

The AP device 300 may receive the notification of completion of connection of the electronic apparatus 100 from the server 400. The AP device 300 may transmit the notification of completion of connection of the electronic apparatus 100 to the electronic apparatus 100 in the operation S632.

The electronic apparatus 100 may receive the notification of completion of connection of the electronic apparatus 100 from the AP device 300. The electronic apparatus 100 may provide guide information for notifying completion of connection in the operation S633. The electronic apparatus 100 may generate guide information, and provide the generated guide information. As an example, the guide information may include a guide screen, such as the guide screen discussed with reference to FIG. 5.

Figure 7:
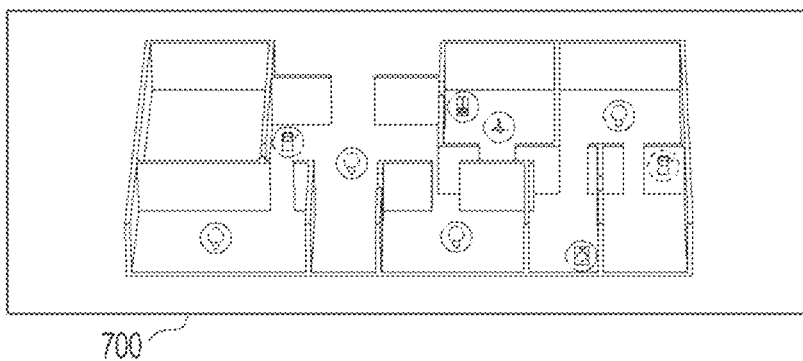
FIG. 7 is a diagram for illustrating a space map according to an embodiment.

FIG. 7 is a diagram for illustrating a space map according to an embodiment.

Referring to FIG. 7, the electronic apparatus 100 may generate a space map 700. The space map 700 may be a map indicating a space wherein an IoT device in a home exists. The electronic apparatus 100 may obtain the space map according to an embodiment.

As an example, the electronic apparatus 100 may perform a search operation and generate the space map based on the search operation.

As an example, the space map may be received from the server 400.

As an example, the space map may be generated by a user input. As an example, the space map may be modified by a user input.

The space map may include at least one of structure information of a space wherein at least one IoT device exists or location information of at least one IoT device arranged in a space. The electronic apparatus 100 may move to a target location through (i.e., by referencing) the space map. The electronic apparatus 100 may move to a nearby location of a specific IoT device through the space map.

Figure 8:
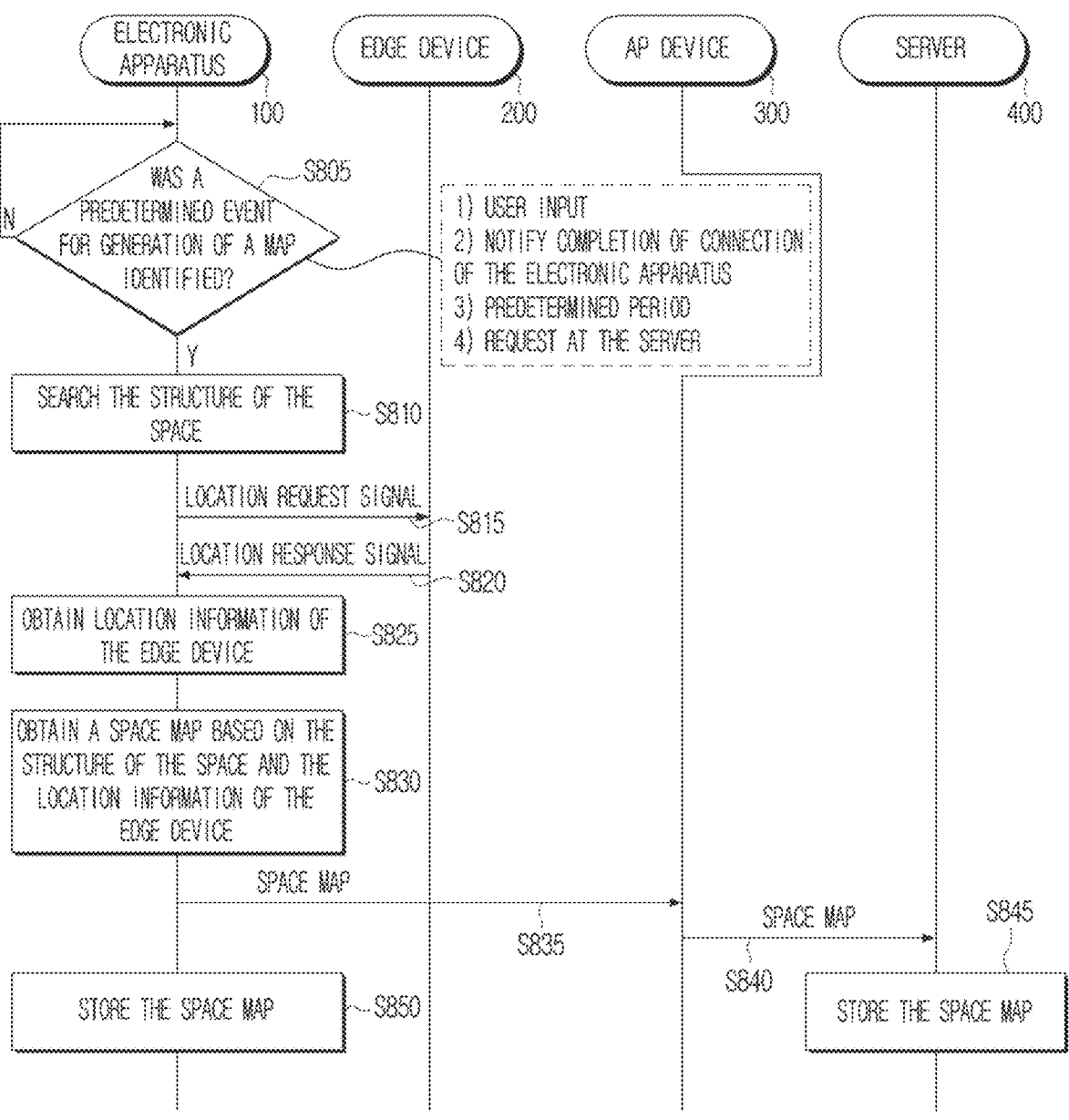
FIG. 8 is a diagram for illustrating an operation of generating a space map according to an embodiment.

FIG. 8 is a diagram for illustrating an operation of generating a space map according to an embodiment.

Referring to FIG. 8, the electronic apparats 100 may determine whether a predetermined event for generation of a map is identified in the operation S805. The predetermined event for generation of a map may include at least one of an event wherein a user input for generation of a map is received, an event wherein a notification of completion of connection of the electronic apparatus is received, an event wherein a predetermined period arrives, or an event wherein a request for generation of a map is received from the server 400.

If the predetermined event for generation of a map is identified in the operation S805-Y, the electronic apparatus 100 may explore the space structure in the operation S810. The electronic apparatus 100 may drive for exploring the entire structure of the space wherein the electronic apparatus 100 is arranged. The driving may be performed through a predetermined method. The electronic apparatus 100 may transmit a request signal of the location to the edge device 200 arranged in a nearby space in the operation S815. For example, the request signal of the location may be continuously transmitted while the driving for exploring the entire structure of the space is performed.

The edge device 200 may receive the request signal of the location from the electronic apparatus 100. The edge device 200 may generate a response signal of the location in response to the request signal of the location. For example, while the driving for exploring the entire structure of the space is performed, the electronic apparatus 100 may approach the edge device 200 and thereby come into communication range of the edge device 200. The edge device 200 may transmit the response signal of the location to the electronic apparatus 100 in the operation S820.

The electronic apparatus 100 may receive the response signal of the location from the edge device 200. The electronic apparatus 100 may obtain the location information of the edge device 200 in response to the response signal of the location in the operation S825. The electronic apparatus 100 may obtain (or generate) a space map based on the space structure and the location information of the edge device 200 in the operation S830. The electronic apparatus 100 may transmit the space map to the server 400 through the AP device 300.

The electronic apparatus 100 may transmit the space map to the AP device 300 in the operation S835. The AP device 300 may receive the space map from the electronic apparatus 100. The AP device 300 may transmit the space map to the server 400 in the operation S840.

The server 400 may receive the space map from the AP device 300. The server 400 may store the space map in the operation S845.

According to an embodiment, the space map may be transmitted together with the account information corresponding to the electronic apparatus 100. The server 400 may receive the account information of the electronic apparatus 100 together with the space map through the AP device 300. The server 400 may map the account information and the space map, and store them as a space map table.

After the space map is obtained, the electronic apparatus 100 may store the space map in the operation S850.

Figure 9:
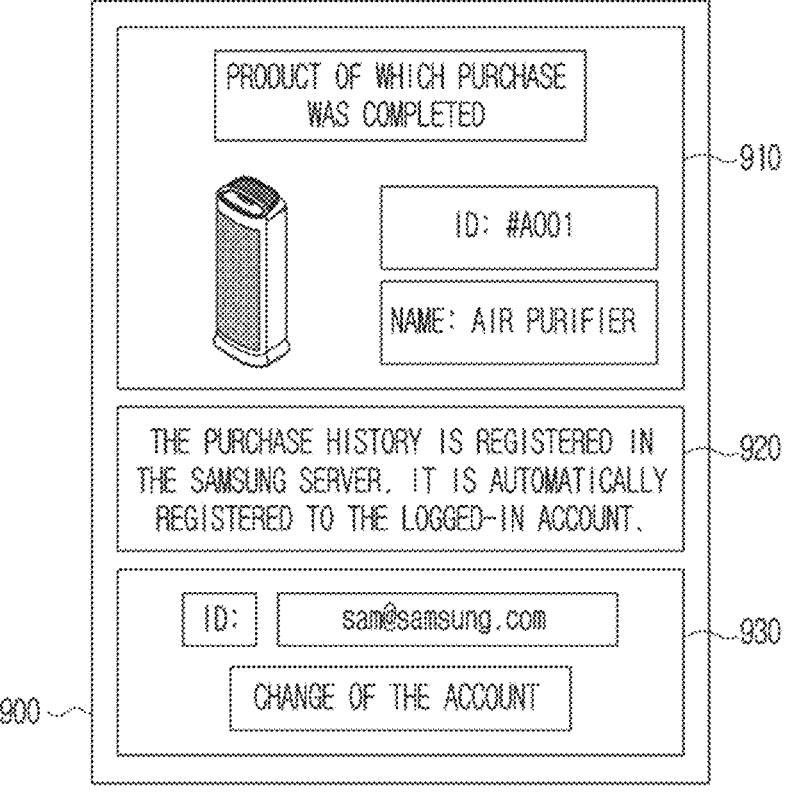
FIG. 9 is a diagram for illustrating an operation of registering an electronic apparatus to a server in a purchase stage in an on-line store related to a server according to an embodiment.

FIG. 9 is a diagram for illustrating an operation of registering the electronic apparatus 100 to the server 400 in a purchase stage in an on-line store related to the server 400 according to an embodiment.

Referring to FIG. 9, information on the edge device 200 may be registered to the server 400. In case the user purchases the edge device 200, identification information of the edge device 200 may be registered to the server 400 together with the account information corresponding to the user. The server 400 may provide connection information (authority information) necessary for connecting the edge device 200 to the server 400 by storing information related to purchase of the edge device 200.

Guide information necessary for registering the edge device 200 to the server 400 may be provided to the user. The guide information may include a guide screen 900. The guide screen 900 may include at least one of a UI 910 indicating a purchased product, a UI 920 indicating that the purchase history is registered to the server 400, or a UI 930 indicating information on an account connected to the server 400. The guide screen 900 may be displayed by the electronic apparatus 100. The guide screen 900 may be displayed by the terminal device 100-5.

The UI 910 may include at least one of an image (e.g., a thumbnail image) indicating a subject device for connection or identification information of the subject device for connection.

The UI 920 may include at least one of text information or image information indicating that the purchase history (or purchase information) is registered to the server 400.

The UI 930 may include account information of the user who purchased the edge device 200. The UI 930 may include a UI for changing the account information necessary for registering the edge device 200 to the server 400.

Referring to FIG. 9, the edge device 200 may be sold at an on-line store (a website) linked with the server 400. If the edge device 200 is purchased by the user at an on-line store linked with the server 400, purchase information for the edge device 200 may be automatically registered to the server 400. This is because the user's account information is already stored in the website of purchase.

Figure 10:
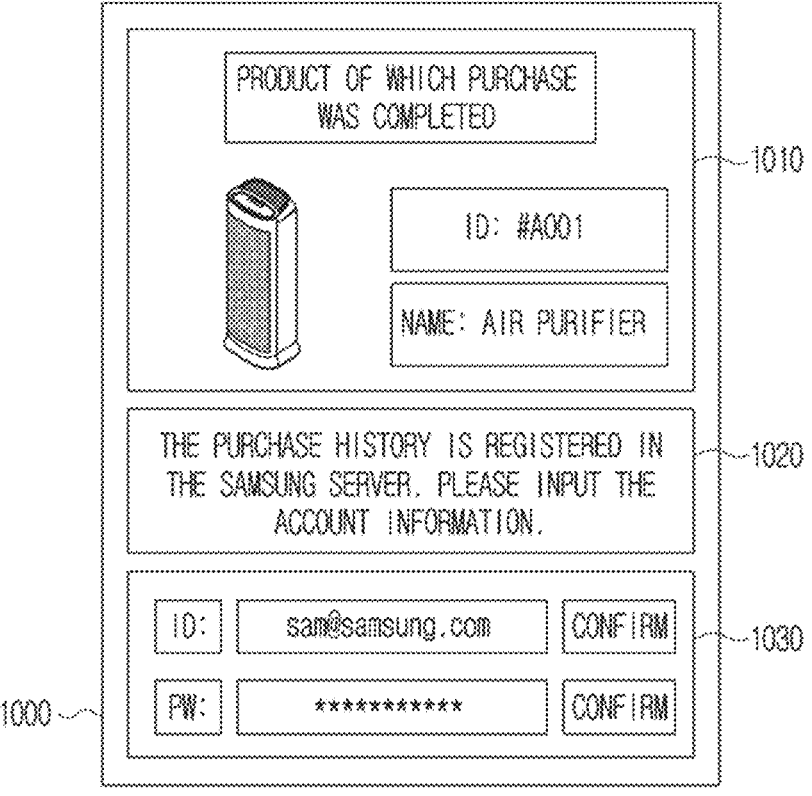
FIG. 10 is a diagram for illustrating an operation of registering an electronic apparatus to a server in a purchase stage in an on-line store not related to a server according to an embodiment.

FIG. 10 is a diagram for illustrating an operation of registering the electronic apparatus 100 to the server 400 in a purchase stage in an on-line store not related to the server 400 according to an embodiment.

Guide information necessary for registering the edge device 200 to the server 400 may be provided to the user. The guide information may include a guide screen 1000. The guide screen 1000 may include at least one of a UI 1010 indicating a purchased product, a UI 1020 indicating that the purchase history is registered to the server 400, or a UI 1030 indicating information on an account connected to the server 400. The guide screen 1000 may be displayed by the electronic apparatus 100. The guide screen 1000 may be displayed by the terminal device 100-5.

The UI 1010 may include at least one of an image (e.g., a thumbnail image) indicating a subject device for connection or identification information of the subject device for connection.

The UI 1020 may include at least one of text information or image information indicating that the purchase history (or purchase information) is registered to the server 400. The UI 1020 may include information that purchase information is provided to the server 400.

The UI 1030 may include account information of the user who purchased the edge device 200. The UI 1030 may include a UI for inputting the account information necessary for registering the edge device 200 to the server 400.

FIG. 11 is a diagram for illustrating a mapping table including account information and identification information of edge devices according to an embodiment.

Referring to FIG. 11, the server 400 may store a mapping table 1100 wherein information of (a plurality of) accounts and identification information of (a plurality of) edge devices are mapped based on the purchase history. The mapping table 1100 may include account information and identification information of an edge device corresponding to the account information. The mapping table 1100 may be obtained through the purchase history.

The identification information of the edge device 200 may indicate, for example, a serial number. One edge device 200 may have one serial number.

Figure 12:
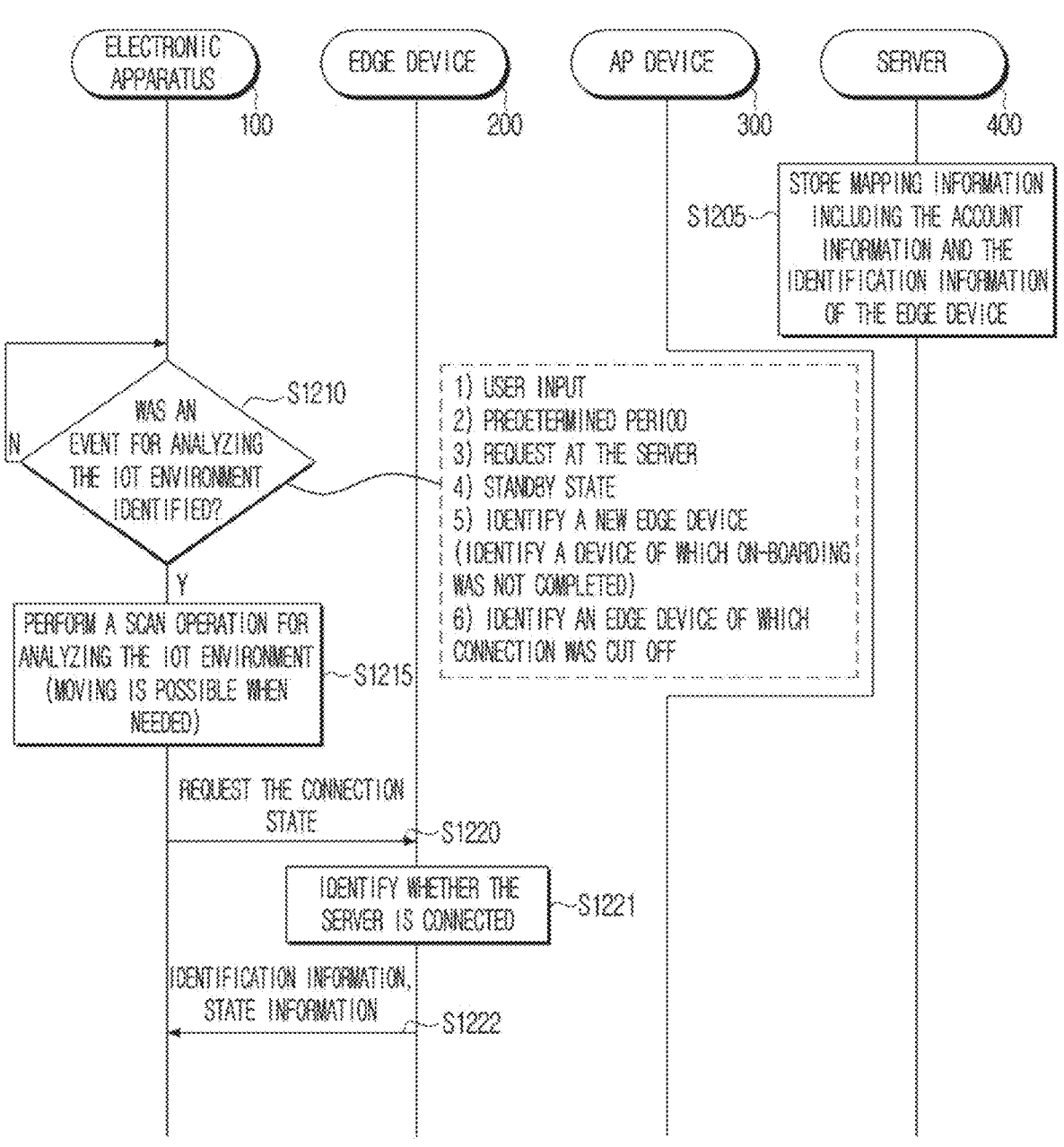
FIG. 12 is a diagram for illustrating an operation of identifying whether an edge device is connected to a server according to an embodiment.

FIG. 12 is a diagram for illustrating an operation of identifying whether the edge device 200 is connected to the server 400 according to an embodiment.

The server 400 may store mapping information including account information and identification information of the edge device 200 in the operation S1205. The mapping information related to the edge device 200 may be included in the mapping table. The mapping table may be a table that was generated based on a plurality of purchase histories. The mapping table may be updated based on additional purchase information.

While the mapping information is stored in the server 400, the electronic apparatus 100 may determine whether a predetermined event for analyzing the IoT environment is identified in the operation S1210. Analysis of the IoT environment may include an operation of analyzing the network environment indicating whether the edge device 200 is connected to the server 400.

The predetermined event for analyzing the IoT environment may include at least one of an event wherein a user input for analyzing the IoT environment is received, an event wherein a predetermined period arrives, an event wherein a request for analyzing the IoT environment is received from the server 400, an event wherein the electronic apparatus 100 is in a standby state (a state wherein power is supplied, but the electronic apparatus 100 does not perform a specific function), an event wherein a new edge device is identified in the IoT network 10, or an event wherein an edge device of which connection was cut off is identified in the IoT network 10, etc.

If the predetermined event for analyzing the IoT environment is identified in the operation S1210-Y, the electronic apparatus 100 may perform a scan operation for analyzing the IoT environment in the operation S1215. According to an embodiment, the electronic apparatus 100 may move for performing a scan operation.

The electronic apparatus 100 may request the connection state to the edge device 200 in the operation S1220. The edge device 200 may receive the request of the connection state from the electronic apparatus 100. The edge device 200 may identify whether it is connected with the server 400 in the operation S1221. The edge device 200 may obtain state information indicating whether it is connected with the server 400. The edge device 200 may identify whether it is in a state of being able to be connected with the server 400. The edge device 200 may obtain state information as the identification result. The state information may include (i.e., indicate) at least one of a state wherein connection with the server 400 is possible or a state wherein connection with the server 400 is impossible.

The edge device 200 may transmit at least one of the identification information or the state information of the edge device 200 to the electronic apparatus 100 in the operation S1222.

FIG. 13 is a diagram for illustrating an authority table necessary for the edge device 200 to be connected to the server 400 according to an embodiment.

Referring to FIG. 13, the server 400 may store an authority table 1300. The authority table 1300 may be information necessary for the edge device 200 to be connected to the server 400. In the authority table 1300, authority information allotted for each edge device may exist. The authority information allotted for each edge device may vary for each type of the edge devices. For example, authority information ABC for air purifiers #A 001, #A 002, #A 003 and authority information DEF for TVs #T 001, #T 002, #T 003 may be different. The authority information may be described as identification information or an authority code. Even though the identification information of the edge devices 200 all varies, the authority information may be allotted while being partially overlapped.

The authority information may be used to prevent reckless registration of an edge device to the server 400. An edge device should be registered to the server 400 only by a designated user or by a designated electronic apparatus 100. This is because an edge device should be controlled only by a user.

According to an embodiment, by using different identification information for each of the edge devices, unique authority information may be provided for each of the edge devices, and in this regard the authority information may vary. If the same authority information is used for the same model, a user who does not have authority may have an access right to a plurality of devices of the same model. For solving such a problem, different authority information may be matched for each identification information of the edge devices.

FIG. 14 is a diagram for illustrating an operation of obtaining connection information necessary for the edge device 200 to be connected to the server 400 according to an embodiment.

The operation S1422 in FIG. 14 may correspond to the operation S1222 in FIG. 12.

If at least one of identification information or state information is identified from the edge device 200, the electronic apparatus 100 may identify whether a predetermined event that the edge device 200 is not connected to the server 400 was identified based on the state information in the operation S1430.

According to an embodiment, the operation S1430 may partially overlap with the operation S1210 in FIG. 12. For example, it is assumed that in the operation S1210, the predetermined event is an event of identifying the edge device 200 of which connection was cut off. In case the edge device 200 of which connection with the server 400 was cut off is identified in the operation S1210, the electronic apparatus 100 may identify once again whether the edge device 200 is connected with the server 400 through the operation S1430. The operation S1430 may be described as an operation of identifying an event that the edge device 200 is not connected with the server 400. The predetermined event discussed with reference to the operation S1210 may be described as a first event group, and the predetermined event discussed with reference to the operation S1430 may be described as a second event group.

According to an embodiment, a situation wherein the edge device 200 is not connected with the server 400 may be identified as the operation S1430 is performed. For example, the operation S1430 may be performed without performing the operation S1210 in FIG. 12. The electronic apparatus 100 may identify that the edge device 200 is not connected with the server 400 based on the state information.

If an event that the edge device 200 not connected with the server 400 is not identified in the operation S1430-N, the electronic apparatus 100 may repeatedly perform operations S1422 and S1430. For example, the electronic apparatus 100 may repeatedly perform operations S1422 and S1430 until identifying an edge device 200 that is not connected with the server 400.

If the predetermined event that the edge device 200 is not connected with the server 400 is identified in the operation S1430-Y, the electronic apparatus 100 may transmit at least one of a request of authority information, account information, or identification information of the electronic apparatus 100 to the AP device 300 in the operation S1431.

The AP device 300 may receive at least one of a request of authority information, the account information, or the identification information of the electronic apparatus 100 from the electronic apparatus 100. The AP device 300 may transmit at least one of the request of authority information, the account information, or the identification information of the electronic apparatus 100 to the server 400 in the operation S1432.

The server 400 may receive at least one of the request of authority information, the account information, or the identification information of the electronic apparatus 100 from the AP device 300. The server 400 may identify whether the transmitted account information and identification information coincide with the mapping information in the operation S1440. The server 400 may identify whether the account information and the identification information transmitted from the electronic apparatus 100 are included in the mapping table.

If the account information and the identification information do not coincide with the mapping information in the operation S1440-N, the server 400 may transmit a notification indicating that the identification information does not coincide to the AP device 300 in the operation S1441.

The AP device 300 may receive the notification indicating that the identification information does not coincide from the server 400. The AP device 300 may transmit the notification indicating that the identification information does not coincide to the electronic apparatus 100 in the operation S1442.

The electronic apparatus 100 may receive the notification indicating that the identification information does not coincide from the AP device 300. The electronic apparatus 100 may provide guide information indicating that the identification information does not coincide in the operation S1443.

If the account information and the identification information coincide with the mapping information in the operation S1440-Y, the server 400 may obtain authority information corresponding to the identification information in the operation S1445. The authority information may indicate information for authenticating authority necessary for connecting the edge device 200 to the server 400. The server 400 may transmit the authority information to the AP device 300 in the operation S1446. The AP device 300 may receive the authority information from the server 400.

The AP device 300 may receive the authority information from the server 400. The AP device 300 may transmit the authority information to the electronic apparatus 100 in the operation S1447.

The electronic apparatus 100 may receive the authority information from the AP device 300. The electronic apparatus 100 may generate (or obtain) connection information including at least one of the account information, the authority information, the AP information, or the address information in the operation S1448. The connection information may indicate information necessary for connecting the edge device 200 to the server 400. The connection information may include at least one of the account information, the authority information, the AP information, or the address information.

The account information may be user information necessary for connecting the edge device 200 in the server 400.

The authority information may include authentication information for connecting the edge device 200 to the server 400.

The AP information may include authentication information for connecting the edge device 200 to the AP device 300.

The address information may include an access address or authentication information for connecting the AP device 300 to the server 400.

The electronic apparatus 100 may store the generated connection information in the operation S1449.

Figure 15:
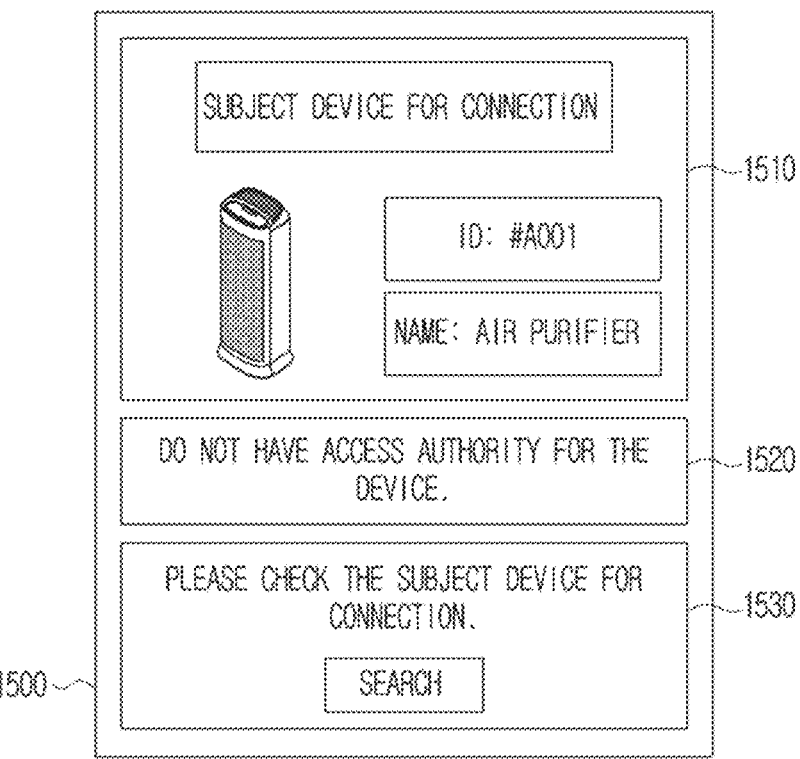
FIG. 15 is a diagram for illustrating a guide screen that is provided in case authority necessary for an edge device to be connected to a server does not exist according to an embodiment.

FIG. 15 is a diagram for illustrating a guide screen that is provided in case authority necessary for the edge device 200 to be connected to the server 400 does not exist according to an embodiment.

Referring to FIG. 15, a guide screen 1500 indicating that the edge device 200 is not connected to the server 400 may be provided to the user. The guide screen 1500 may be displayed by the electronic apparatus 100. The guide screen 1500 may be displayed by the terminal device 100-5.

The guide screen 1500 may include a UI 1510 indicating a device to be connected to the server 400, a UI 1520 indicating a cause that connection is impossible, or a UI 1530 for searching a subject device for connection.

The UI 1510 may include at least one of an image (e.g., a thumbnail image) indicating a subject device for connection or identification information of the subject device for connection.

The UI 1520 may include at least one of text information or image information indicating a cause that the subject device for connection cannot be connected to the server 400.

The UI 1530 may include information guiding to search (or explore) a subject device for connection again.

Figure 16:
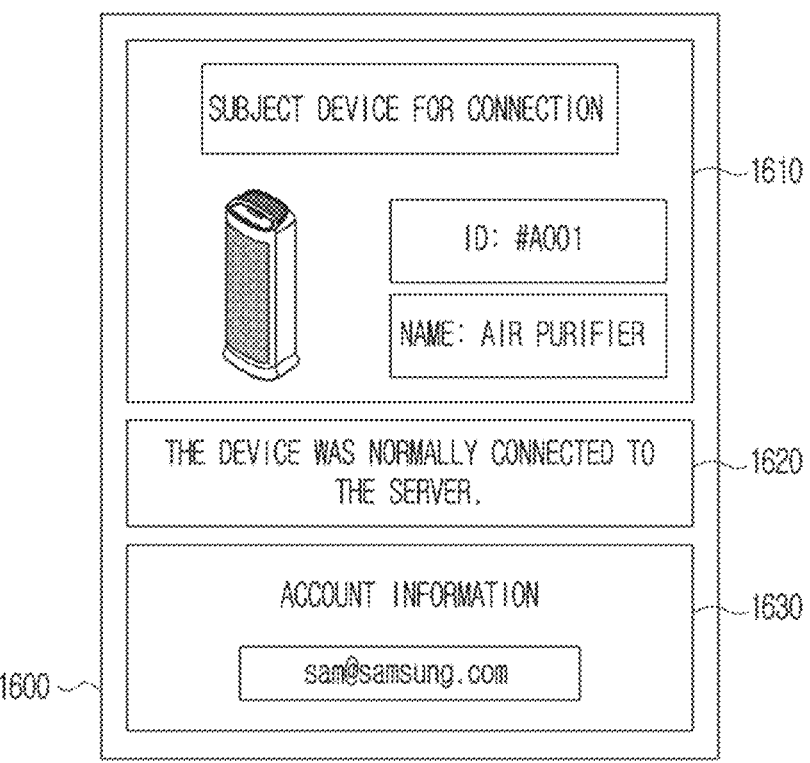
FIG. 16 is a diagram for illustrating a guide screen that is provided in case an edge device is connected to a server normally according to an embodiment.

FIG. 16 is a diagram for illustrating a guide screen that is provided in case the edge device 200 is connected to the server 400 normally according to an embodiment.

Referring to FIG. 16, a guide screen 1600 indicating that the edge device 200 is normally connected to the server 400 may be provided to the user.

The guide screen 1600 may include at least one of an UI 1610 indicating a device connected to the server 400, a UI 1620 indicating completion of connection, or a UI 1630 indicating account information. The guide screen 1600 may be displayed by the electronic apparatus 100. The guide screen 1600 may be displayed by the terminal device 100-5.

The UI 1610 may include at least one of an image (e.g., a thumbnail image) indicating a subject device for connection or identification information of the subject device for connection.

The UI 1620 may include at least one of text information or image information indicating that the subject device for connection was normally connected to the server 400.

The UI 1630 may include account information corresponding to the user of the electronic apparatus 100.

FIG. 17 is a diagram for illustrating an operation wherein the edge device 200 is connected to the server 400 according to an embodiment.

The operation S1749 in FIG. 17 may correspond to the operation S1449 in FIG. 14. Before the operation of S1749 is performed, the operations explained in FIG. 14 may be performed.

After the connection information is stored, the electronic apparatus 100 may transmit the connection information to the edge device 200 in the operation S1750. The connection information may include at least one of the account information, the authority information, the AP information, or the address information.

The edge device 200 may receive the connection information from the electronic apparatus 100. The edge device 200 may obtain at least one of the account information, the authority information, the AP information, or the address information based on the connection information in the operation S1751.

The edge device 200 may determine whether prestored authority information is identified in the operation S1752. The edge device 200 may have stored authority information in advance in itself. The edge device 200 may compare the prestored authority information and the authority information obtained through the electronic apparatus 100. The edge device 200 may determine whether the prestored authority information and the authority information obtained through the electronic apparatus 100 coincide. The edge device 200 may determine whether to start a connecting operation with the server 400 through the comparing operation of the authority information. For example, the edge device 200 may determine to start the connecting operation with the server 400 when the prestored authority information and the authority information obtained through the electronic apparatus 100 coincide.

If prestored authority information is not identified in the operation S1752-N, the edge device 200 may transmit a notification indicating that authority does not exist to the electronic apparatus 100 in the operation S1754.

The electronic apparatus 100 may receive the notification indicating that authority does not exist from the edge device 200. The electronic apparatus 100 may provide guide information for notifying that authority does not exist in the operation S1754. The guide information may include a guide screen. Explanation in this regard is described with reference to FIG. 15.

If prestored authority information is identified in the operation S1752-Y, the edge device 200 may search the AP device 300 based on the AP information in the operation S1755. If the prestored authority information and the authority information obtained from the electronic apparatus 100 coincide, the edge device 200 may start a connecting operation with the server 400.

The edge device 200 may transmit at least one of the account information, the identification information of the edge device 200, the authority information, or the address information to the AP device 300 in the operation S1756.

The AP device 300 may receive at least one of the account information, the identification information of the edge device 200, the authority information, or the address information from the edge device 200. The AP device 300 may transmit at least one of the account information, the identification information of the edge device 200, or the authority information to the server 400 in the operation S1757. The AP device 300 may transmit specific information to the server 400 based on the address information.

The server 400 may receive at least one of the account information, the identification information of the edge device 200, or the authority information from the AP device 300.

The server 400 may determine whether authority information is identified in the operation S1760. The server 400 may determine whether the authority information received from the AP device 300 coincides with the authority information stored in itself. The authority information stored in the server 400 in itself may be the authority information obtained in the operation S1445 in FIG. 14.

If authority information is not identified in the operation S1760-N, the server 400 may transmit a notification indicating that authority does not exist to the AP device 300 in the operation S1761. The AP device 300 may receive the notification indicating that authority does not exist from the server 400. The AP device 300 may transmit the notification indicating that authority does not exist to the electronic apparatus 100 in the operation S1762. The electronic apparatus 100 may receive the notification indicating that authority does not exist from the AP device 300. The electronic apparatus 100 may provide guide information for notifying that authority does not exist in the operation S1763. The operations in the operation S1763 and the operation S1754 may correspond to each other. The guide information indicating that authority does not exist may include a guide screen, such as the guide screen described with reference to FIG. 15.

If authority information is identified in the operation S1760-Y, the server 400 may connect the edge device 200 in the operation S1765. The server 400 may perform an operation for connection with the edge device 200. The server 400 may transmit a notification indicating completion of connection of the edge device 200 to the AP device 300 in the operation S1766.

The AP device 300 may receive the notification indicating completion of connection of the edge device 200 from the server 400.

As an example, the AP device 300 may transmit the notification indicating completion of connection of the edge device 200 to the edge device 200 in the operation S1767. The operation S1767 may be omitted.

The AP device 300 may transmit the notification indicating completion of connection of the edge device 200 to the electronic apparatus 100 in the operation S1768. The electronic apparatus 100 may receive the notification indicating completion of connection of the edge device 200 from the AP device 300. The electronic apparatus 100 may provide guide information for indicating completion of connection of the edge device 200 in the operation S1769. The guide information may include a guide screen, such as the guide screen discussed with reference to FIG. 16.

Figure 18:
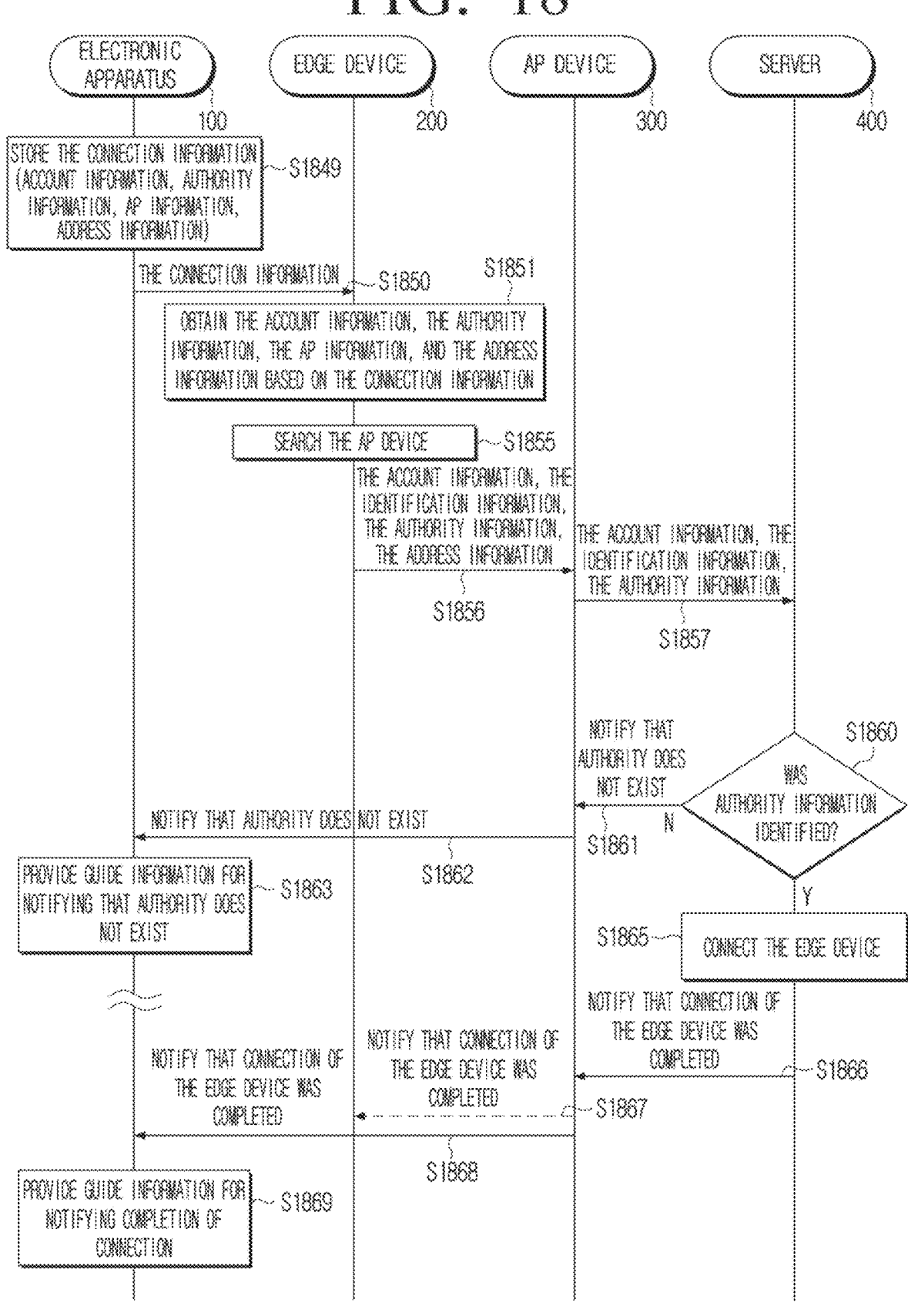
FIG. 18 is a diagram for illustrating an operation of identifying authority information only in a server according to an embodiment.

FIG. 18 is a diagram for illustrating an operation of identifying authority information only in the server 400 according to an embodiment.

The operations S1849, S1950, S1851, S1855, S1856, S1857, S1860, S1861, S1862, S1863, S1865, S1866, S1867, S1868, and S1869 in FIG. 18 may correspond to the operations S1749, S1950, S1751, S1755, S1756, S1757, S1760, S1761, S1762, S1763, S1765, S1766, S1767, S1768, and S1769 in FIG. 17.

As shown in FIG. 17, the operation of the edge device 200 of identifying authority information (S1752 in FIG. 17), and the operation of the electronic apparatus 100 of providing guide information for notifying that authority does not exist (S1754 in FIG. 17) may be omitted. As shown in FIG. 18, authority information may be identified only in the server 400 without identifying in the edge device 200.

The operations in FIG. 17 may reduce the resource of communication with the server 400, but may require an increased connection time.

The operations in FIG. 18 may increase the resource of communication with the server 400, but may have a reduced connection time.

FIG. 19 is a diagram for illustrating an operation that the electronic apparatus 100 moves by using location information of the edge device 200 according to an embodiment.

The operations S1920, S1921, and S1922 in FIG. 19 may correspond to the operations S1220, S1221, and S1222 in FIG. 12.

The server 400 may determine whether a predetermined event for analyzing the IoT environment is identified in the operation S1910. The predetermined event may include an event wherein the edge device 200 of which connection was cut off is identified. For example, it may be determined that an edge device 200 that was previously connected is no longer connected. In a situation wherein the edge device 200 and the server 400 are connected, connection may be cut off due to a specific cause.

If the predetermined event is identified in the operation S1910-Y, the server 400 may obtain location information of the edge device 200 based on the space map in the operation S1911. The server 400 may identify location information of the edge device 200 of which connection was cut off among a plurality of devices included in the space map. If an event wherein the connection with the edge device 200 was released (i.e., is no longer connected) is identified, the server 400 may obtain the location information of the edge device 200 from the map information. The server 400 may transmit the location information of the edge device 200 to the AP device 300 in the operation S1912.

The AP device 300 may receive the location information of the edge device 200 from the server 400. The AP device 300 may transmit the location information of the edge device 200 to the electronic apparatus 100 in the operation S1913.

The electronic apparatus 100 may receive the location information of the edge device 200 from the AP device 300. The electronic apparatus 100 may move based on the location information of the edge device 200 in the operation S1915. The electronic apparatus 100 may move using the driving device 120 and the movement device 122 under control of the at least one processor 111. The electronic apparatus 100 may move to the location wherein the edge device 200 is arranged (or a nearby area) based on the location information of the edge device 200.

When the electronic apparatus 100 completes moving to the location wherein the edge device 200 is arranged, the electronic apparatus 100 may request the connection state to the edge device 200 in the operation S1920. The edge device 200 may receive the request of the connection state from the electronic apparatus 100. The edge device 200 may identify whether it is connected with the server 400 in the operation S1921. The edge device 200 may obtain state information indicating the connection state with the server 400. The edge device 200 may transmit at least one of the identification information or the state information of the edge device 200 to the electronic apparatus 100. The electronic apparatus 100 may receive at least one of the identification information or the state information from the edge device 200.

Figure 20:
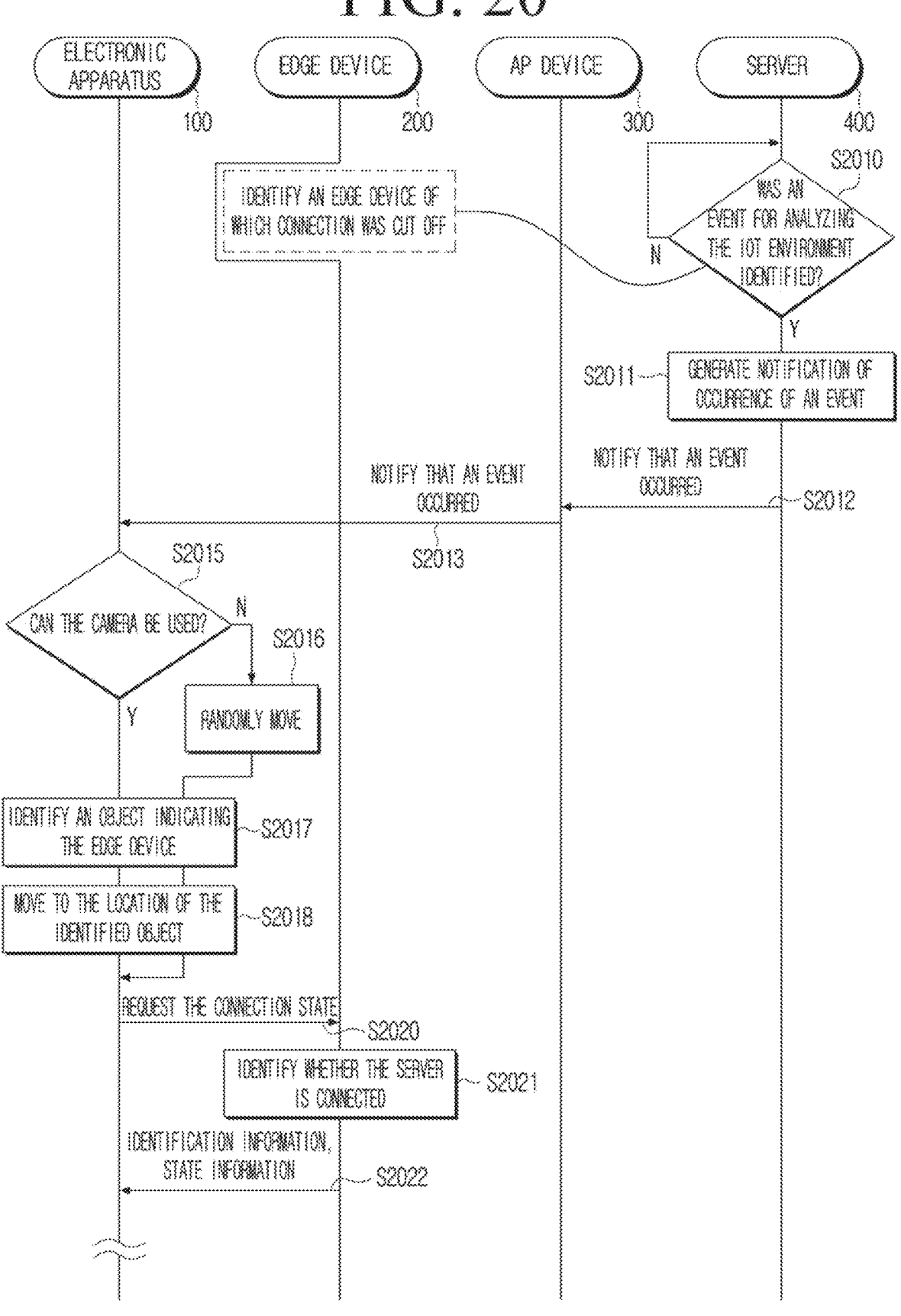
FIG. 20 is a diagram for illustrating an operation wherein an electronic apparatus moves near an edge device without location information according to an embodiment.

The operations in FIG. 19 may include an operation of specifying the location of the edge device 200 by using the space map. In FIG. 20, the server 400 may not perform an operation of transmitting the location information of the edge device 200 based on the space map.

FIG. 20 is a diagram for illustrating an operation wherein the electronic apparatus 100 moves near the edge device 200 without location information according to an embodiment.

The operations S2010, S2020, S2021, and S2022 in FIG. 20 may correspond to the operations S1910, S1920, S1921, and S1922 in FIG. 19.

When the predetermined event (cut-off of the connection of the edge device 200) is identified in the operation S2010-Y, the server 400 may generate a notification indicating that the predetermined event occurred in the operation S2011. The server 400 may transmit the notification indicating that the predetermined event occurred to the AP device 300 in the operation S2012.

The AP device 300 may receive the notification indicating that the predetermined event occurred from the server 400. The AP device 300 may transmit the notification indicating that the predetermined event occurred to the electronic apparatus 100 in the operation S2013.

The electronic apparatus 100 may receive the notification indicating that the predetermined event occurred from the AP device 300. When the notification indicating that the predetermined event occurred is received, the electronic apparatus 100 may determine whether the camera (or an image sensor) of the electronic apparatus 100 can be used in the operation S2015.

In case the camera cannot be used in the operation S2015-N, the electronic apparatus 100 may randomly move in the current space in the operation S2016. The electronic apparatus 100 may randomly move using the driving device 120 and the movement device 122 under control of the at least one processor 111. The electronic apparatus 100 may request the connection state to an ambient device while moving randomly. A request of the connection state may be randomly transmitted to the edge device 200. The edge device 200 may identify the connection state with the server 400. The edge device 200 may transmit the state information to the electronic apparatus 100 as the identification result.

In case the camera can be used in the operation S2015-Y, the electronic apparatus 100 may obtain a photographed image by using the camera. The electronic apparatus 100 may analyze the surrounding environment based on the photographed image. The electronic apparatus 100 may search an object indicating the edge device 200 based on the photographed image in the operation S2017. The electronic apparatus 100 may identify whether an object indicating the edge device 200 exists among a plurality of objects included in the photographed image. If an object indicating the edge device 200 is identified based on the photographed image, the electronic apparatus 100 may move to the location of the identified object in the operation S2018. The electronic apparatus 100 may move using the driving device 120 and the movement device 122 under control of the at least one processor 111.

After the electronic apparatus 100 moves to the arrangement location of the edge device 200, the operations S2020, S2021, and S2022 may be performed.

According to an embodiment, if an event that connection of the edge device 200 ends is identified, the server 400 may obtain the identification information of the edge device 200. The server 400 may generate a communication packet including the identification information of the edge device 200 and a notification indicating that connection of the edge device 200 ended. The server 400 may transmit the communication packet to the electronic apparatus 100 through the AP device 300. The electronic apparatus 100 may receive the communication packet. The electronic apparatus 100 may search the location of the edge device 200 based on the identification information of the edge device 200 included in the communication packet.

FIG. 21 is a diagram for illustrating an operation of requesting a connection state to the edge device 200 by using the strength of a response signal according to an embodiment.

The operations S2120, S2121, and S2122 in FIG. 21 may correspond to the operations S1220, S1221, and S1222 in FIG. 12.

The operations S2120, S2121, and S2122 in FIG. 21 may correspond to the operations S1920, S1921, and S1922 in FIG. 19.

The operations S2120, S2121, and S2122 in FIG. 21 may correspond to the operations S2020, S2021, and S2022 in FIG. 20.

If a predetermined event is identified, the electronic apparatus 100 may request a response to the edge device 200 in the operation S2115. The request of a response may be a request for a response, and the response may be evaluated to identify the strength of a response signal.

The edge device 200 may receive the request for the response from the electronic apparatus 100. The edge device 200 may transmit the response signal corresponding to the request of a response to the electronic apparatus 100 in the operation S2116.

The electronic apparatus 100 may receive the response signal from the edge device 200. The electronic apparatus 100 may obtain the strength of the response signal in the operation S2117. The electronic apparatus 100 may identify whether the strength of the response signal is greater than or equal to a threshold value in the operation S2118.

If the strength of the response signal is smaller than the threshold value in the operation S2118-N, the electronic apparatus 100 may repeatedly perform the operations S2115, S2116, S2117, and S2118.

If the strength of the response signal is greater than or equal to the threshold value in the operation S2118-Y, the electronic apparatus 100 may request the connection state to the edge device 200 in the operation S2120. If the strength of the response signal transmitted by the edge device 200 is greater than or equal to the threshold value, the operations S2120, S2121, and S2122 may be performed for the edge device 200.

FIG. 22 is a diagram for illustrating an operation of using a terminal device according to an embodiment.

The IoT network 20 in FIG. 22 may include at least one of the electronic apparatus 100, the edge device 200, the AP device 300, the server 400, or the terminal device 100-5.

The terminal device 100-5 may indicate a personal terminal device of the user. Also, the terminal device 100-5 may indicate a portable device of the user. The terminal device 100-5 may be one of a smartphone, a tablet, or a wearable device.

The server 400 may be connected to the electronic apparatus 100 and the edge device 200 through the AP device 300.

According to an embodiment, the server 400 may perform communication with the terminal device 100-5 without using the AP device 300. According to an embodiment, the terminal device 100-5 may be connected with the server 400 without using the AP device 300. For example, the terminal device 100-5 may perform communication with the server 400 according to various wireless communication protocols such as Zigbee, 3G, 3GPP, LTE, LTE-A, 4G, 5G, etc.

According to an embodiment, the server 400 may perform communication with the terminal device 100-5 through the AP device 300.

The electronic apparatus 100 and the edge device 200 may perform direct communication.

According to an embodiment, the electronic apparatus 100 and the terminal device 100-5 may perform direct communication. The electronic apparatus 100 and the terminal device 100-5 may be connected by using a short-range wireless communication method, such as a Bluetooth communication method.

According to an embodiment, the electronic apparatus 100 and the terminal device 100-5 may perform communication through the AP device 300.

The user may control a device included in the IoT network 20 by using the terminal device 100-5. The user may input a command necessary for controlling the IoT network 20 by using the terminal device 100-5.

FIG. 23 is a diagram for illustrating an operation wherein a terminal device provides guide information according to an embodiment.

Referring to FIG. 23, the server 400 may be connected with the electronic apparatus 100. An operation related to this will is described with reference to FIG. 6. With reference to FIG. 6, it was described that the electronic apparatus 100 provides guide information for notifying completion of connection of the electronic apparatus 100 and the server 400. In FIG. 23, the server 400 may transmit a notification indicating that the electronic apparatus 100 is connected to the server 400 to the terminal device 100-5 in the operation S2331.

The terminal device 100-5 may receive the notification indicating that the electronic apparatus 100 is connected to the server 400 from the server 400. The terminal device 100-5 may provide guide information for notifying that the electronic apparatus 100 is connected to the server 400 in the operation S2333. The guide information may include a guide screen, such as the guide screen described with reference to FIG. 5.

The server 400 may identify whether the account information and the identification information of the edge device 200 coincide with the mapping information in the operation S2340. An operation related to this may correspond to the operation $1440 in FIG. 14. With reference to FIG. 14, it was described that the electronic apparatus 100 provides guide information for notifying that the identification information does not coincide. In FIG. 23, if the account information and the identification information do not coincide with the prestored mapping information in the operation S2340-N, the server 400 may transmit a notification indicating that the identification information of the edge device 200 does not coincide to the terminal device 100-5 in the operation S2341.

The terminal device 100-5 may receive the notification indicating that the identification information of the edge device 200 does not coincide from the server 400. The terminal device 100-5 may provide guide information for notifying that the identification information of the edge device 200 does not coincide in the operation S2363.

The server 400 may determine whether authority information is identified in the operation S2360. The operations S2360 and S2365 in FIG. 23 may correspond to the operations S1760 and S1765 in FIG. 17. Also, the operations S2360 and S2365 in FIG. 23 may correspond to the operations S1860 and S1865 in FIG. 18. With reference to FIG. 17 and FIG. 18, it was described that the electronic apparatus 100 provides guide information. In FIG. 23, if authority information is not identified in the operation S2361-N, the server 400 may transmit a notification for indicating that authority does not exist to the terminal device 100-5 in the operation S2361.

The terminal device 100-5 may receive the notification for indicating that authority does not exist from the server 400. The terminal device 100-5 may provide guide information for notifying that authority does not exist in the operation S2363.

In FIG. 23, if authority information is identified in the operation S2361-Y, the server 400 may be connected with the edge device 200 in the operation S2365. If the edge device 200 and the server 400 are connected, the server 400 may transmit a notification indicating that connection between the server 400 and the edge device 200 was completed to the terminal device 100-5 in the operation S2366.

The terminal device 100-5 may receive the notification indicating that connection between the server 400 and the edge device 200 was completed from the server 400. The terminal device 100-5 may provide guide information for notifying that connection between the server 400 and the edge device 200 was completed in the operation S2369.

The guide information may include a guide screen (or a guide image) or guide audio. The terminal device 100-5 may display the guide screen through the display. The terminal device 100-5 may output the guide audio through the speaker.

FIG. 24 is a diagram for illustrating an operation wherein the electronic apparatus 100 and the edge device 200 communicate through the AP device according to an embodiment.

The IoT network 30 in FIG. 24 may include at least one of the electronic apparatus 100, the edge device 200, the AP device 300, the server 400, or the terminal device 100-5. Explanation regarding each device was described with reference to FIG. 4 and FIG. 22.

It was described that in the IoT network 20 in FIG. 22, the electronic apparatus 100 and the edge device 200 are directly connected. In the IoT network 30 in FIG. 24, the electronic apparatus 100 and the edge device 200 may not be directly connected. The electronic apparatus 100 and the edge device 200 may be connected through the AP device 300. Moreover, the terminal device 100-5 may connect to the electronic apparatus 100 and the edge device 200 through the AP device 300, and the terminal device 100-5 may also directly connect to the electronic apparatus 100.

As an example, the electronic apparatus 100 and the edge device 200 may be connected to the AP device 300 by using a Wi-Fi communication module. The electronic apparatus 100 and the edge device 200 may transmit and receive information through the AP device 300.

The electronic apparatus 100 and the edge device 200 may not perform direct communication with each other by using a Bluetooth communication module.

FIG. 25 is a diagram for illustrating measures (i.e., courses of action) for solving problems according to predetermined events according to an embodiment.

The problem solution table 2500 in FIG. 25 may include information on problem solutions including measures for problem solutions. A problem may occur in the environment of the IoT network. The electronic apparatus 100 may identify a cause of the problem, and perform an operation for solving the problem. The electronic apparatus 100 may store the problem solution table 2500. The problem solution table 2500 may include a plurality of causes of problems and operations (or measures) corresponding to the plurality of causes of problems.

An operation of the edge device 200 of performing connection with the server 400 in a factory reset state may be described as an on-boarding operation.

After the edge device 200 already performed connection with the server 400, an operation of the edge device 200 of performing re-connection while connection with the server 400 was released by a specific cause may be described as a recovery operation.

The electronic apparatus 100 may identify a predetermined event (abnormal connection, etc.) related to the IoT network. The electronic apparatus 100 may identify a cause that a predetermined event related to the IoT network occurred.

The electronic apparatus 100 may receive the state information from the edge device 200. An operation related to this is described with reference to FIG. 12. The electronic apparatus 100 may identify whether the edge device 200 is normally connected to the server 400 based on the state information.

The state information may include at least one of information indicating whether it is possible to connect with the server 400 (e.g., normal connection or non-connection), or information on the cause (e.g., no connection history, no response from the AP device, no response from the server, not known).

The electronic apparatus 100 may determine the state of the edge device 200 as normal based on the state information indicating normal connection. If the edge device 200 is in a non-connection state (i.e., the state information indicating non-connection), the electronic apparatus 100 may determine whether to perform an on-boarding operation or perform a recovery operation for the edge device 200 based on the state information.

As an example, if the state information indicates non-connection and a cause of a problem is absence of connection history, the electronic apparatus 100 may perform an on-boarding operation. The electronic apparatus 100 may transmit at least one of the account information, the authority information, the AP information, or the address information to the edge device 200 to connect the edge device 200 to the server 400.

As an example, if the state information indicates non-connection and a cause of a problem is no response from the edge device 200, the electronic apparatus 100 may perform a first recovery operation. The electronic apparatus 100 may transmit a control command for rebooting the power of the edge device 200 to the edge device 200. The electronic apparatus 100 may transmit a command for turning on the power of the edge device 200 to the edge device 200.

As an example, if the state information indicates non-connection and a cause of a problem is no response from the AP device 300, the electronic apparatus 100 may perform a second recovery operation. The electronic apparatus 100 may re-transmit at least one of the authority information or the AP information to the edge device 200. The edge device 200 may re-attempt connection with the AP device 300 based on at least one of the re-transmitted authority information or AP information.

As an example, if the state information indicates non-connection and a cause of a problem is no response from the server 400, the electronic apparatus 100 may perform a third recovery operation. The electronic apparatus 100 may re-transmit at least one of the account information, the authority information, or the address information to the edge device 200. The edge device 200 may re-attempt connection with the server 400 based on at least one of the re-transmitted account information, authority information, or address information.

As an example, if the state information indicates non-connection and a cause of a problem is not known, the electronic apparatus 100 may perform a fourth recovery operation. The fourth recovery operation may include an on-boarding operation, and may additionally include an operation of transmitting a command for deleting information related to previous connection (i.e., to initialize the connection information or to reset the edge device 200 to a factory reset state). The electronic apparatus 100 may transmit a command for deleting previous information (a command for initialization) to at least one of the edge device 200, the AP device 300, or the server 400. The device that received the command for initialization may delete (or initialize) information related to connection of the edge device 200 wherein a problem occurred. The electronic apparatus 100 may re-transmit at least one of a command for initialization of a connecting operation, the account information, the authority information, the AP information, or the address information to the edge device 200. The edge device 200 may re-attempt connection with the AP device 300 and the server 400 based on at least one of the account information, the authority information, the AP information, or the address information.

FIG. 26 is a diagram for illustrating guide information that is provided in a situation wherein a problem occurs in connection between the edge device 200 and the AP device 300 according to an embodiment.

Referring to FIG. 26, the electronic apparatus 100 may provide a guide screen 2600 indicating that connection of the edge device 200 with the AP device 300 failed.

The guide screen 2600 may include at least one of a UI 2610 indicating failure of connection, a UI 2620 indicating a measure corresponding to failure of connection, or a UI 2630 indicating AP information.

The UI 2610 may include at least one of information indicating failure of connection, image information indicating at least one device included in the IoT network, or image information 2611 indicating the cause of failure of connection.

The UI 2620 may include a measure corresponding to failure of connection. The countermeasure may vary according to the cause of failure of connection. Explanation in this regard is described with reference to FIG. 25.

The UI 2630 may include information necessary for performing a measure corresponding to failure of connection (e.g., AP information). The AP information currently stored in the electronic apparatus 100 may be provided to the user through the UI 2630. The user may change (or update) the currently set AP information through the UI 2630.

FIG. 27 is a diagram for illustrating guide information that is provided in a situation wherein a problem occurs in connection between the AP device 300 and the server 400 according to an embodiment.

Referring to FIG. 27, the electronic apparatus 100 may provide a guide screen 2700 indicating that connection of the AP device 300 with the server 400 failed.

The guide screen 2700 may include at least one of a UI 2710 indicating failure of connection, a UI 2720 indicating a measure corresponding to failure of connection, or a UI 2730 inquiring about performing of a detailed measure.

The UI 2710 may include at least one of information indicating failure of connection, image information indicating at least one device included in the IoT network, or image information 2711 indicating the cause of failure of connection.

The UI 2720 may include a measure corresponding to failure of connection. The countermeasure may vary according to the cause of failure of connection. Explanation in this regard is described with reference to FIG. 25.

The UI 2730 may include information inquiring about whether to perform an operation necessary for performing a measure corresponding to failure of connection (rebooting of the AP device 300). When a user selection (or a user input) is received through the UI 2730, the electronic apparatus 100 may generate a rebooting command of the AP device 300. The electronic apparatus 100 may reboot the AP device 300 through the edge device 200. The electronic apparatus 100 may transmit the rebooting command of the AP device 300 to the edge device 200. The edge device 200 may transmit the rebooting command of the AP device 300 to the AP device 300. The AP device 300 may perform a rebooting operation based on the rebooting command received from the edge device 200. After the rebooting, the AP device 300 may attempt connection with the server 400.

FIG. 28 is a diagram for illustrating guide information that is provided in a situation wherein a problem occurs in connection between the electronic apparatus 100 and the edge device 200 according to an embodiment.

The edge device 200 may be connected with the server 400 without the AP device 300. In an embodiment implemented without the AP device 300, connection of the edge device 200 with the server 400 may be cut off.

Referring to FIG. 28, the electronic apparatus 100 may provide a guide screen 2800 indicating that connection of the edge device 200 with the server 400 failed.

The guide screen 2800 may include at least one of a UI 2810 indicating failure of connection, a UI 2820 indicating a measure corresponding to failure of connection, or a UI 2830 inquiring about performing of a detailed measure.

The UI 2810 may include at least one of information indicating failure of connection, image information indicating at least one device included in the IoT network, or image information 2811 indicating the cause of failure of connection.

The UI 2820 may include a measure corresponding to failure of connection. The countermeasure may vary according to the cause of failure of connection. Explanation in this regard is described with reference to FIG. 25.

The UI 2830 may include information inquiring about whether to perform an operation necessary for performing a measure corresponding to failure of connection (rebooting of the edge device 200). When a user selection (or a user input) is received through the UI 2830, the electronic apparatus 100 may generate a rebooting command of the edge device 200. The electronic apparatus 100 may transmit the rebooting command of the edge device 200 to the edge device 200. The edge device 200 may perform a rebooting operation based on the rebooting command received from the electronic apparatus 100. After the rebooting, the edge device 200 may attempt connection with the server 400.

FIG. 29 is a diagram for illustrating an operation wherein the edge device 200 and the server 400 perform different authentication methods according to an embodiment.

The operations S2949, S2950, S2951, S2952, S2953, S2954, S2955, S2956, S2957, S2960, S2961, S2962, S2963, S2965, S2966, S2967, S2968, and S2969 in FIG. 29 may correspond to the operations S1749, S1750, S1751, S1752, S1753, S1754, S1755, S1756, S1757, S1760, S1761, S1762, S1763, S1765, S1766, S1767, S1768, and S1769 in FIG. 17.

Unlike in FIG. 17, access information may be additionally used in FIG. 29. In FIG. 17, an authentication operation was performed in the edge device 200 in the operation S1752, and an authentication operation was also performed in the server 400 in the operation S1760 by using authority information.

In FIG. 29, an authentication operation may be performed in the edge device 200 by using authority information in the operation S2951, and an authentication operation may be performed in the server 400 by using access information in the operation S2960.

The electronic apparatus 100 may store the connection information in the operation S2949. The connection information may include at least one of the account information, the authority information, the AP information, the address information, or the access information. The access information may be information transmitted from the server 400. Also, the access information may be information transmitted from the server 400 through the AP device 300. Unlike in FIG. 17, the connection information may additionally include the access information in FIG. 29.

The access information may include information indicating authority to access the server 400. The server 400 may limit connection to a case wherein access information is identified. For example, if the access information is not identified, the server may not allow the connection.

The edge device 200 may transmit at least one of the account information, the identification information of the edge device 200, the address information, or the access information to the AP device 300 in the operation S2956.

The AP device 300 may receive at least one of the account information, the identification information of the edge device 200, the address information, or the access information from the edge device 200. The AP device 300 may transmit at least one of the account information, the identification information of the edge device 200, or the access information to the server 400 based on the address information.

The server 400 may receive at least one of the account information, the identification information of the edge device 200, or the access information from the AP device 300.

The server 400 may determine whether access information is identified in the operation S2960. In case prestored access information is identified, the server 400 may perform connection with the edge device 200 based on at least one of the transmitted account information or identification information of the edge device 200 together with the transmitted access information in the operation S2965.

FIG. 30 is a diagram for illustrating an operation of performing authentication by using purchase information according to an embodiment.

The operations S3049, S3050, S3051, S3055, S3056, S3057, S3060, S3061, S3062, S3063, S3065, S3066, S3067, S3068, and S3069 in FIG. 30 may correspond to the operations S1849, S1850, S1851, S1855, S1856, S1857, S1860, S1861, S1862, S1863, S1865, S1866, S1867, S1868, and S1869 in FIG. 18.

In FIG. 18, an authentication operation for attempt of connection of the edge device 200 was performed in the server 400 by using authority information. In FIG. 30, an authentication operation for attempt of connection of the edge device 200 may be performed by using purchase information itself without separately transmitting authority information.

The server 400 may store purchase information for the edge device 200. The purchase information may include the identification information of the edge device 200 and mapping information wherein the identification information of the edge device 200 is mapped. The mapping table 1100 in FIG. 11 may include a plurality of purchase information (or mapping information). The mapping table 1100 may include information wherein purchase histories regarding various users are comprehensively stored. The server 400 may transmit purchase information corresponding to the edge device 200 in the mapping table 1100 to the electronic apparatus 100 through the AP device 300. The electronic apparatus 100 may obtain the purchase information corresponding to the edge device 200. The electronic apparatus 100 may generate and store connection information including at least one of the account information, the purchase information, the AP information, or the address information in the operation S3049.

The electronic apparatus 100 may transmit the connection information including the purchase information to the edge device 200 in the operation S3050. The edge device 200 may obtain at least one of the account information, the purchase information, the AP information, or the address information based on the connection information in the operation S3051.

The edge device 200 may transmit at least one of the account information, the identification information of the edge device 200, the purchase information, or the address information to the AP device 300 based on the AP information in the operation S3056.

The AP device 300 may receive at least one of the account information, the identification information of the edge device 200, the purchase information, or the address information from the edge device 200. The AP device 300 may transmit at least one of the account information, the identification information of the edge device 200, or the purchase information to the server 400 based on the address information in the operation S3057.

The server 400 may receive at least one of the account information, the identification information of the edge device 200, or the purchase information from the AP device 300. The terminal device 100-5 may identify whether the purchase information is included in the prestored mapping table (1100 in FIG. 11) in the operation S3060. In case the purchase information obtained through the AP device 300 is stored in advance, the server 400 may perform connection with the edge device 200 based on the transmitted identification information of the edge device 200 together with the transmitted purchase information.

FIG. 31 is a diagram for illustrating a controlling method of an electronic apparatus according to an embodiment.

Referring to FIG. 31, a controlling method of an electronic apparatus that is connected to an Internet of Things (IoT) network including an edge device, an AP device, and a server includes the operations of storing account information of a user, AP information for being connected to the AP device, and address information of the server (S3105), and based on a predetermined event of identifying an edge device not connected to the server occurring while moving the electronic apparatus, receiving authority information for connecting the edge device to the server from the server (S3110), and controlling the edge device to be connected to the server by transmitting connection information including the account information, the authority information, the AP information, and the address information to the edge device (S3115).

The predetermined event may include at least one of an event of identifying an edge device that has no history of having been connected to the server or an event of identifying an edge device of which connection to the server has been released.

The authority information may be transmitted to the server through the edge device and the AP device, and the server may be a server that is connected with the edge device if the authority information received from the AP device coincides with the prestored authority information.

The controlling method may include the operations of, after the electronic apparatus is moved to the location wherein the edge device is arranged, requesting information indicating whether the edge device is in a state of being connected with the server to the edge device, and receiving state information indicating whether the edge device is connected with the server from the edge device.

The controlling method may include the operation of identifying the predetermined event wherein the edge device is not connected to the server based on the state information.

In the operation of receiving the authority information, based on identifying the predetermined event, the authority information may be requested to the server, and the authority information may be received from the server.

The controlling method may include the operations of, based on the connection between the edge device and the server being released, obtaining information on the location wherein the edge device is arranged from the server, and controlling the electronic apparatus to move to the location wherein the edge device is arranged based on a space map stored in the electronic apparatus and the location information of the edge device.

The controlling method may include the operation of, based on the authority information not being predetermined authority information, providing guide information for notifying that authority for connecting the edge device to the server does not exist.

The controlling method may include the operation of, based on receiving a notification for indicating that the edge device is connected to the server, providing guide information for notifying that the edge device is connected to the server.

The electronic apparatus may include a projection device, and the controlling method may include the operation of controlling the projection device to output the guide information.

Methods according to the aforementioned various embodiments of the disclosure may be implemented in forms of applications that can be installed on related electronic apparatuses.

In addition, the aforementioned various embodiments of the disclosure may be performed through an embedded server provided on an electronic apparatus, or an external server of at least one of an electronic apparatus or a display device.

According to an embodiment of the disclosure, the aforementioned various embodiments may be implemented as instructions stored in machine-readable storage media, which can be read by machines (e.g.: computers). The machines refer to apparatuses that call instructions stored in a storage medium, and can operate according to the called instructions, and the apparatuses may include an electronic apparatus according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' indicates that a storage medium does not include signals, and is tangible, but does not indicate whether data is stored in the storage medium semi-permanently or temporarily.

Also, according to an embodiment of the disclosure, the methods according to the aforementioned various embodiments of the disclosure may be provided while being included in a computer program product. A computer program product refers to a product, and it can be traded between a seller and a buyer. A computer program product can be distributed on-line in the form of a storage medium that is readable by machines (e.g.: compact disc read only memory (CD-ROM)), or through an application store. In the case of on-line distribution, at least a portion of a computer program product may be stored in a storage medium such as the server of the manufacturer, the server of the application store, and the memory of the relay server at least temporarily, or may be generated temporarily.

In addition, each of the components according to the aforementioned various embodiments (e.g.: a module or a program) may consist of a singular object or a plurality of objects, and among the aforementioned corresponding sub components, some sub components may be omitted, or other sub components may be further included in the various embodiments. Alternatively or additionally, some components (e.g.: a module or a program) may be integrated as an object, and perform functions that were performed by each of the components before integration identically or in a similar manner. Also, operations performed by a module, a program, or other components according to the various embodiments may be executed sequentially, in parallel, repetitively, or heuristically. Or, at least some of the operations may be executed in a different order or omitted, or other operations may be added.

While aspects of embodiments have been particularly shown and described, it will be understood that various changes in form and details may be made therein without departing from the spirit and scope of the following claims.

What is claimed is:

1. An electronic apparatus comprising:
a communication interface;
a movement device; and
at least one processor connected with the communication interface, and configured to:
   control the movement device to move the electronic apparatus;
   based on an event, corresponding to identification of an external apparatus that is not connected to a server, occurring, request first information for connecting the external apparatus to the server; and
   based on the first information being received from the server through the communication interface, control the external apparatus to connect to the server by transmitting connection information to the external apparatus through the communication interface, the connection information including the first information.

2. The electronic apparatus of claim 1, wherein the event corresponding to identification of the external apparatus that is not connected to the server comprises at least one of identifying the external apparatus has no history of having been connected to the server or identifying connection between the external apparatus and the server has been released.

3. The electronic apparatus of claim 1, wherein the first information is authority information,
   wherein the external apparatus is configured to transmit the authority information to the server through an access point device, and
   wherein based on the authority information transmitted to the server corresponding to authority information stored in the server, the external apparatus and the server are connected.

4. The electronic apparatus of claim 1, wherein the at least one processor is further configured to:
   control the movement device to move the electronic apparatus toward the external apparatus;
   request second information corresponding to a connection state of the external apparatus with the server to the external apparatus through the communication interface based on the electronic apparatus being within a threshold distance of the external apparatus; and
   receive the second information corresponding to the connection state from the external apparatus through the communication interface.

5. The electronic apparatus of claim 4, wherein the first information is authority information, and
   wherein the at least one processor is further configured to:
   based on identifying the external apparatus is not connected to the server based on the second information corresponding to the connection state, request the authority information from the server through the communication interface; and
   receive the authority information from the server through the communication interface.

6. The electronic apparatus of claim 4, wherein the at least one processor is further configured to:
   based on identifying connection between the external apparatus and the server has been released, obtain location information corresponding to a location of the external apparatus from the server through the communication interface, and control the movement device to move the electronic apparatus toward the external apparatus based on a space map and the location of the external apparatus.

7. The electronic apparatus of claim 1, wherein the connection information further comprises state information, and
   wherein the state information comprises at least one of account information, access point information, or address information of the server.

8. The electronic apparatus of claim 1, wherein the first information is authority information, and
   wherein the at least one processor is further configured to, based on the authority information not corresponding to predetermined information, provide second information to the server indicating connection of the external apparatus to the server is not possible.

9. The electronic apparatus of claim 1, wherein the at least one processor is further configured to control the external apparatus to connect to the server through an access point device by transmitting access point information to the external apparatus.

10. The electronic apparatus of claim 1, further comprising a projection device,
   wherein the at least one processor is further configured to, based on receiving second information corresponding to a connection between the external apparatus and the server through the communication interface, control the projection device to output the second information corresponding to the connection between the external apparatus and the server.

11. A method of controlling an electronic apparatus that includes a movement device, the method comprising:
   controlling the movement device to move the electronic apparatus;
   based on an event, corresponding to identification of an external apparatus that is not connected to a server, occurring, requesting first information for connecting the external apparatus to the server; and
   based on the first information being received from the server through a communication interface of the electronic apparatus, controlling the external apparatus to connect to the server by transmitting connection information to the external apparatus, the connection information including the first information.

12. The method of claim 11, wherein the event corresponding to identification of the external apparatus that is not connected to the server comprises at least one of identifying the external apparatus has no history of having been connected to the server or identifying connection between the external apparatus and the server has been released.

13. The method of claim 11, wherein the first information is authority information, and
   wherein the method further comprises:
   transmitting the authority information to the server; and
   based on the authority information transmitted to the server corresponding to authority information stored in the server, establishing connection between the external apparatus and the server.

14. The method of claim 11, wherein the first information is authority information, and
   wherein the method further comprises:
   controlling the electronic apparatus to move toward the external apparatus;
   requesting second information corresponding to a connection state of the external apparatus with the server to the external apparatus based on the electronic apparatus being within a threshold distance of the external apparatus; and receiving the second information corresponding to the connection state from the external apparatus.

15. The method of claim 14, wherein the first information is authority information, and wherein the method further comprises:

based on identifying the external apparatus is not connected to the server based on the second information corresponding to the connection state, requesting the authority information from the server; and receiving the authority information from the server.

16. A non-transitory computer readable recording medium having embodied thereon a program, which when executed by a processor of an electronic apparatus causes the electronic apparatus to execute a method, the method comprising:

controlling a movement device of the electronic apparatus to move the electronic apparatus;

based on an event, corresponding to identification of an external apparatus that is not connected to a server, occurring, requesting first information for connecting the external apparatus to the server; and based on the first information being received from the server through a communication interface of the electronic apparatus, controlling the external apparatus to connect to the server by transmitting connection information to the external apparatus, the connection information including the first information.

* * * * *